US009112217B2

(12) United States Patent
Kim et al.

(10) Patent No.: US 9,112,217 B2
(45) Date of Patent: Aug. 18, 2015

(54) REVERSE ELECTRODIALYSIS SUPPORTED MICROBIAL FUEL CELLS AND MICROBIAL ELECTROLYSIS CELLS

(75) Inventors: Younggy Kim, Hamilton (CA); Roland D. Cusick, State College, PA (US); Bruce Logan, State College, PA (US)

(73) Assignee: The Penn State University, University Park, PA (US)

( * ) Notice: Subject to any disclaimer, the term of this patent is extended or adjusted under 35 U.S.C. 154(b) by 739 days.

(21) Appl. No.: 13/474,202

(22) Filed: May 17, 2012

(65) Prior Publication Data

US 2012/0292187 A1 Nov. 22, 2012

Related U.S. Application Data

(60) Provisional application No. 61/487,107, filed on May 17, 2011, provisional application No. 61/544,067, filed on Oct. 6, 2011, provisional application No. 61/598,635, filed on Feb. 14, 2012.

(51) Int. Cl.
| | |
|---|---|
| *H01M 8/16* | (2006.01) |
| *B01D 61/44* | (2006.01) |
| *B01D 61/46* | (2006.01) |
| *H01M 8/22* | (2006.01) |
| *B01D 61/50* | (2006.01) |

(52) U.S. Cl.
CPC .............. *H01M 8/227* (2013.01); *B01D 61/44* (2013.01); *B01D 61/50* (2013.01); *H01M 8/16* (2013.01); *Y02E 10/36* (2013.01); *Y02E 60/527* (2013.01)

(58) Field of Classification Search
CPC ................................ H01M 8/16; H01M 8/227
See application file for complete search history.

(56) References Cited

U.S. PATENT DOCUMENTS

| | | | | |
|---|---|---|---|---|
| 2007/0259216 | A1* | 11/2007 | Logan | 429/2 |
| 2008/0230376 | A1* | 9/2008 | Brauns | 204/194 |
| 2009/0317882 | A1* | 12/2009 | Cheng et al. | 435/167 |
| 2010/0270158 | A1 | 10/2010 | Logan | |

OTHER PUBLICATIONS

Brauns E., "Salinity Gradient Power by Reverse Electrodialysis: Effect of Model Parameters on Electrical Power Outlet," Desalination, 237(1-3):378-391, 2009.
Call D., et al, "Hydrogen Production in a Single Chamber Microbial Electrolysis Cell Lacking a Membrane," Environ. Sci. Technol., 42:3401-3406, 2008.

(Continued)

*Primary Examiner* — Keith Hendricks
*Assistant Examiner* — Salil Jain
(74) *Attorney, Agent, or Firm* — Gifford, Krass, Sprinkle, Anderson & Citkowski, P.C.

(57) ABSTRACT

Systems and methods for microbial processes of generating products such as electrical power, hydrogen gas and methane, are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a reverse electrodialysis stack comprising a plurality of plurality of alternating anion selective barriers and cation selective barriers disposed between the anode and the cathode defining one or more saline material compartments and one or more lower-saline material compartments.

11 Claims, 25 Drawing Sheets

(56) References Cited

OTHER PUBLICATIONS

Cheng S., et al., "Increased Performance of Single-Chamber Microbial Fuel Cells Using an Improved Cathode Structure," Electrochem. Commun., 8:489-494, 2006.

Cheng S., et al., "Sustainable and Efficient Biohydrogen Production Via Electrohydrogenesis," Proc. Natl. Acad. Sci. U.S.A., 104:18871-18873, 2007.

Cheng S., et al., "Power Densities Using Different Cathode Catalysts (Pt and CoTMPP) and Polymer Binders (Nafion and PTFE) in Single Chamber Microbial Fuel Cells," Environ. Sci. Technol., 40:364-369, 2006.

Cheng S., et al., "Ammonia Treatment of Carbon Cloth Anodes to Enhance Power Generation of Microbial Fuel Cells," Electrochem. Commun., 9(3):492-496, 2007.

Cusick R., et al., "Energy Capture from Thermolytic Solutions in Microbial Reverse-Electrodialysis Cells," Science, 335:1474-77, 2012.

DŁugołecki P., "Practical Potential of Reverse Electrodialysis as Process for Sustainable Energy Generation," Environ. Sci. Technol., 43:6888-6894, 2009.

Fan Y., et al., "Enhanced Coulombic Efficiency and Power Density of Air-Cathode Microbial Fuel Cells with an Improved Cell Configuration," J. Power Sources, 171(2):348-354, 2007.

Fan Y., et al., "Quantification of the Internal Resistance Distribution of Microbial Fuel Cells," Environ. Sci. Technol., 42 (21):8101-8107, 2009.

Fang H.H.P., et al, "Phototrophic Hydrogen Production from Acetate and Butyrate in Wastewater," Int. J. Hydrogen Energy, 30:785-793, 2005.

He Z., et al, "Effect of Electrolyte pH on the Rate of the Anodic and Cathodic Reactions in an Air-Cathode Microbial Fuel Cell," Bioelectrochemistry, 74:78-82, 2008.

Huang C., et al, "Electrodialysis with Bipolar Membranes for Sustainable Development," Environmental Science & Technology, 40:5233-5243, 2006.

Huang C., et al., "Electrodialysis with Bipolar Membranes for Sustainable Development," Environ. Sci. Technol, 40: 5233-43, 2006.

Judd S., et al., "Polarization and Back E.M.F. in Electrodialysis," Journal of Applied Electrochemistry, 23:1117-24, 1993.

Kim Y., et al., "Hydrogen Production from Inexhaustible Supplies of Fresh and Salt Water Using Microbial Reverse-Electrodialysis Electrolysis Cells," PNAS, 108(39):16176-81, 2011.

Kim Y., et al., "Microbial Reverse Electrodialysis Cells for Synergistically Enhanced Power Production," Environmental Science and Technology, 45:5834-39, 2011.

Kim Y., et al., "Electrodialysis with Spacers: Effects of Variation and Correlation of Boundary Layer Thickness," Desalination, 274:54-63, 2011.

Lacey R.E., "Energy by Reverse Electrodialysis," Ocean Engineering, 7:1-47, 1980.

Liu H., et al., "Electrochemically Assisted Microbial Production of Hydrogen from Acetate," Environ. Sci. Technol., 39:4317-4320, 2005.

Liu H., et al, "Production of Electricity from Acetate or Butyrate Using a Single-Chamber Microbial Fuel Cell," Environ. Sci. Technol., 39(2):658-662, 2005.

Logan B.E., et al., "Membrane-Based Processes for Sustainable Power Generation Using Water," Nature, 488:313-19, 2012.

Logan B.E., et al., "Conversion of Wastes into Bioelectricity and Chemicals by Using Microbial Electrochemical Technologies," Science, 337:686-90, 2012.

Logan B.E., "Exoelectrogenic Bacteria that Power Microbial Fuel Cells," Nat. Rev. Microbiol., 7(5):375-381, 2009.

Logan B.E., et al., "Graphite Fiber Brush Anodes for Increased Power Production in Air-Cathode Microbial Fuel Cells," Environ. Sci. Technol., 41(9):3341-3346, 2007.

Logan B.E., et al, "Microbial Fuel Cells: Methodology and Technology," Environmental Science & Technology, 40 (17):5181-5192, 2006.

Logan B.E., et al, "Microbial Electrolysis Cells for High Yield Hydrogen Gas Production from Organic Matter," Environmental Science & Technology, 42(23), 8630-8640, 2008.

Lovley D.R., et al., "Novel Mode of Microbial Energy Metabolism: Organic Carbon Oxidation Coupled to Dissimilatory Reduction of Iron or Manganese," Appl. Enrivon. Microbiol., 54(6):1472-1480, 1988.

Luo X., et al., "Power Generation by Coupling Reverse Electrodialysis and Ammonium Bicarbonate: Implication for Recovery of Waste Heat," Electrochemistry Communications, 19:25-28 2012.

McCutcheon J., et al., "A Novel Ammonia-Carbon Dioxide Forward (Direct) Osmosis Desalination Process," Desalination, 174:1-11, 2005.

McGinnis R., et al., Energy Requirements of Ammonia-Carbon Dioxide Forward Osmosis Desalination, Desalination, 207:370-82, 2007.

Mehanna M., et al., "Using Microbial Desalination Cells to Reduce Water Salinity Prior to Reverse Osmosis," Energy Enrivon. Sci., 3:1114-1120, 2010.

Nam J., et al., "Hydrogen Generation in Microbial Reverse-Electrodialysis Electrolysis Cells Using a Heat-Regenerated Salt Solution," Environmental Science and Technology, 46:5240-46, 2012.

Oh S., et al., "Voltage Reversal During Microbial Fuel Cell Stack Operation," Journal of Power Sources, 167:11-17, 2007.

Pant D., et al., "A Review of the Substrates Used in Microbial Fuel Cells (MFCs) for Sustainable Energy Production," Bioresour. Technol., 101:1533-1543, 2010.

Post J.W., et al., "Energy Recovery from Controlled Mixing Salt and Fresh Water with a Reverse Electrodialysis System," Enrivon. Sci. Technol., 42(15):5785-5790, 2008.

Post J.W., et al., "Salinity-Gradient Power: Evaluation of Pressure-Retarded Osmosis and Reverse Electrodialysis," J. Membr. Sci., 288:218-230, 2007.

Rozendal R.A., et al., "Principle and Perspectives of Hydrogen Production Through Biocatalyzed Electrolysis," Int. J. Hydrogen Energy, 31:1632-1640, 2006.

Selembo P.A., et al., "The Use of Stainless Steel and Nickel Alloys as Low-Cost Cathodes in Microbial Electrolysis Cells," J. Power Sources, 190:271-278, 2009.

Sun M., et al., "An MEC-MFC-Coupled System for Biohydrogen Production from Acetate," Environ. Sci. Technol., 42:8095-8100, 2008.

Tartakovsky B., et al., 2008, "Biocatalyzed Hydrogen Production in a Continuous Flow Microbial Fuel Cell with a Gas Phase Cathode," J. Power Sources, 182:291-297, 2008.

Tartakovsky B., et al., "High Rate Membrane-Less Microbial Electrolysis Cell for Continuous Hydrogen Production," Int. J. Hydrogen Energy, 34:672-677, 2008.

Turek M., et al., "Renewable Energy by Reverse Electrodialysis," Desalination, 205:67-74, 2007.

Veerman J., et al., "Reverse Electrodialysis: Evaluation of Suitable Electrode Systems," J Appl. Electrochem., 40:1461-74, 2010.

Veerman J., et al., "Reverse Electrodialysis: Comparison of Six Commercial Membrane Pairs on the Thermodynamic Efficiency and Power Density," Journal of Membrane Science, 343:7-15, 2009.

Veerman J., et al., "Reverse Electrodialysis: Performance of a Stack with 50 Cells on the Mixing of Sea and River Water," Journal of Membrane Science, 327:136-144, 2009.

Wen T., et al., "Spirally Wound Electrodialysis (SpED) Modules," Desalination, 101:79-91, 1995.

Weinstein J.N., et al., "Electric Power from Differences in Salinity: The Dialytic Battery," Science, 191:557-559, 1976.

Wick G.L., et al., "Power from Salinity Gradients," Energy, 3:95-100, 1978.

Zhuo K., et al, "Activity Coefficients of Individual Ions in Aqueous Solutions of Sodium Halides at 298.15 K," Fluid Phase Equilib., 274:80-84, 2008.

Veerman J., et al., "Reverse Electrodialysis: A Validated Process Model for Design and Optimization," Chem. Eng. J. (Amsterdam Netherlands), 166:256-268, 2011.

* cited by examiner

REVERSE ELECTRODIALYSIS SUPPORTED MICROBIAL FUEL CELLS AND MICROBIAL ELECTROLYSIS CELLS

REFERENCE TO RELATED APPLICATIONS

This application claims priority from U.S. Provisional Patent Application Ser. No. 61/487,107, filed May 17, 2011; 61/544,067, filed Oct. 6, 2011; and 61/598,635, filed Feb. 14, 2012. The entire content of each application is incorporated herein by reference.

FIELD OF THE INVENTION

Microbial systems incorporating reverse electrodialysis for generation of products such as power or hydrogen are provided according to embodiments of the present invention.

BACKGROUND OF THE INVENTION

A microbial fuel cell (MFCs) is a type of bioelectrochemical system (BES) where current is generated by bacteria from the oxidation of organic and inorganic matter. Compounds are reduced at the cathode, such as oxygen or protons, through inorganic catalysts or bacteria and electrical power is generated in an MFC.

Ordinary fuel cells (i.e. PEM hydrogen fuel cells) can be linked in series to increase voltage, but when MFCs are electrically linked in series there is a voltage reversal, and the power output from the stack (multiple cells in series) is not consistently increased in proportion to the number of cells. This electrical linking of MFC reactors in series has limited applications where higher voltages are desired.

Hydrogen gas is generated by addition of voltage to an MFC, in which case the system is termed a microbial electrolysis cell (MEC). Exoelectrogens are used to drive electrochemical $H_2$ production in an MEC. However, the potential generated by substrate oxidation (−0.30 V vs. NHE; 1 g/L acetate; pH 7) is not sufficient to drive $H_2$ evolution (−0.41 V vs. NHE at pH 7). Thus, additional energy (∼0.11 V in theory) is needed to overcome this thermodynamic threshold, and an external voltage of >0.4 V is typically applied to MECs. This additional energy could be provided by, for instance, a renewable source of energy, such as solar, wind, or waste organic matter. However, no method or device is believed to have been developed prior to the present invention to directly achieve $H_2$ production in one biotic process without an external voltage supply.

Reverse electrodialysis (RED) holds great promise as a method for generating electricity from the salinity gradient between seawater and river water. RED systems are built as stacks of alternating cation- and anion-exchange membranes situated between two electrodes. When seawater and river water are provided into the RED stack, counter-ions (selected ions) to the membranes are driven from seawater to river water due to the salinity difference, creating an electric potential across the ion-exchange membrane. A salinity ratio of 50 between seawater and river water can theoretically create 0.155 V (open circuit) per pair of anion- and cation-exchange membranes.

Reverse electrodialysis (RED) is a power generation system based on the salinity-driven electromotive force, especially between salty sea water and fresh river water (Huang, et al., 2006). The concentration difference across the ion-exchange membrane drives the ionic transport in the system, and this driving force can be quantified by Eq. (1) as electromotive force (Bard, et al., 2001).

$$|\Delta \phi| = \frac{RT}{zF} \left[ t_{counter} \ln\left(\frac{a_{counter,high}}{a_{counter,low}}\right) - t_{co} \ln\left(\frac{a_{co,high}}{a_{co,low}}\right) \right] \quad (1)$$

where $\Delta\phi$ is the electromotive force driven by the concentration difference, t is the transport number (defined as the fractional contribution of the ionic flux to the current density in the membrane), R is the gas constant, T is the absolute temperature, z is the ionic charge, f is the activity coefficient, and c is the ionic concentration. The subscripts high and low mean the high- and low-concentration cells, respectively. Also, the subscripts counter and co denote the counter- and co-ions to the membrane, respectively. Note that the counter- and co-ions are selected and excluded ions by the ion-exchange membrane; for instance, with a cation-exchange membrane, sodium or magnesium ions are counter-ions, while chloride or sulfate ions are co-ions, and vice versa with an anion-exchange membrane.

SUMMARY OF THE INVENTION

Systems for microbial processes of generating a product are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a reverse electrodialysis stack comprising a plurality of plurality of alternating anion selective barriers and cation selective barriers disposed between the anode and the cathode defining one or more saline material compartments and one or more lower-saline material compartments.

Products generated include, but are not limited to, electrical current, hydrogen gas, methane, caustic water, hydrogen peroxide, acetate and other organic materials.

According to aspects of inventive systems, the plurality of alternating anion selective barriers and cation selective barriers is 1, 2, 3, 4, 5, 6, 7, 8, 9, 10, 11, 12, 13, 14, 15, 16, 17, 18, 19, 20 or a greater number of pairs of alternately disposed anion selective barriers and cation selective barriers.

According to aspects of inventive systems, each anion selective barrier is an anion exchange membrane and each cation selective barrier is a cation exchange membrane.

Systems for microbial processes of generating hydrogen or methane are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; an air cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; wherein oxygen is substantially excluded from the cathode compartment.

Systems for microbial processes of generating hydrogen or methane are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; an air cathode at least partially contained within a cathode compartment of the reaction chamber; a gas collection system in gas communication with the cathode compartment for collection of hydrogen or methane gas; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments, wherein oxygen is substantially excluded from the cathode compartment.

Systems for microbial processes of generating electrical current are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; an air cathode at least partially contained within a cathode compartment of the reaction chamber; a gas collection system in gas communication with the cathode compartment for collection of hydrogen or methane gas; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments, wherein oxygen is not excluded from the cathode compartment and optionally including a load in electrical communication with the conductive conduit.

Systems for microbial processes of generating a product are provided according to aspects of the present invention which further include a conduit for transport of a lower-saline material effluent from the lower-saline material compartment to a container having a first liquid containing portion adjacent a heat source, a vapor condenser portion and a second liquid containing portion for containing condensed vapor; and a conduit for transport of a regenerated lower-saline material from the second liquid containing portion for containing condensed vapor to the lower-saline material compartment.

Systems for microbial processes of generating a product are provided according to aspects of the present invention which include a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments.

Systems for microbial processes of generating a product are provided according to aspects of the present invention wherein each lower-saline material compartment is in fluid communication with each other lower-saline material compartment and wherein each saline material compartment is in fluid communication with each other saline material compartment.

Systems for microbial processes of generating a product are provided according to aspects of the present invention wherein a first reaction chamber is in fluid communication with a second reaction chamber.

Microbial processes for generating a product are provided according to aspects of the present invention which include providing a system including a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a material oxidizable by an oxidizing activity of the exoelectrogenic microorganisms into the anode chamber; incubating the material oxidizable by the exoelectrogenic microorganisms under oxidizing reactions conditions such that electrons are produced and transferred to the anode, generating a potential between the anode and cathode; introducing a saline material having a concentration of dissolved salts into the saline material compartment; and introducing a lower-saline material having a concentration of dissolved salts which is lower than the saline material into the lower-saline material compartment, wherein an electromotive force established by a difference in the concentration of dissolved salts in the saline material compared to the lower-saline material (the saline ratio) drives ions across the first anion selective barrier and first cation selective barrier, thereby increasing the potential between the anode and cathode, decreasing the concentration of dissolved salts in the saline material to generate a saline material effluent, and increasing the concentration of dissolved salts in the lower-saline material to generate a lower-saline material effluent. The described processes produce electrical power where oxygen is present, hydrogen gas where oxygen is excluded from the cathode compartment, methane where methanogens are included in the cathode compartment, and other products.

Microbial processes for generating a product are provided according to aspects of the present invention which include providing a system including a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a material oxidizable by an oxidizing activity of the exoelectrogenic microorganisms into the anode chamber; incubating the material oxidizable by the exoelectrogenic microorganisms under oxidizing reactions conditions such that electrons are produced and transferred to the anode, generating a potential between the anode and cathode; introducing a saline material having a concentration of dissolved salts into the saline material compartment; and introducing a lower-saline material having a concentration of dissolved salts which is lower than the saline material into the lower-saline material compartment, wherein an electromotive force established by a difference in the concentration of dissolved salts in the saline material compared to the lower-saline material (the saline ratio) drives ions across the first anion selective barrier and first cation selective barrier, wherein the saline ratio between the saline material and the lower-saline material introduced into the saline material compartment and lower-saline material compartment is greater than 1:1, thereby increasing the potential between the anode and cathode, decreasing the concentration of dissolved salts in the saline material to generate a saline material effluent, and increasing the concentration of dissolved salts in the lower-saline material to generate a lower-saline material effluent.

Microbial processes for generating a product are provided according to aspects of the present invention wherein oxygen is excluded from the cathode compartment and the product is hydrogen or methane or wherein oxygen is not excluded from the cathode compartment and the product is electrical current.

Microbial processes for generating a product are provided according to aspects of the present invention which include providing a system including a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a reverse electrodialysis stack comprising a plurality of plurality of alternating anion selective barriers and cation selective barriers disposed between the anode and the cathode defining one or more saline material compartments and one or more lower-saline material compartments; introducing a material oxidizable by an oxidizing activity of the exoelectrogenic microorganisms into the anode chamber; incubating the material oxidizable by the exoelectrogenic microorganisms under oxidizing reactions conditions such that electrons are produced and transferred to the anode, generating a potential between the anode and cathode; introducing a saline material having a concentration of dissolved ammonium bicarbonate into the saline material compartments; and introducing a lower-saline material having a concentration of dissolved ammonium bicarbonate which is lower than the saline material into the lower-saline material compartments, wherein an electromotive force established by a difference in the concentration of dissolved ammonium bicarbonate in the saline material compared to the lower-saline material (the saline ratio) drives ions across the anion-selective barriers and cation-selective barriers, thereby increasing the potential between the anode and cathode, decreasing the concentration of dissolved ammonium bicarbonate in the saline material to generate a saline material effluent, and increasing the concentration of dissolved ammonium bicarbonate in the lower-saline material to generate a lower-saline material effluent.

Microbial processes for generating a product are provided according to aspects of the present invention which include providing a system including a reaction chamber having a wall defining an interior of the reaction chamber and an exterior of the reaction chamber; an anode at least partially contained within an anode compartment of the reaction chamber; a plurality of exoelectrogenic microorganisms disposed in the anode compartment; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a material oxidizable by an oxidizing activity of the exoelectrogenic microorganisms into the anode chamber; incubating the material oxidizable by the exoelectrogenic microorganisms under oxidizing reactions conditions such that electrons are produced and transferred to the anode, generating a potential between the anode and cathode; introducing a saline material having a concentration of dissolved ammonium bicarbonate into the saline material compartment; introducing a lower-saline material having a concentration of dissolved ammonium bicarbonate which is lower than the saline material into the lower-saline material compartment, wherein an electromotive force established by a difference in the concentration of dissolved ammonium bicarbonate in the saline material compared to the lower-saline material (the saline ratio) drives ions across the anion selective barriers and cation selective barriers, thereby increasing the potential between the anode and cathode, decreasing the concentration of dissolved ammonium bicarbonate in the saline material to generate a saline material effluent, and increasing the concentration of dissolved ammonium bicarbonate in the lower-saline material to generate a lower-saline material effluent. The lower-saline material effluent is heated to volatilize and remove the ammonium bicarbonate, thereby producing a regenerated lower-saline material and the regenerated lower-saline material can then be introduced into the lower-saline material compartments. Ammonium bicarbonate is added back to the saline material effluent to produce regenerated saline material and the regenerated saline material can then be introduced into the saline material compartments. Alternatively, or in addition, the saline material effluent can be added to the lower-saline material effluent to dilute it and the resulting material is regenerated lower-saline material which can be introduced into the lower-saline material compartments.

Heating the lower-saline material effluent to volatize and remove the thermolytic salt, such as ammonium bicarbonate, according to aspects of the present invention includes heating with waste heat from a second process, heat generated by a solar heater or solar collector or a combination of waste heat from a second process and heat generated by a solar heater or solar collector.

Heating the lower-saline material effluent to volatize and remove the thermolytic salt, such as ammonium bicarbonate, according to aspects of the present invention includes heating to temperature sufficient to volatilize the thermolytic salt and thereby separate it from the solvent, typically water. Heating an aqueous solution including ammonium bicarbonate to a temperature in the range of about 50-90° C. volatilizes the ammonium bicarbonate and thereby separates it from water without substantial vaporization of the water.

Optionally, the lower-saline material effluent and saline material effluent are combined to generate a saline material and the saline material is introduced into the saline material compartment.

In a further option, the saline material comprises one or more dissolved non-thermolytic salts, wherein the total concentration of dissolved thermolytic salt is greater than the total concentration of the one or more dissolved non-thermolytic salts. The dissolved non-thermolytic salt is sodium chloride and/or potassium chloride according to aspects of inventive processes.

According to aspects of the present invention, the system includes a plurality of lower-saline material compartments wherein each lower-saline material compartment is in fluid communication with each other lower-saline material compartment, and a plurality of saline material compartments wherein each saline material compartment is in fluid communication with each other saline material compartment. The saline material flows sequentially through each saline material compartment, the lower-saline material flows sequentially through each lower-saline material compartment, and the saline material and lower-saline material are introduced such that they flow in a counter-current direction or co-current direction with respect to each other.

Optionally, the saline material is a brine solution from a reverse osmosis plant and the lower-saline material is a saline seawater stream.

In a further option, microbes are introduced into the cathode compartment, and methane, acetate and other organic materials produced by the microbes in the cathode compartment is collected.

In a further option, microbes are introduced into the cathode compartment, reaction catalysts are excluded from the cathode compartment and hydrogen peroxide is produced in the cathode compartment and collected.

In a further option, microbes are introduced into the cathode compartment, and caustic water produced by the microbes in the cathode compartment is collected.

DETAILED DESCRIPTION OF THE INVENTION

The singular terms "a," "an," and "the" used herein are not intended to be limiting and include plural referents unless explicitly state or the context clearly indicates otherwise.

Methods and systems provided by the present invention for $H_2$ production or electrical power production include integrating a RED stack into a microbial electrolysis cell or microbial fuel cell, respectively, where anodic oxidation of organic matter is driven by exoelectrogenic microorganisms. In these inventive systems, $H_2$ production or electrical power production is achieved by two driving forces: a thermodynamically favorable oxidation of organic matter by exoelectrogens on the anode; and the energy derived from the salinity gradient between a saline material, such as seawater, and a lower-saline material, such as river water. The exoelectrogens at the anode not only add electric power by substrate oxidation, but they also substantially reduce electrode overpotential. The salinity driven energy, provided by one or more RED subunits, completely eliminates the need for an external power source.

The methods and systems described herein allow generation of $H_2$ or electrical power from nearly unlimited energy sources such as organic matter in solution, for example in domestic and industrial wastewaters, and seawater and river water.

The term microbial reverse electrodialysis cell (MRC) is used herein to refer to systems of the present invention using anodophilic microbes (also called exoelectrogens) as "catalysts" to oxidize organic and/or inorganic materials oxidizable by an oxidizing activity of the anodophilic microbes and generate electrons. The electrons are transferred to an anode, generating, or adding to, a potential between the anode and a cathode. Ions present in a saline material are driven by concentration difference across ion-selective barriers present in the MRC separating the ions from the saline material into a lower-saline material. Thus, anions move away from a saline material through an anion-selective barrier, such as an anion exchange membrane (AEM) into a lower-saline material and cations move away from a saline material through a cation-selective barrier, such as a cation exchange membrane (CEM) into a lower-saline material.

Methods and systems incorporating reverse electrodialysis processes for synergistically increasing power output of MFCs and hydrogen output of MECs are provided according to the present invention. An electrical power generating system of the present invention is termed a "microbial reverse electrodialysis fuel cell" (MRFC) herein. A hydrogen generating system of the present invention is termed a "microbial reverse-electrodialysis electrolysis cell" (MREC) herein.

Figure 1:
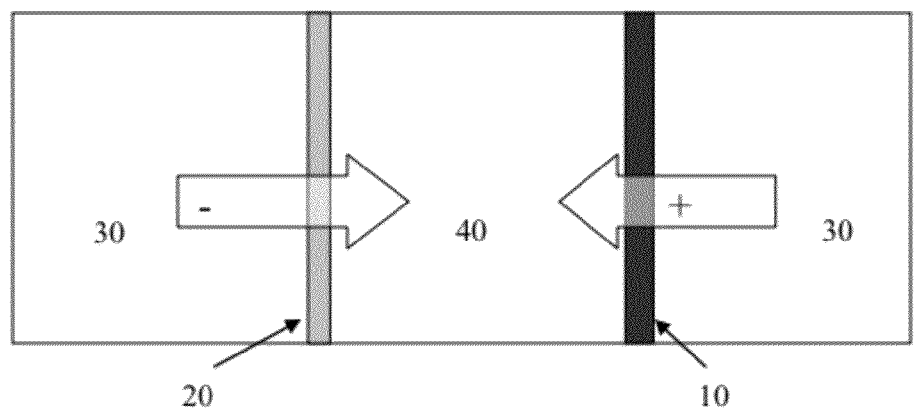
FIG. 1 is a schematic illustration of a repeating subunit of a RED system.

FIG. 1 is a schematic illustration of a repeating subunit of a RED system including a cation-selective barrier 10, such as a cation exchange membrane, adjacent a saline material compartment 30 and a lower saline material compartment 40, and an anion-selective barrier 20, such as an anion-exchange membrane, adjacent a saline material compartment 30 and a lower saline material compartment 40.

The term "anion-selective barrier" is used herein to refer to a material which allows passage of anions but which does not substantially allow passage of other materials. A well-known example is an anion-exchange membrane.

The term "cation-selective barrier" is used herein to refer to a material which allows passage of cations but which does not substantially allow passage of other materials. A well-known example is a cation-exchange membrane.

In operation, anions pass from a saline material compartment 30 through an anion exchange material 20, to reach a lower saline material compartment 40. Cations pass from a saline material compartment 30 through a cation-selective barrier 10, to reach a lower saline material compartment 40.

Aspects of systems of the present invention include multiple subunits of a RED system having alternately placed cation-selective barriers, such as cation exchange membranes 10, and anion-selective barriers, such as anion-exchange membranes 20, between saline-material compartments 30 for high-salt concentration fluids, referred to as "saline materials" herein and lower saline material compartments 40 for low-salt concentration fluids, referred to as "lower-saline materials" herein.

One or more flow pathways for a saline material is present for the flow of the saline material through one or more of the saline material compartments. One or more flow pathways for a lower-saline material is present for the flow of the lower-saline material through one or more of the lower-saline material compartments.

Figure 2:
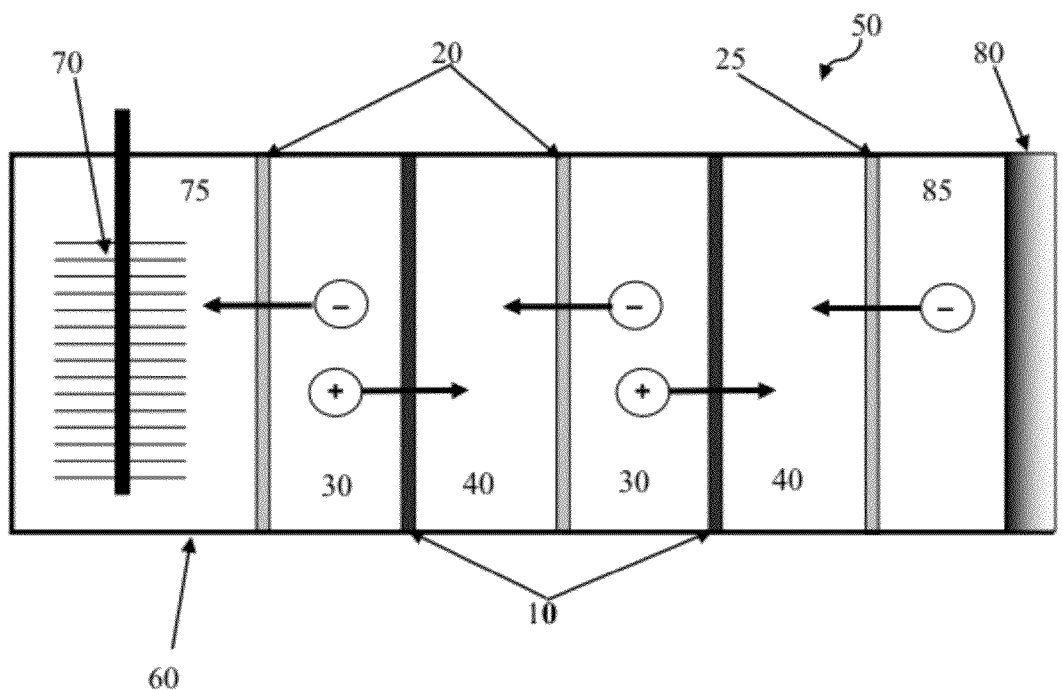
FIG. 2 is a schematic illustration of a "microbial reverse electrodialysis cell" (MRC) including two RED subunits.

FIG. 2 is a schematic illustration of aspects of an MRC including two RED subunits. The MRC system schematically illustrated in FIG. 3 includes reaction chamber 50 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is not shown in this schematic illustration. Alternately placed cation-exchange membranes 10 and anion-exchange membranes 20 between saline-material compartments 30 and lower saline material compartments 40 such that a saline-material compartment 30 and an adjacent lower saline material compartment 40 are in ion communication. An optional anion exchange membrane 25 is disposed adjacent the anode chamber such that the anode chamber is in ion communication with the adjacent saline-material compartment or lower saline material compartment.

The open circuit potential of an MRFC reactor can be theoretically calculated. For instance, with 0.6 M and 0.03 M NaCl solutions in the saline material compartment and lower-saline material compartment, the salinity driven electromotive force is 0.3 V (for the calculation, assumed conditions of 25° C.; transport number of the counter-ion 0.95, with activity coefficients determined by the Extended Debye-Huckel model). Assuming that the anode open circuit potential is −0.3 V (vs. NHE) and the air cathode open circuit potential is 0.4 V (vs. NHE) (Logan, 2008), the total open circuit potential of the MRFC reactor is 1.0 V. This is a potential that was previously not able to be obtained in an MRFC with an air cathode without adding in voltage from an external power source. This device represents a new way to produce and boost power in a bioelectrochemical system.

Due to the ionic transport through the ion-exchange membrane, the concentration difference between the high- and low-concentration cells reduces with the MRC operation. To avoid this reduction in the concentration difference, the solution in the reactor should be replaced. Thus, embodiments of the present invention include one or more pumps to deliver the saline material and lower-saline material to the corresponding saline material and lower-saline material compartments of the reactor.

Figure 3:
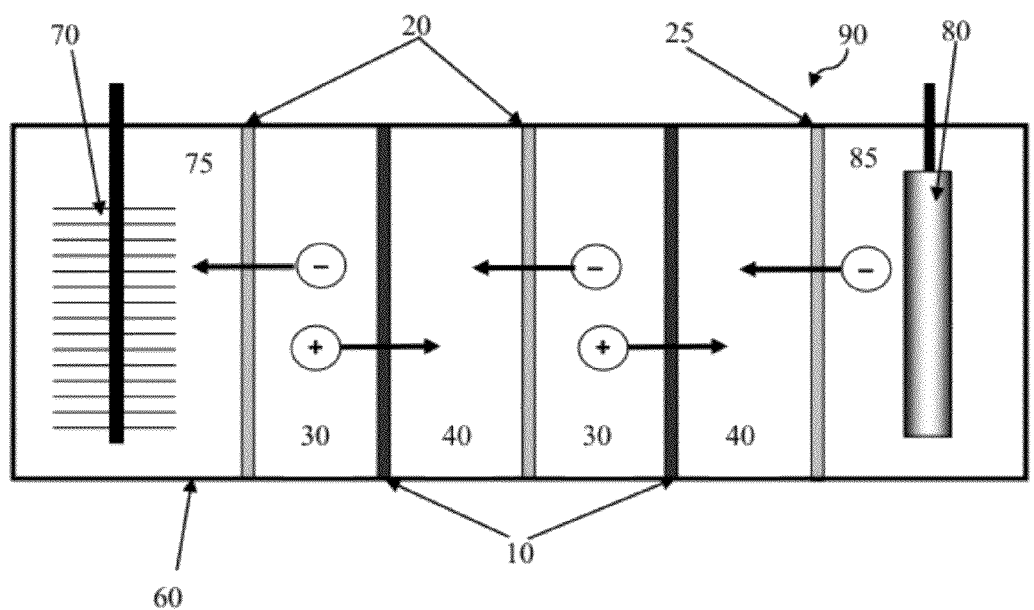
FIG. 3 is a schematic illustration of a "microbial reverse-electrodialysis electrolysis cell" (MREC) including two RED subunits.

FIG. 3 is a schematic illustration of an MREC including two RED subunits.

An MREC system schematically illustrated in FIG. 3 includes reaction chamber 90 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is not shown in this schematic illustration. Alternately placed cation-exchange membranes 10 and anion-exchange membranes 20 between saline-material compartments 30 and lower saline material compartments 40 such that a saline-material compartment 30 and an adjacent lower saline material compartment 40 are in ion communication. An optional anion exchange membrane 25 is disposed adjacent the anode chamber such that the anode chamber is in ion communication with the adjacent saline-material compartment or lower saline material compartment.

At 25° C. and neutral pH, −0.414 V (vs. NHE) is required to start producing hydrogen gas at the cathode, while the anode potential cannot be more negative than −0.3 (vs. NHE) under normal conditions. Thus, in conventional MECs, external potential energy, usually greater than 0.25 V, is provided to drive the hydrogen evolution at the cathode. However, an MREC of the present invention does not require external potential energy, because the sum of the anode potential and salinity-driven electromotive force can drive the hydrogen evolution at the cathode.

An MRC of the present invention includes an RED system having one or more subunits, each subunit having an anion-selective barrier and a cation-selective barrier which together define a saline material compartment between the anion selective barrier and the cation-selective barrier. The first anion-selective barrier of an RED subunit is disposed between the saline material compartment and a lower-saline material compartment such that anions traverse the first anion-selective barrier down a concentration gradient to reach a lower-saline material, producing a voltage. The first cation-selective barrier is disposed between the saline material and a lower-saline material compartment such that cations traverse the first cation-selective barrier to reach a lower-saline material, producing a voltage.

In addition to the one or more subunits, an RED system optionally includes an anion-selective barrier disposed between the cation-selective barrier of an RED subunit closest to the anode and the anode, defining an anode compartment. Thus, the anode compartment is optionally and preferably a lower-saline material compartment and the adjacent compartment is preferably a saline material compartment.

The catholyte in the cathode compartment can be regularly replaced or continuously pumped to avoid extremely high pH in the cathode compartment if desired.

In FIGS. 2 and 3, anion-selective barrier 25 is an anion-selective barrier disposed between the cation-selective barrier 20 of an RED subunit closest to the anode and the anode 70, defining a cathode compartment 75.

In an embodiment including only a single RED subunit, the anion selective barrier of the RED subunit defines the anode compartment which is also a lower-saline material compartment, the anion selective barrier and the cation selective barrier define a saline material compartment between the anion selective barrier and the cation selective barrier, and an anion selective barrier is disposed between the cation selective barrier of the RED subunit and the cathode, defining a cathode compartment which is also a saline material compartment.

In a "stack" configuration of an RED, the anion-selective and cation-selective barriers are generally parallel. As illustrated, anion-selective and cation-selective barriers are preferably anion-selective membranes, such as anion-exchange membranes and cation-selective membranes, such as cation-exchange membranes, respectively.

The number of subunits included in the RED system is not limited, is preferably in the range of 1-20 subunits, inclusive, but may be greater. According to embodiments, a small number of RED subunits, in the range of 1-10, inclusive, coupled with an optimized flow scheme, minimizes energy losses due to pumping solutions.

Embodiments of MRC systems according to the present invention include a reaction chamber having a wall defining an interior of the reaction compartment and an exterior of the reaction compartment; an anode at least partially contained within an anode compartment of the reaction compartment; a plurality of anodophilic microbes disposed in the anode compartment; and a cathode at least partially contained within a cathode compartment of the reaction compartment, a conductive conduit for electrons in electrical communication with the anode and cathode, and a reverse electrodialysis system (RED) interposed between the anode and cathode.

Figure 4:
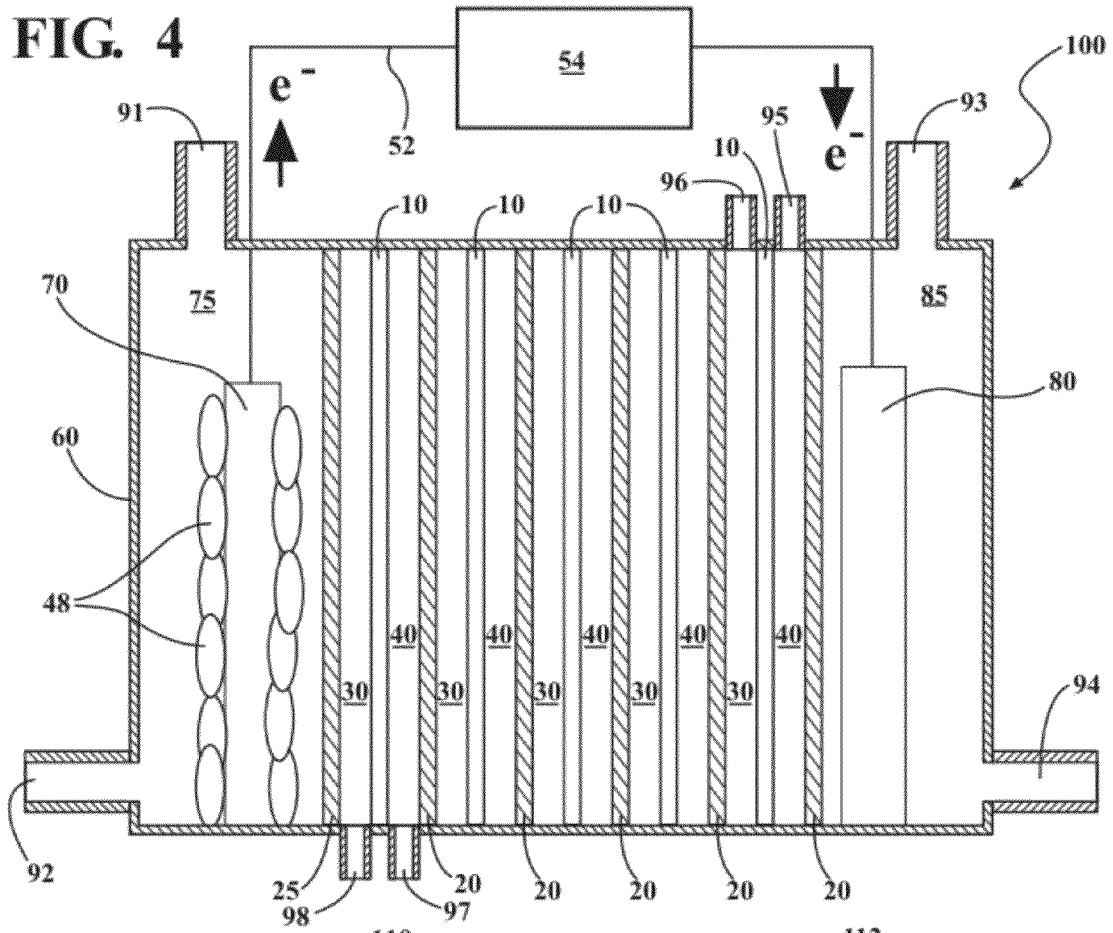
FIG. 4 is a schematic illustration of a RED stack including 10 cells in total, with 5 saline material, seawater, compartments and 5 lower-saline material, river water, compartments alternately sandwiched between the anode and cathode compartments.

A schematic illustration of aspects of devices of the present invention is shown in FIG. 4. FIG. 4 illustrates aspects of an inventive system including reaction chamber 100 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. Anodophilic organisms 48 are shown in the anode compartment. A conductive conduit for electrons in electrical communication with the anode and the cathode is shown at 52 along with a load and/or optional power supply 54. Alternately placed cation-exchange barriers 10 and anion-exchange barriers 20 between saline-material compartments 30 and lower saline material compartments 40. An anion-selective barrier 25 is disposed anion-selective barrier disposed between the cation-selective barrier 20 of an RED subunit closest to the anode and the anode 70, defining an anode compartment 75. One or more channels for inlet and outlet of materials, such as gases, an organic substance oxidizable by the anodophilic bacteria, catholyte, saline material or lower saline material can be included, examples are shown at 91, 92, 93, 94, 95, 96, 97 and 98.

Methods of the present invention include the movement of ions from a "saline material" concentrated in the ions down a concentration gradient to a "lower-saline material" less concentrated in the ions. The term "saline material" refers to aqueous mixtures including dissolved salts such as halides, carbonates, bicarbonates, phosphates and sulfates of sodium, potassium, calcium, lithium, magnesium, ammonium, zinc or copper. A saline material is an aqueous solution that includes more than 50% ammonium bicarbonate, by weight, according to embodiments of the present invention. Saline materials include brackish water, saline water, and brine. The term "lower saline material" refers to aqueous fluids which may or may not contain dissolved salts but which contain a lower concentration of dissolved salts than a reference saline material. Fresh water is a lower-saline material. However, as will be appreciated, the terms saline material and lower-saline material are relative and it is sufficient that the saline material used be higher in concentration of dissolved salts initially than the lower-saline material such that a concentration gradient is present which allows for spontaneous movement of the dissolved salts from the saline material across the ion selective barriers to the lower-saline material. The term "fresh water" refers to water having less than 0.5 parts per thousand dissolved salts. The term "brackish water" refers to water having 0.5-30 parts per thousand dissolved salts. The term "saline water" refers to water having greater than 30-50 parts per thousand dissolved salts. The term brine refers to water having greater than 50 parts per thousand dissolved salts.

An electromotive force established by a difference in the concentration of dissolved salts in the saline material compared to the lower-saline material (the saline ratio) drives ions across an anion selective barrier and a cation selective barrier, thereby increasing the potential between the anode and cathode. The saline ratio between the saline material and the lower-saline material introduced into the saline material compartment and lower-saline material compartment is greater than 1:1.

One or more supports, gaskets, spacers and/or seals may be used to inhibit movement of fluids between adjacent compartments of systems of the present invention and to provide structural support for the RED subunits.

Embodiments of systems of the present invention are configured such that saline material and lower-saline material are introduced in batches or as a continual flow. Saline materials and lower-saline materials can be introduced and subsequently removed when the difference in concentration of dissolved salts between the saline material and lower-saline material has been reduced, i.e. the reactor can be operated in batch mode. Alternatively, saline material and/or lower-saline material can continuously flow into the respective saline material compartments and lower-saline material compartments.

One or more channels for inlet and outlet of materials, such as gases, an organic substance oxidizable by the anodophilic bacteria, saline material and lower-saline material can be included for continual flow or batch operation of devices of the present invention.

For continual flow operation, flow paths of the saline material and lower-saline material compartments can be co-current, i.e. in the same direction, or counter-current, i.e. in opposite directions.

Figure 5A:
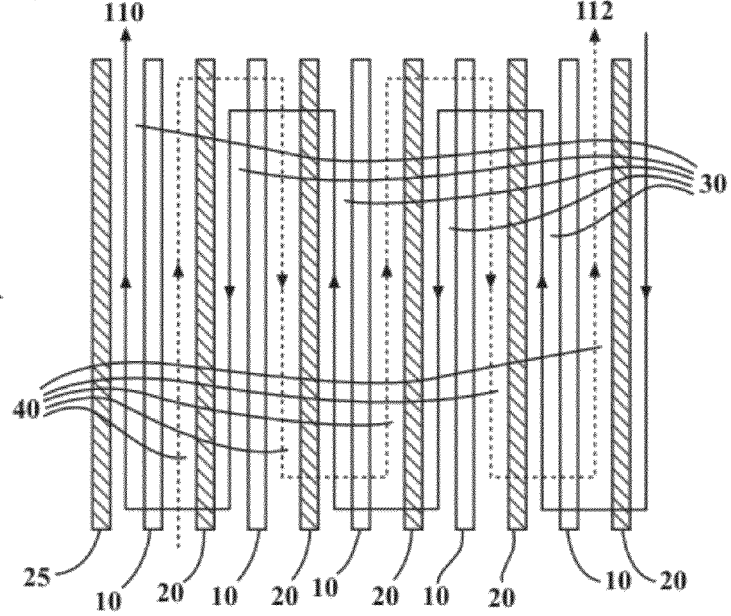
FIG. 5A is a schematic illustration of counter-current flow paths of a saline material and a lower-saline material through saline material compartments or lower-saline material compartments, respectively.
Figure 5B:
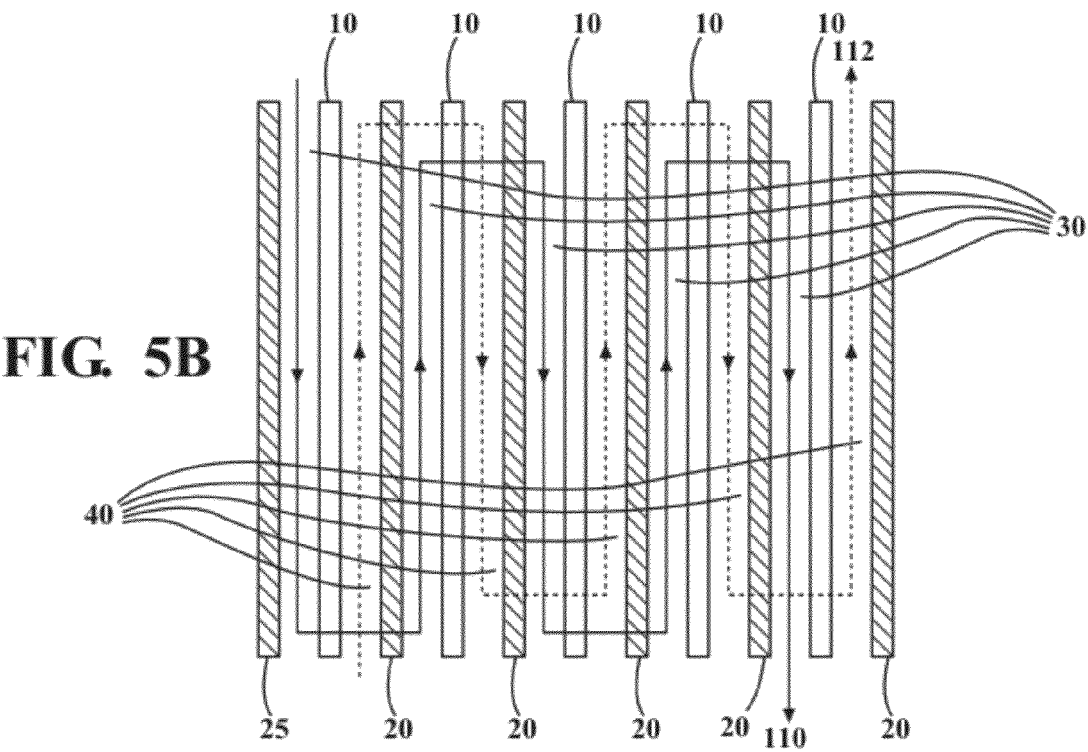
FIG. 5B is a schematic illustration of co-current flow paths of a saline material and a lower-saline material through saline material compartments or lower-saline material compartments, respectively.
Figure 5C:
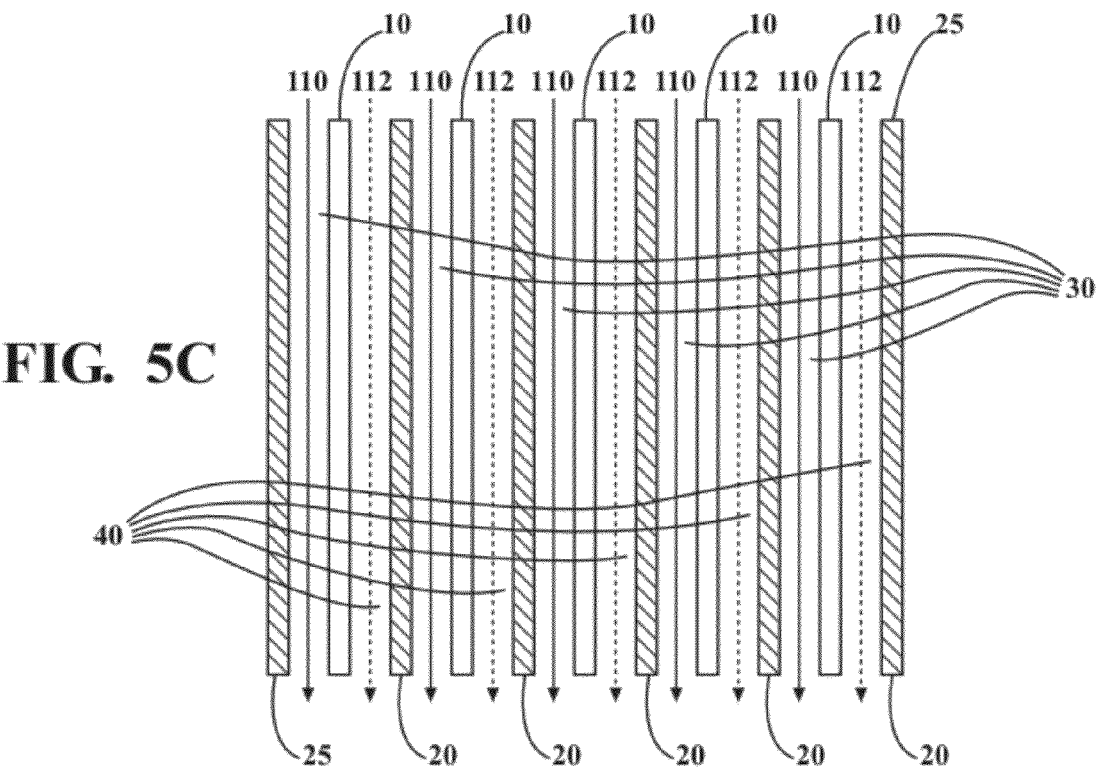
FIG. 5C is a schematic illustration of parallel flow paths of a saline material and a lower-saline material through saline material compartments or lower-saline material compartments, respectively.

In FIGS. 5A, 5B and 5C, the five RED subunits and the cathode protective anion-selective barrier included in the RED system shown in FIG. 4 are shown in isolation from the reaction chamber are shown to illustrate flow paths of the saline material or lower-saline materials through saline material compartments or lower-saline material compartments, respectively.

FIG. 5A is a schematic illustration of the flow path of a saline material 110 and the flow path of a lower-saline material 112 in counter-current configuration through saline material compartments or lower-saline material compartments, respectively. Alternately placed cation-exchange membranes 10 and anion-exchange membranes 20 between saline-material compartments 30 and lower saline material compartments 40 are shown along with anion-exchange membrane 25.

FIG. 5B is a schematic illustration of the flow path of a saline material 110 and the flow path of a lower-saline material 112 in co-current configuration through saline material compartments or lower-saline material compartments, respectively. Alternately placed cation-exchange membranes 10 and anion-exchange membranes 20 between saline-material compartments 30 and lower saline material compartments 40 are shown along with anion-exchange membrane 25.

FIG. 5C is a schematic illustration of the flow path of a saline material 110 and the flow path of a lower-saline material 112 in parallel configuration through saline material compartments or lower-saline material compartments, respectively. Alternately placed cation-exchange membranes 10 and anion-exchange membranes 20 between saline-material compartments 30 and lower saline material compartments 40 are shown along with anion-selective membrane 25.

Each individual saline material or lower-saline material compartment can have an inlet and/or outlet for the flow of material into the compartment. MRCs of the present invention optionally include a flow path for saline material which is continuous through two or more saline material compartments and further optionally include a flow path for lower-saline material which is continuous through two or more lower-saline material compartments.

Figure 6:
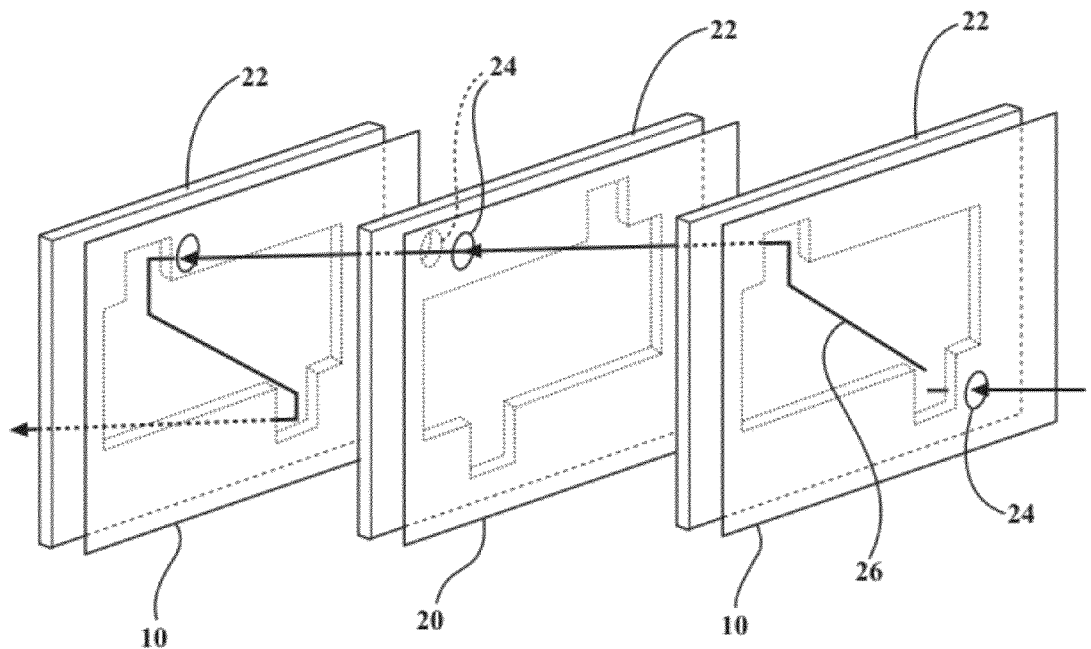
FIG. 6 is a schematic illustration of an anion-selective barrier, two cation-selective barriers, gaskets and a flow path for a lower-saline material.

FIG. 6 is a schematic illustration of a portion of a RED system and shows two cation-selective barriers 10, an anion-selective barrier 20, and gaskets 22. Channels 24 in the barriers and gaskets allow for directed flow of saline material or lower saline material along a selected flow path, 26. As will be appreciated by the skilled artisan, the flow path shown in FIG. 6 is exemplary and other flow paths are encompassed by the present invention.

Embodiments of inventive devices include spiral wound ion selective barrier pairs. In a "spiral wound" configuration, an inventive device is generally cylindrical in shape and includes at least one anode, at least one cathode, at least one ion selective barrier pair having a spacer disposed between the anion selective barrier and the cation selective barrier of each ion selective barrier pair and a cathode protective anion selective barrier. One of the electrodes, the inner electrode, is disposed in an inner position and the at least one ion selective barrier pair is wound radially with respect to the inner electrode. A second electrode, the outer electrode, is disposed in an outer position such that the at least one ion selective barrier pair is between the inner electrode and the outer electrode and the cathode protective anion selective barrier is adjacent the cathode. Each ion selective barrier pair defines a saline material compartment disposed there between. One or more seals can be used to inhibit fluid leakage between adjacent compartments.

The volumes of the compartments can be varied to suit specific needs that vary depending on, for example, concentration of dissolved salts, organic loading and current densities.

Broadly described, MRCs include anodophilic microbes, such as anodophilic bacteria, for generation of electrons for production of electricity or hydrogen, respectively. MRCs include an anode, a cathode and an electron conductor connecting the anode and cathode. Anodophilic microbes, such as anodophilic bacteria, capable of oxidizing a substrate to produce electrons are included in MRCs.

In operation of an MRFC device of the present invention, a provided oxidizable substrate is oxidized by anodophilic microbes, such as anodophilic bacteria which generate electrons and protons. Where the substrate is an organic substrate carbon dioxide is also produced. The electrons are transferred to the anode, and optionally, through a load such as a device to be powered, to the cathode. Protons and electrons react with oxygen at the cathode, producing water. Ions present in a saline material are driven down a concentration gradient through the ion selective material present in the MRFC to a lower-saline material, producing power which contributes to total power production of the MRFC.

In MREC operation, a provided oxidizable substrate is oxidized by anodophilic microbes, such as anodophilic bacteria, which generate electrons and protons. Where the substrate is an organic substrate carbon dioxide is also produced. Ions present in a saline material are driven down a concentration gradient through the ion selective material present in the MREC to a lower-saline material, producing power which provides at least a portion of the power required. An additional power source is optionally connected to the MREC and an additional voltage is applied. The electrons generated by the anodophilic microbes, such as anodophilic bacteria, are transferred to the anode, and, through a conductive connector, to the cathode. Oxygen is substantially excluded from the cathode area such that protons and electrons combine at the cathode, producing hydrogen.

Additional products at the cathode are also produced according to embodiments of the present invention. For example methane is produced by methanogens (methanogenic microbes, such as methanogenic bacteria) disposed in the cathode compartment of an MREC and this can be collected and used according to embodiments of the present invention. Hydrogen peroxide is produced in an MRC which excludes the typically included non-microbial catalyst in the cathode compartment, and this can be collected and used according to embodiments of the present invention. Caustic water is produced in the cathode compartment of both MRCs and MRECs and this can be collected and used according to embodiments of the present invention. In a further example, organic materials, such as acetate, are synthesized by produced by microbes disposed in the cathode compartment of an MRC and these organic materials can be collected and used according to embodiments of the present invention.

Microorganisms present on the cathode and/or in a cathode chamber include at least one or more species of methanogenic microbes also called methanogens herein. The terms "methanogens" and "methanogenic microorganisms" as used herein refer to microorganisms characterized by the capacity to perform an eight-electron reduction of carbon dioxide to methane. The major energy-yielding metabolic reactions of methanogens utilize substrates such as acetate; formate; alcohols such as methanol, ethanol or propanol; acetone; methyl amines, dimethyl sulfide, or hydrogen resulting in reduction of carbon dioxide to methane. Methanogenic bacteria are archaebacteria and are obligate anaerobes. Any of various methanogens can be used, illustratively including *Methanobacterium bryantii*; *Methanobacterium formicum*; *Methanobrevibacter arboriphilicus*; *Methanobrevibacter gottschalkii*; *Methanobrevibacter ruminantium*; *Methanobrevibacter smithii*; *Methanocalculus chunghsingensis*; *Methanococcoides burtonii*; *Methanococcus aeolicus*; *Methanococcus deltae*; *Methanococcus jannaschii*; *Methanococcus maripaludis*; *Methanococcus vannielii*; *Met hanocorpusculum labreanum*; *Methanoculleus bourgensis*; *Methanogenium olentangyi*; *Methanogenium bourgense*; *Methanoculleus marisnigri*; *Methanofollis liminatans*; *Methanogenium cariaci*; *Methanogenium frigidum*; *Methanogenium organophilum*; *Methanogenium wolfei*; *Methanomicrobium mobile*; *Methanopyrus kandleri*; *Methanoregula boonei*; *Methanosaeta concilii*; *Methanosaeta thermophila*; *Methanosarcina acetivorans*; *Methanosarcina barkeri*; *Methanosarcina mazei*; *Methanosphaera stadtmanae*; *Methanospirillum hungatei*; *Methanothermobacter defluvii*; *Methanothermobacter thermautotrophicus*; *Methanothermobacter thermoflexus*; *Methanothermobacter wolfei*; *Methanothrix soehngenii*; *Methanobacterium palustre*; and combinations of any of these and/or other methanogens. Methanogens and conditions for their growth and maintenance are known, as exemplified herein and in M. Dworkin et al., The Prokaryotes, Springer; 3rd edition, 2007.

Methanogens are preferably in contact with a cathode for direct transfer of electrons from the cathode. However, the methanogens may be present elsewhere in the reactor and still function to reduce carbon dioxide to methane using electrons according to embodiments of an inventive process.

Methanogens may be provided as a purified culture, enriched in methanogens, or even enriched in a specified species of microorganism, if desired. Methanogens can be selected or genetically engineered that can increase methane production.

Further, a mixed population of methanogens may be provided, including more than one type of methanogen and optionally including other methanogenic microorganisms.

Advantageously, the rate of power or hydrogen production in an MRC MREC of the present invention can be controlled by setting the flow rate of the saline material and the lower-saline material. Further, a system as an MREC is operated anaerobically such that aeration of the water is avoided if dissolved oxygen is used at the cathode for reduction. If a chemical catholyte, such as ferricyanide, is used then it would have to be regenerated and desalinated.

As will be appreciated, as ionic transport occurs through the ion-exchange membranes between saline material compartments and lower-saline material compartments, the salt concentration difference between the saline material compartments and lower-saline material compartments, reduces with operation of the MRC system. To avoid reduction in current output and/or hydrogen generation, the lower saline material and/or saline material is replaced, either in batch mode or by continual flow, such as by an external pumping system of the saline material and/or lower saline material into the corresponding compartments (influent materials) and removal of the effluent.

As an example, where the saline material and lower-saline material are pumped to flow from the influent reservoirs, through the MRC reactor, and eventually to the respective effluent reservoirs.

According to embodiments of the present invention, a saline material is used which includes at least one salt of ions that become volatile gases upon application of heat, allowing separation of the salt from a solvent which is not significantly vaporized under conditions sufficient for volatilization of the salt(s). Such salts are termed "thermolytic salts."

An example of such a salt is ammonium bicarbonate, $NH_4HCO_3$.

Thus according to embodiments of the present invention, an included saline material is an aqueous solution that includes ammonium bicarbonate at or below its solubility limit, which is known to be 2.7 M (Speight 2005), but in practice approximately 1.8 M. Experimental results with a device of the present invention confirmed that the saline material concentration can be as low as 0.1 M for stable operation of MREC, while optimum concentration was found to be 0.9 M or higher for the saline material. A corresponding lower-saline material used has much less than this concentration of ammonium bicarbonate than that in the saline material used as the lower salinity solution, ranging from that of pure water to half that of the ammonium bicarbonate concentration used, while optimum concentration for the lower-saline material is one fiftieth of the saline material or smaller. Ammonium bicarbonate is volatilized at a temperature in the range of about 50° C.-95° C., such as 60° C.-90° C., without substantial vaporization of water in the aqueous solution, thereby separating the salt from the solvent.

During operation, saline material partially depleted of dissolved salts, or now in equilibrium with the non-saline solution, referred to as saline material effluent, is removed. Similarly, as ions move into the lower-saline material compartment, the amounts of dissolved salts increases and the resulting material, referred to as lower-saline material effluent, is removed. Removal can be achieved by continuous flow or by removal in batch mode.

In operation of an MRC in which the saline material is an aqueous solution that includes ammonium bicarbonate, $NH_4^+$ and $HCO_3^-$ ions cross the corresponding ion exchange barrier into a lower-saline material compartment. Upon removal of the effluent from the lower-saline material compartments, the effluent is heated. Upon application of heat to the effluent containing the $NH_4^+$ and $HCO_3^-$ ions, ammonia and carbon dioxide gases are evolved from the effluent and can be captured and condensed back into water. The effluent is thereby regenerated as a lower-saline material by removal of the ammonium bicarbonate and the regenerated lower-saline material can be reintroduced into lower-saline material compartments.

Alternatively, or in addition, the saline material effluent can be added to the lower-saline material effluent to dilute it and the resulting material is regenerated lower-saline material which can be introduced into the lower-saline compartments. Optionally, the saline material effluent is heated to volatilize and remove ammonium bicarbonate.

The heat used to increase the temperature of the effluent to evolve the gases can be waste heat from any reaction or process. Thus, processes and systems according to such embodiments allow for capture of waste heat energy through regeneration of the lower-saline material. Alternatively, the heat used can be drawn from conventional sources. In a further alternative, the heat can be generated by a secondary process such as from water in solar energy cells.

Optionally, the saline material effluent and lower-saline material effluent are combined after removal from the respective compartments to regenerate a saline material which may be returned to the saline material compartment for re-use or discarded.

In a further option, one or more salts other than ammonium bicarbonate is present in the lower-saline material to minimize resistive loss in the RED subunit and/or stack. In such embodiments, the concentration of the additional salt or salts is less than the concentration of ammonium bicarbonate. The one or more additional salts are non-volatile such that no loss of the non-volatile salt occurs during the heating process to regenerate the lower-saline material. Preferably such additional salts do not form scale during the heating process such that the non-volatile salts are not lost during the heating process. An example of an additional include salt is potassium chloride.

Figure 7:
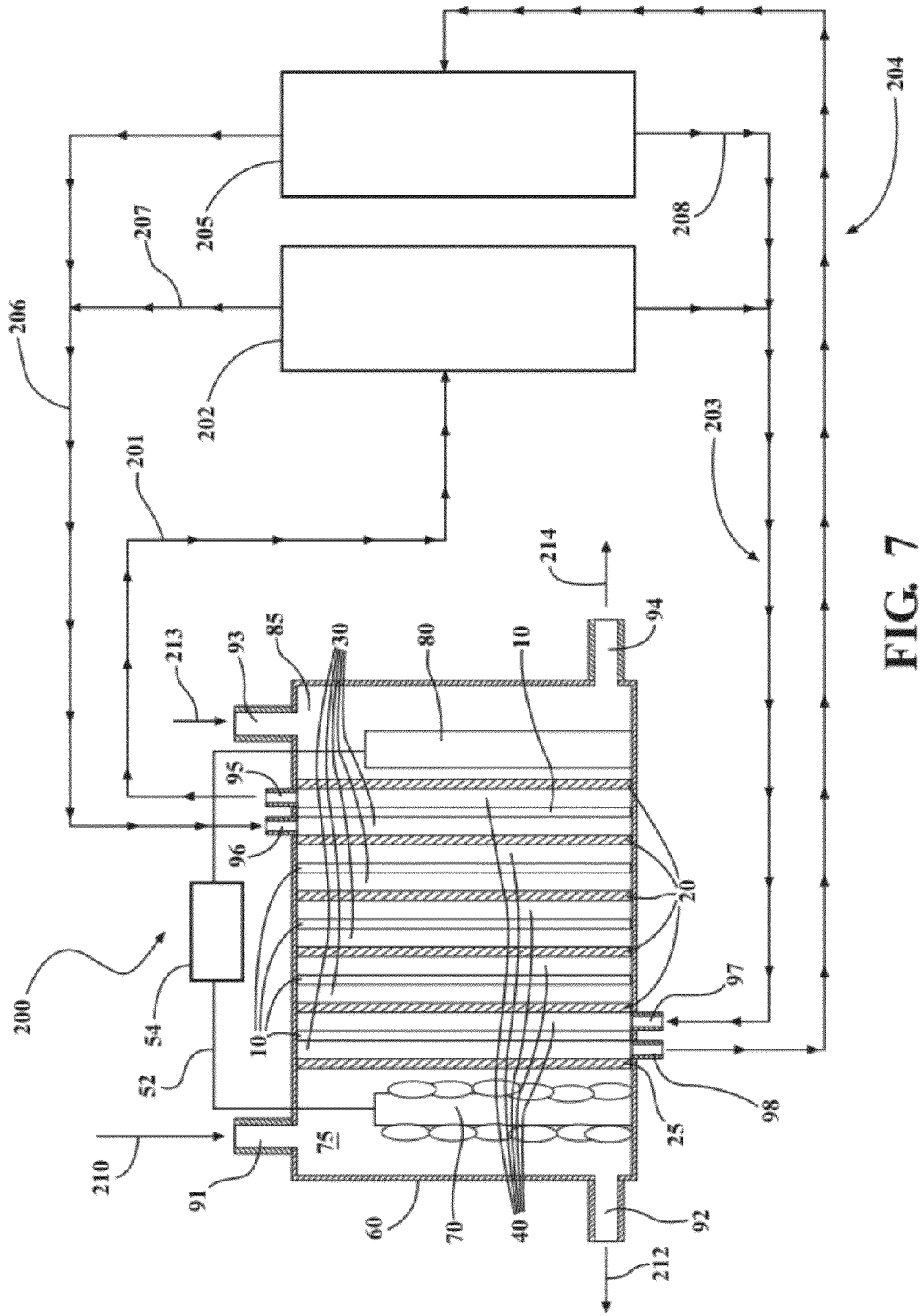
FIG. 7 is a schematic illustration of a system according to aspects of the present invention including a conduit for transport of a lower-saline material effluent from the lower-saline material compartment to a container having a first liquid containing portion adjacent a heat source, a vapor condenser portion and a second liquid containing portion for containing condensed vapor; and a conduit for transport of a regenerated lower-saline material from the second liquid containing portion for containing condensed vapor to the lower-saline material compartment.

FIG. 7 is a schematic diagram illustrating aspects of devices and processes of the present invention where one or both effluents circulated through the RED stack are regenerated in one or more distillation columns into a saline material (regenerated concentrate solution) and a lower-saline material (regenerated dilute solution). Here the anode and cathode solutions are shown as once-through, but they can be recycled. An MRC device according to aspects of the present invention is shown, including reaction chamber 200 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is shown at 52 along with a load and/or optional power supply 54. Alternately placed cation-exchange barriers 10 and anion-exchange barriers 20 define saline-material compartments 30 and lower saline material compartments 40 between the anode 70 and cathode 80. An anion-selective barrier 25 is an anion-selective barrier disposed between the cation-selective barrier 10 of an RED subunit closest to the anode and the anode 70, defining a cathode compartment 75. One or more channels for inlet and outlet of materials, such as gases, an organic substance oxidizable by the anodophilic bacteria, catholyte, saline material or lower saline material can be included, examples are shown at 91, 92, 93, 94, 95, 96, 97 and 98. Schematically shown are flow pathways for an anode solution, cathode solution, saline material and lower-saline material. Lower-saline material inlet flow path 203 is shown entering through inlet 97 a lower-saline material compartment 40 which is in liquid flow communication with each other lower-saline material compartment 40. The lower-saline material effluent exits through outlet 95 by lower-saline material effluent flow path 201 to reach distillation column 202. Heat for volatilization of ammonium bicarbonate in the lower-saline material effluent may be derived from a waste heat process and/or heat exchanger.

Saline material inlet flow path 206 is shown entering through inlet 96 a lower-saline material compartment 30 which is in liquid flow communication with each other saline material compartment 30.

Optionally, the saline material effluent exits through outlet 98 by saline material effluent flow path 204 to reach distillation column 205. Heat used to heat the saline material effluent may be derived from a waste heat process and/or heat exchanger. Salt may be added to the saline material effluent to regenerate the saline material. The salt may be collected from the volatilized/condensed ammonium bicarbonate from distillation column 202 or from another source. Alternatively, some of the water in the saline material effluent may be vaporized and removed to concentrate the salt therein. In a further alternative, the saline material effluent is combined with the lower-saline material effluent to dilute it and produce a regenerated lower-saline material.

Saline material 207 recovered from the lower-saline effluent may be added to the saline material flow path 206. Lower-saline material 208 which may be recovered from the saline material effluent can be added to the lower-saline material flow path 203.

According to aspects of the present invention, an MRC device includes a bipolar membrane disposed adjacent the anode. A bipolar membrane is made by laminating an anion-exchange and a cation-exchange membrane. At the interface between the anion-exchange and cation-exchange membranes, water is split into protons and hydroxyl ions. Protons are transferred through the section of the cation-exchange membrane, while hydroxyl ions are driven toward the anode. As a result, the bipolar membrane can be used as a barrier against ammonia cross-over. This minimizes accumulation of ammonia and loss of the salt solution in the anode chamber.

According to aspects of the present invention, an MRC device includes a saline material compartment disposed adjacent the anode. While a saline material compartment is located next to the anode chamber as shown in FIG. 3, the RED stack can also be designed with a lower-saline material compartment next to the anode chamber. This RED design minimizes accumulation of ammonia and loss of the salt solution in the anode chamber.

In a further option, a non-ammonium based salt solution, such as sodium bicarbonate is present in the compartment adjacent to the anode. This RED design minimizes accumulation of ammonia and loss of the salt solution in the anode chamber. This stream of non-ammonium based salt solution, such as sodium bicarbonate, may be kept separate from the other stack solutions, i.e. the saline material and the lower-saline material.

In a further option, the saline material first flows through the cathode chamber and then into the one or more saline material compartments. This may help to better maintain pH in the cathode chamber.

In a further option, a sodium bicarbonate solution is present in the cathode chamber.

Optionally, wastewater is the lower-saline material introduced into the anode chamber. In a further option, wastewater or treated wastewater is the lower-saline material introduced into the lower-saline material chamber.

Organic matter may be added to the anode chamber.

Electrodes Generally

Electrodes included in an MRC or MREC according to the present invention are electrically conductive. Exemplary conductive electrode materials include, but are not limited to, carbon paper, carbon cloth, carbon felt, carbon wool, carbon foam, carbon mesh, activated carbon, graphite, porous graphite, graphite powder, graphite granules, graphite fiber, a conductive polymer, a conductive metal, and combinations of any of these. A more electrically conductive material, such as a metal mesh or screen can be pressed against these materials or incorporated into their structure, in order to increase overall electrical conductivity of the electrode.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 90 degrees with respect to the longest dimension of the cathode.

Electrodes of various sizes and shapes may be included in an inventive system. For example, tubular electrodes can be used as described in Logan, B. E., et al., Environmental Science & Technology 41, 3341-3346 (2007), where the water to be treated flows around tubes containing the water that will contain the higher concentrations of salts (or vice versa). Electrodes can be placed in a co-cylindrical arrangement, or they can be wound as flat sheets into a spiral membrane device.

In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In addition, a larger anode surface is typically advantageous to provide a growth surface for anodophiles to transfer electrons to the anode. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes.

In preferred embodiments, the electrodes are closely spaced to maximize performance of the system, so the compartment width for the saline material compartments and lower-saline material compartments can be very thin, such as, but not limited to, 0.05-10 millimeters, inclusive, more preferably in the range of 0.1-5 millimeters, inclusive, and still more preferably in the range of 0.3-2 millimeters inclusive.

In further examples, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. For example, in a particular embodiment where a large volume of substrate is to be metabolized by microbial organisms in a reactor, a larger area of anodic surface may be provided. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor. The ratio of the total surface area of the one or more anodes to the total volume of the interior of the reaction chamber is in the range of about 10000:1-1:1, inclusive, square meters per cubic meter in particular embodiments. In further embodiments, the ratio is in the range of about 5000:1-100:1.

Specific surface area of an electrode included in an MRC is greater than 100 $m^2/m^3$ according to embodiments of the present invention. Specific surface area is here described as the total surface area of the electrode per unit of electrode volume. Specific surface areas greater than 100 $m^2/m^3$ contribute to power generation in MRCs according to embodiments of the present invention. In further embodiments, MRCs according to the present invention include an electrode having a specific surface area greater than 1000 $m^2/m^3$. In still further embodiments, MRCs according to the present invention include an electrode having a specific surface area greater than 5,000 $m^2/m^3$. In yet further embodiments MRCs according to the present invention include an electrode having a specific surface area greater than 10,000 $m^2/m^3$. An electrode configured to have a high specific surface area allows for scaling of MRCs according to the present invention.

A high specific surface area electrode is configured as a mesh of carbon-based material or a brush in particular embodiments.

Anodes

Typically, an anode provides a surface for attachment and growth of anodophilic bacteria and therefore an anode is made of material compatible with bacterial growth and maintenance. Compatibility of a material with bacterial growth and maintenance in a microbial fuel cell may be assessed using standard techniques such as assay with a viability marker such as Rhodamine 123, propidium iodide, SYTO 9 and combinations of these or other bacteria viability markers.

An anode included in embodiments of MRCs according to the present invention includes fibers of a conductive anode material, providing a large surface area for contact with bacteria in a microbial fuel cell.

Specific surface area of an anode included in MRCs is greater than 100 $m^2$/according to embodiments of the present invention. Specific surface area is here described as the total surface area of the anode per unit of anode volume. Specific surface areas greater than 100 $m^2/m^3$ contribute to power generation in MRCs according to embodiments of the present invention. In further embodiments, MRCs according to the present invention include an anode having a specific surface area greater than 1000 $m^2/m^3$. In still further embodiments, MRCs according to the present invention include an anode having a specific surface area greater than 5,000 $m^2/m^3$. In yet further embodiments, MRCs according to the present invention include an anode having a specific surface area greater than 10,000 $m^2/m^3$. An anode configured to have a high specific surface area allows for scaling of MRCs and MRECs according to the present invention.

A high specific surface area anode is configured as a mesh of carbon-based material in particular embodiments.

A brush anode is provided in particular embodiments which has a specific surface area greater than 100 $m^2/m^3$. A brush anode includes one or more conductive fibers. In particular embodiments the one or more fibers are attached to a support.

A plurality of fibers is attached to the support and the fibers extend generally radially from the support in specific embodiments. A brush anode optionally includes a centrally disposed support having a longitudinal axis.

Brush anodes include a variety of configurations illustratively including various twisted wire brush configurations and strip brush configurations. For example, a particular twisted wire brush configuration includes a support formed from two or more strands of wire and fibers attached between the wires. In a further example, a strip brush configuration includes fibers attached to a conductive backing strip, the strip attached to the support.

Fibers of a brush anode are electrically conductive and are in electrical communication with the support and with a cathode. In particular embodiments, fibers and/or support of a brush anode provide a support for colonization by anodophilic bacteria, such that the brush anode is preferably substantially non-toxic to anodophilic bacteria.

In particular embodiments, fibers of a brush anode include a metallic and/or non-metallic conductive material which is substantially non-toxic to anodophilic bacteria. In a specific example, fibers include carbon fibers. Carbon fibers are optionally substantially composed of graphite. In a further option, a carbon material is mixed with a conductive polymer to form a fiber. In still further embodiments, a polymer fiber is coated with a conductive carbon material.

The carbon fibers or other carbon material may be heated in order to remove compounds that can interfere with power generation. Carbon mesh active surface area and charge transfer coefficient can be measured to determine the optimal time and temperature for heat treatment to reduce compounds that can interfere with power generation. In one example, heating the carbon fibers or other carbon material to 450 degrees C. for 30 minutes removes material that can interfere with power generation.

A brush anode electrode may include any of various coatings. In particular embodiments a coating is included on a brush anode to increase the efficiency of power production by bacteria on the anode. For example, a brush anode electrode may be coated with a material which increases the conductivity of electrons from bacteria to a surface. Examples of materials which increase the conductivity of electrons from bacteria to a surface include, but are not limited to, neutral red, $Mn^{4+}$, $Fe_3O_4$, $Ni^{2+}$, fluorinated polyanilines, such as poly(2-fluoroaniline) and poly(2,3,5,6-tetrafluoroaniline) for example, anthraquinone-1,6-disolfonic acid (AQDS), 1,4-naphthoquinone (NQ), and combinations of any of these.

In a particular embodiment, an anode is treated with an ammonia gas process to increase power production and reduce the time needed to generate substantial power once the reactor is inoculated. For example, a brush anode is treated with a heated ammonia gas, such as $NH_3$ gas. In a specific embodiment, a brush anode is heated to 700° C. and incubated with $NH_3$ gas for about one hour.

Additional materials are optionally included in a brush anode, for example to strengthen and support the graphite fibers or to help clean the system by removing biofilm in cases where the brushes can be moved around or swirled to clean the adjoining surfaces, cathodes or other materials.

Cathodes

A cathode included in an MRC according to embodiments of the present invention may be configured to be immersed in liquid or as a gas cathode, having a surface exposed to a gas. A cathode preferably includes an electron conductive material. Materials included in a cathode included in an inventive system illustratively include, but are not limited to, carbon paper, carbon cloth, carbon felt, carbon wool, carbon foam, graphite, porous graphite, graphite powder, activated carbon, a conductive polymer, a conductive metal, and combinations of any of these.

In particular embodiments, a cathode included in an MRC of the present invention is an air cathode, also known as a gas cathode.

In particular embodiments, a cathode included in an MRC of the present invention is a biocathode and thus not require a metal catalyst on the cathode Biocathodes are electrodes containing bacteria that are capable of accepting electrons, called exoelectrotrophs, from the electrode, and transferring them to a chemical that accepts those electrons such as oxygen, nitrate or carbon dioxide. Biocathodes have been developed for hydrogen evolution as described in Rozendal, R. A. et al., Environmental Science & Technology 42, 629-634 (2008), oxygen reduction as described in Clauwaert, P. et al. Environmental Science & Technology 41, 7564-7569 (2007), methane generation as described in Cheng, S. et al., Environmental Science & Technology, doi: 10.1021/es803531g), and nitrate reduction Clauwaert, P. et al., Environmental Science & Technology 41, 3354-3360 (2007).

Optionally, the cathode includes a membrane and the membrane forms a cathode wall. The cathode wall has an external surface and an internal surface and the wall defines an interior space adjacent to the internal surface and an exterior adjacent to the external surface. The cathode wall forms a shape which is generally cylindrical in particular embodiments. In further particular embodiments, the shape formed by the cathode wall is generally slab or brick-shaped, having a hollow interior. Other hollow shapes are also possible, illustratively including hollow disc-shaped.

A membrane forming a cathode wall is a porous membrane. The membrane is sufficiently porous to allow diffusion of a desired material through the membrane. For example, an included membrane is porous to oxygen, protons and/or hydrogen gas in particular embodiments of an inventive microbial fuel cell. In specific embodiments of an electricity generating configuration of a microbial fuel cell, an included membrane is porous to oxygen and protons. In specific embodiments of a hydrogen generating modified microbial fuel cell, an included membrane is porous to protons where a catalyst is present on or adjacent to the internal surface of the membrane. In further specific embodiments of a hydrogen gas generating modified microbial fuel cell, an included membrane is porous to protons and hydrogen gas where a catalyst is present on or adjacent to the external surface of the membrane. In preferred embodiments, the effective pores of an included membrane are smaller than the size of a typical bacterium, about 1000 nanometers. Thus, the flow of water and/or bacteria through the membrane and any included membrane coatings is restricted.

A membrane included in a cathode of the present invention is not limited as to the material included in the membrane. Microfiltration, nanofiltration and ion exchange membrane compositions are known in the art and any of various membranes may be used which exclude bacteria and allow diffusion of a desired gas through the membrane. Illustrative examples of microfiltration, nanofiltration and/or ion exchange membrane compositions include, but are not limited to, halogenated compounds such as tetrafluoroethylene, tetrafluoroethylene copolymers, tetrafluoroethylene-perfluoroalkyl vinylether copolymers, polyvinylidene fluoride, polyvinylidene fluoride copolymers, polyvinyl chloride, polyvinyl chloride copolymers; polyolefins such as polyethylene, polypropylene and polybutene; polyamides such as nylons; sulfones such as polysulfones and polyether sulfones; nitrile-based polymers such as acrylonitriles; and styrene-based polymers such as polystyrenes.

A membrane optionally includes a structural support layer such as a porous plastic backing layer. For example, a membrane is optionally supported on a polyester layer. A support layer is flexible in preferred embodiments.

Examples of suitable membrane materials are ultrafiltration and nanofiltration membranes commonly employed in the water treatment industry to filter water while excluding bacteria. For example, a suitable membrane is ultrafiltration membrane B 0125 made by X-Flow, The Netherlands. Additional examples include CMI and AMI ion exchange membranes made by Membranes International, Inc. New Jersey, USA.

A membrane included in an inventive cathode includes a conductive material such that the membrane is electrically conductive and/or the membrane is coated on one side with a conductive material.

In particular configurations, one or more coatings are applied to the membrane in order to allow the material to become electrically conductive. For example, a metal or carbon containing coating is optionally applied to at least a portion of one side of the membrane. In a particular embodiment, a graphite coating is applied. An exemplary formulation of a graphite coating includes products of Superior Graphite, formulations ELC E34, Surecoat 1530.

Optionally, a membrane material is fabricated to include an electrically conductive material in the membrane, rendering a membrane made from the material electrically conductive. For example, carbon fibers may be mixed with a polymer typically used in an ultrafiltration, nanofiltration and/or ion exchange membrane.

Optionally, a catalyst for enhancing a desired reaction at the cathode is included in a cathode according to the present invention. Thus, a catalyst for enhancing reduction of oxygen is included in an electricity producing configuration of an MRC of the present invention. Further, a catalyst for enhancing reduction of protons to hydrogen gas, that is enhancing a hydrogen evolution reaction, is included in a hydrogen gas producing configuration of an MRC of the present invention. An included catalyst typically enhances the reaction kinetics, e.g. increases the rate of oxygen and/or proton reduction. In addition, a catalyst reduces a need for applied potential, the overpotential, for initiating oxygen and/or hydrogen reduction.

A catalyst is optionally applied to a conductive membrane. In a further option, a catalyst is mixed with a conductive material to form a mixture which is applied to a membrane. In a further option, a catalyst is applied to the membrane before or after application of a conductive material.

In particular embodiments, a catalyst is optionally mixed with a polymer and a conductive material such that a membrane includes a conductive catalyst material integral with the membrane. For example, a catalyst, is mixed with a graphite coating material and the mixture is applied to a cathode membrane.

Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production. In further embodiments, an included catalyst is, or includes, a non-noble metal containing catalyst such as CoTMPP and/or activated carbon. In embodiments of an MREC, a catalyst included in a system of the present invention is, or includes, molybdenum disulfide.

One or more additional coatings may be placed on one or more electrode surfaces. Such additional coatings may be added to act as diffusion layers, for example. A cathode protective layer, for instance, may be added to prevent contact of bacteria or other materials with the cathode surface while allowing oxygen diffusion to the catalyst and conductive matrix. In further embodiments, a cathode protective layer is included as a support for bacterial colonization such that bacteria scavenge oxygen in the vicinity of the cathode but do not directly contact the cathode.

A tube cathode included in an MREC according to embodiments of the present invention is open at one or both ends of its length to an oxygen-containing medium. In particular embodiments, a tube cathode included in an MREC is open at one or both ends to ambient air.

A tube cathode included in an MREC according to embodiments of the present invention is open at one end of its length to a receptacle or conduit for collection or passage of generated hydrogen gas.

As described above, a tube cathode according to the present invention has an interior space. The interior space of a tube cathode included in a microbial fuel cell configured for hydrogen generation according to embodiments of the present invention may be gas filled in one option. Thus, for example, the interior space of a tube cathode may initially contain ambient air at start-up and contain increased amounts of hydrogen as hydrogen generation proceeds during operation of the hydrogen generating microbial fuel cell. The generated hydrogen flows from the interior space of the tube cathode, for instance to a gas collection unit or device. In a further embodiment, the interior space is filled or partially filled with a liquid. Hydrogen generated during operation of the hydrogen generating microbial fuel cell moves from the liquid containing interior space, for instance to a gas collection unit or device, efficiently with little back pressure into the liquid in the interior space. The inclusion of a liquid in a tube cathode aids in hydrogen evolution since it results in phase separation of the hydrogen gas and liquid, reducing back diffusion into the anode compartment. Larger amounts of hydrogen are recovered using a liquid in the cathode interior space. A liquid included in the interior space may be any of various liquids compatible with the cathode materials and with hydrogen gas. Suitable liquids include aqueous liquids, such as water, which may contain one or more salts, buffers, or other additives.

In some embodiments, the cathode is operated so that water is pulled through the porous membrane material of the cathode, allowing contact of the water with the conductive coating or conductive matrix of the membrane. The membrane material can be enriched with carbon black to make it conductive, made with graphite fibers, or coated in a way that still permits water flow through the device.

Optionally, and preferably in some embodiments, the cathode is a gas cathode. In particular embodiments, an included cathode has a planar morphology, such as when used with a brush anode electrode. In this configuration, the cathode is preferably a gas diffusion electrode.

Optionally, an included cathode is disposed in an aqueous medium, with dissolved oxygen in the medium serving to react at the cathode.

In one embodiment of the invention a cathode membrane is substantially impermeable to water.

In particular embodiments, the cathode contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas. Thus, in one embodiment an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. Further, in an MREC, the CDL is hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

In a further embodiment, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. A CPL further acts to provide a support for bacterial colonization in the vicinity of the cathode, allowing for scavenging of oxygen in the cathode area without biofouling.

In one embodiment, a CPL is configured such that it is in contact with an inner surface of a cathode. Thus, for instance, a CPL may be configured to cover or surround the inner surface of the cathode partially or wholly, such as by bonding of the CPL to the cathode.

In a further embodiment, a CPL is present in the interior of the reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode and the catalyst. Further, a filter may be positioned between an inlet channel and/or outlet channel and the interior of the reaction chamber or a portion thereof. Suitable filters may be configured to exclude particles larger than 0.01 micron-1 micron for example. A CPL may also include material that aids bacterial attachment, so that bacteria can scavenge dissolved oxygen that can leak into the system.

Ion Exchange Materials

A cation exchange material is permeable to one or more selected cations. Cation exchange material is disposed between the cathode compartment and the saline material compartment forming a cation selective barrier between the cathode compartment and the saline material compartment. According to embodiments of the present invention, the cation exchange material is in the form of a cation exchange membrane. Cation exchange materials include, but are not limited to, ion-functionalized polymers exemplified by perfluorinated sulfonic acid polymers such as tetrafluoroethylene and perfluorovinylether sulfonic acid copolymers, and derivatives thereof; sulfonate-functionalized poly(phenylsulfone); and sulfonate-functionalized divinylbenzene cross-linked poly(styrene). Specific examples include NAFION, such as NAFION 117, and derivatives produced by E.I. DuPont de Nemours & Co., Wilmington, Del. Cation exchange materials include, for example, CMI cation exchange membranes made by Membranes International, Inc. New Jersey, USA. Also suitable are other varieties of sulfonated copolymers, such as sulfonated poly(sulfone)s, sulfoanted poly(phenylene)s, and sulfonated poly(imides)s, and variations thereof.

An anion exchange material is permeable to one or more selected anions. Anion exchange material is disposed between the anode compartment and the saline material compartment forming an anion selective barrier between the anode compartment and the saline material compartment. According to embodiments of the present invention, the anode exchange material is in the form of an anion exchange membrane.

Anion exchange materials include, for example, quaternary ammonium-functionalized poly(phenylsulfone); and quaternary ammonium-functionalized divinylbenzene cross-linked poly(styrene). Further examples include AMI ion exchange membranes made by Membranes International, Inc. New Jersey, USA. Tokuyama Corporation, JAPAN, also produces a range of anion exchange membranes such as AHA and A201 that can be included in a system according to embodiments of the invention. Fumatech, GERMANY, anion exchange membranes, FAA, can be included in a system according to embodiments of the invention.

Catalyst

Optionally, a catalyst for enhancing a desired reaction at the cathode is included in a cathode according to the present invention. Thus, a catalyst for enhancing reduction of oxygen is included in an MREC according to embodiments of the present invention. Further, a catalyst for enhancing reduction of protons to hydrogen gas, that is enhancing a hydrogen evolution reaction, is included in an MREC according to embodiments of the present invention. An included catalyst typically enhances the reaction kinetics, e.g. increases the rate of oxygen and/or proton reduction. In addition, a catalyst reduces a need for applied potential, the overpotential, for initiating oxygen and/or hydrogen reduction.

Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production. In further embodiments, an included catalyst is, or includes, a non-noble metal containing catalyst such as CoTMPP.

In particular embodiments, an MRFC includes an activated carbon material which provides high specific surface area for oxygen reduction.

For MREC, to produce hydrogen at the cathode, stainless steel, molybdenum disulfide and/or nickel can be included as a catalyst in particular embodiments.

Microbes

Anodophilic microbes are included in devices of the present invention. Anodophilic microbes included in embodiments of devices of the present invention include at least one or more species of anodophilic bacteria. The terms "anodophiles" and "anodophilic bacteria" as used herein refer to microbes, such as bacteria, that transfer electrons to an electrode, either directly or by endogenously produced mediators. In general, anodophiles are obligate or facultative anaerobes. The terms "exoelectrogens" and "exoelectrogenic" are also used to describe anodophilic microbes, such as yeast and anodophilic bacteria. Examples of anodophilic bacteria include bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in an inventive system are described in Bond, D. R., et al., Science 295, 483-485, 2002; Bond, D. R. et al., Appl. Environ. Microbial. 69, 1548-1555, 2003; Rabaey, K., et al., Biotechnol. Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; Logan, B. E., et al., Trends Microbiol., 14(12):512-518, 2006; and Logan, B. E. 2009. Exoelectrogenic bacteria that power microbial fuel cells. Nature Rev. Micro., 7(5):375-381. Exoelectrogenic yeast are exemplified by *Pichia anomala* as described in Prasad, D. et al. Biosens. Bioelectron. 22, 2604-2610 (2007).

Anodophilic microbes, such as anodophilic bacteria preferably are in contact with an anode for direct transfer of electrons to the anode. However, in the case of anodophilic microbes, such as anodophilic bacteria which transfer electrons through a mediator, the bacteria may be present elsewhere in the reactor and still function to produce electrons useful in an inventive process.

Anodophilic microbes, such as anodophilic bacteria may be provided as a purified culture, enriched in anodophilic bacteria, or even enriched in a specified species of bacteria, if desired. Pure culture tests have reported Coulombic efficiencies as high as 98.6% in Bond, D. R. et al., Appl. Environ. Microbiol. 69, 1548-1555, 2003. Thus, the use of selected strains may increase overall electron recovery and hydrogen production, especially where such systems can be used under sterile conditions. Bacteria can be selected or genetically engineered that can increase Coulombic efficiencies and potentials generated at the anode.

Further, a mixed population of anodophilic microbes, such as anodophilic bacteria may be provided, including anodophilic anaerobes and other bacteria.

Biodegradable Substrates

A biodegradable substrate included in a system according to embodiments of the present invention is oxidizable by anodophilic microbes, such as anodophilic bacteria or biodegradable to produce a material oxidizable by anodophilic microbes, such as anodophilic bacteria.

Anodophilic microbes, such as anodophilic bacteria can oxidize certain inorganic as well as organic materials. Inorganic materials oxidizable by microbes, such as anodophilic anodophilic bacteria are well-known in the art and illustratively include hydrogen sulfide.

A biodegradable substrate is an organic material biodegradable to produce an organic substrate oxidizable by anodophilic microbes, such as anodophilic bacteria in some embodiments. Any of various types of biodegradable organic matter may be used as "fuel" for bacteria in an MRC or MREC, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by anodophilic microbes, such as anodophilic bacteria are known in the art. Illustrative examples of an organic substrate oxidizable by anodophilic microbes, such as anodophilic bacteria include, but are not limited to, monosaccharides, disaccharides, amino acids, straight chain or branched $C_1$-$C_7$ compounds including, but not limited to, alcohols and volatile fatty acids. In addition, organic substrates oxidizable by anodophilic microbes, such as anodophilic bacteria include aromatic compounds such as toluene, phenol, cresol, benzoic acid, benzyl alcohol and benzaldehyde. Further organic substrates oxidizable by anodophilic bacteria are described in Lovely, D. R. et al., Applied and Environmental Microbiology 56:1858-1864, 1990. In addition, a provided substrate may be provided in a form which is oxidizable by anodophilic bacteria or biodegradable to produce an organic substrate oxidizable by anodophilic bacteria.

Specific examples of organic substrates oxidizable by anodophilic microbes, such as anodophilic bacteria include glycerol, glucose, acetate, butyrate, ethanol, cysteine and combinations of any of these or other oxidizable organic substances.

The term "biodegradable" as used herein refers to an organic material decomposed by biological mechanisms illustratively including microbial action, heat and dissolution. Microbial action includes hydrolysis, for example.

Mediators

Optionally, a mediator of electron transfer is included in an inventive system. Such mediators are exemplified by ferric oxides, neutral red, anthraquinone-1,6-disulfonic acid (ADQS) and 1,4-napthoquinone (NQ). Mediators are optionally chemically bound to the anode, or the anode modified by various treatments, such as coating, to contain one or more mediators.

General Aspects of MRCs

An MRC according to the present invention may be configured as a self-contained device in particular embodiments. Thus, for example, a quantity of a biodegradable substrate is included in the device and no additional substrate is added. In further options, additional substrate is added at intervals or continuously such that the MRC operates as a batch processor or as a continuous flow system.

Power Source

No power is required to be added to an MRC but may be added if desired. Power sources used for enhancing an electrical potential between the anode and cathode are not limited and illustratively include grid power, solar power sources, wind power sources, hydrogen and fuel cells. Further examples of a power source suitable for use in an inventive system illustratively include a DC power source and an electrochemical cell such as a battery or capacitor.

Power can be supplied by including a reference electrode and setting the anode or cathode potential.

Gas Collection

A gas collection system is optionally included in a gas producing MRC according to embodiments of the present invention.

Gases such as hydrogen, methane and carbon dioxide can be collected and may be stored for use, or directed to a point of use, such as to a hydrogen or methane fuel powered device.

For example, a gas collection unit may include one or more gas conduits for directing a flow of gas from the cathode or cathode compartment to a storage container or directly to a point of use.

A gas conduit is optionally connected to a source of a sweep gas. For instance, as a gas is initially produced, a sweep gas may be introduced into a gas conduit, flowing in the direction of a storage container or point of gas use.

For instance, a gas collection system may include a container for collection of hydrogen from the cathode. A collection system may further include a conduit for passage of gas. The conduit and/or container may be in gas flow communication with a channel provided for outflow of gas from the reaction compartment. Typically, the conduit and/or container are in gas flow communication with the cathode, particularly where the cathode is a gas cathode.

Gas produced from the anode is $CO_2$ rich and can be delivered to the cathode compartment to lower pH in the cathode compartment, thereby regulating and maintaining appropriate pH in both anode and cathode compartments during operation, in particular embodiments.

Reaction Conditions

An aqueous medium in an anode or cathode compartment of the reaction compartment of embodiments of an MRC is formulated to be non-toxic to bacteria in contact with the aqueous medium. Further, the medium or solvent may be adjusted to a be compatible with bacterial metabolism, for instance by adjusting pH to be in the range between about pH 3-9, preferably about 5-8.5, inclusive, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6): 1472-1480. Optionally, an aqueous medium in contact with anodophilic bacteria contains a dissolved substrate oxidizable by the bacteria.

In operation, reaction conditions include variable such as pH, temperature, osmolarity, and ionic strength of the medium in the reactor. In general, the pH of the medium in the reactor is between 3-9, inclusive, and preferably between 5-8.5, inclusive.

Reaction temperatures are typically in the range of about 10-40° C. for non-thermophilic bacteria, preferably 20-36° C., although the device may be used at any temperature in the range of 0 to 100° C., inclusive by including suitable bacteria for growing at selected temperatures. However, maintaining a reaction temperature above ambient temperature may require energy input and it is preferred to maintain the reactor temperature at about 15-25° C., inclusive without input of energy. Reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material.

In particular embodiments, an aqueous saline material used has a salt concentration in the range of 2 to 40 g/L of salt. Brine is optionally included in the cathode compartment and/or in one or more saline material compartments.

Reaction Chamber and Associated Components

A channel is included defining a passage from the exterior of the reaction chamber to the interior in particular embodiments. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of liquid or gas into and/or out of a reaction chamber.

Embodiments of inventive compositions and methods are illustrated in the following examples. These examples are provided for illustrative purposes and are not considered limitations on the scope of inventive compositions and methods.

EXAMPLES

Example 1

MRC Construction

For the outer chambers of the MRC, two blocks of Lexan were drilled to make a cylindrical cathode (18 mL) and anode (30 mL) chambers with a cross-sectional area of 7 cm$^2$. The air cathode was prepared with a platinum catalyst on the water side (3.5 mg Pt over 7 cm$^2$) with a Nafion binder, and four polytetrafluoroethylene diffusion layers were coated on the air side. The anode, a graphite fiber brush 2.7 cm in diameter and 2.3 cm long (Mill-Rose Lab Inc., OH), was inoculated with effluent from an existing MFC and enriched by operation in a conventional single chamber MFC. During this start-up stage, NaCl concentration was gradually raised so that the microbial activity would not be affected by salinity during the following MRC operation.

The RED stack in this example included 10 cells (called subunits herein) in total, with 5 seawater cells (saline material compartments) and 5 river water cells (lower-saline material compartments) alternately sandwiched between the anode and cathode chambers (FIG. 4). The RED stack contained 5 cation- and 6 anion-exchange membranes (Selemion CMV and AMV, Asahi glass, Japan). Intermembrane distance (cell width) was 1.3 mm, and each cell had a rectangular cross section (4×2 cm$^2$).

The corresponding empty bed volume of the MRC was 58.4 mL (anode chamber=30 mL; cathode chamber=18 mL; RED stack=10.4 mL). Seawater, introduced from the cathode side, flowed serially through each seawater cell (FIG. 4), while river water flowed in the opposite direction to the seawater flow. The system was operated with continuous flows of seawater and river water. Each solution from the influent reservoir was supplied into the MRC and pumped to the effluent reservoir at a fixed rate of 0.85 mL/min, unless otherwise noted. The pumping power for this flowrate was approximated by measuring the difference in the water head between the inlet and outlet of the MRC. All experiments were performed at 30° C. in a constant temperature room.

Solutions.

Synthetic seawater was a 600 mM solution of NaCl, while river water was prepared from deionized water at indicated concentrations of NaCl. The anode solution contained 1.0 g/L sodium acetate in a phosphate buffer (9.16 g/L Na$_2$HPO$_4$; 4.9 g/L NaH$_2$PO$_4$—H$_2$O; 0.62 g/L NH$_4$Cl; 0.26 g/L KCl) with minerals and vitamins.23 The synthetic seawater was used as the catholyte without an addition of any pH buffer.

Power Generation.

The MRC was operated at a fixed external resistance (1000Ω), except as noted. The potential drop across the resistor was recorded every 20 minutes using a multi-meter (Keithley Instruments, OH). Prior to obtaining polarization data the MRC was operated open circuit conditions for one hour and then the external resistance was successively increased every 20 minutes from 5 to 40000Ω.

Analyses.

Effluent seawater, river water, anolyte, and catholyte solutions were analyzed for conductivity and pH using probes (SevenMulti, Mettler-Toledo International Inc., OH). The anolyte COD (chemical oxygen demand) was determined according to standard methods (Hach Co., CO).[24]

The salinity driven energy across an ion-exchange membrane between the seawater and river water cells creates the junction potential ($\Delta\phi_{jct}$) quantified as:

$$|\Delta\phi_{jct}| = \frac{RT}{zF}\left[t_{counter}\ln\left(\frac{a^{sea}_{counter}}{a^{river}_{counter}}\right) - t_{co}\ln\left(\frac{a^{sea}_{co}}{a^{river}_{co}}\right)\right]$$

where R is the gas constant, T the absolute temperature, F the Faraday constant, z the ionic charge, a the activity, and t the transport number defined as the fractional contribution of the ionic flux to the current density in the ion-exchange membrane. The superscript sea indicates seawater and river the river water, while the subscripts counter and co indicate the counter- and co-ions for the ion-exchange membranes. The chemical activity ($a_i$) was calculated by multiplying the chemical concentration in molarity by the activity coefficient ($f_i$). The NaCl concentration was determined from the solution conductivity, and the activity coefficient was determined as:

$$\log f_i = -\frac{A|z_i|^2\sqrt{I_S}}{1 + Ba^0\sqrt{I_S}} - \log(1 + 0.018 m_i) + K_i I_S$$

The Debye-Hückel constants were A=0.5085 kg$^{1/2}$/mol$^{1/2}$ and B=0.3282 Å kg$^{1/2}$/mol$^{1/2}$. The ion size parameter (a$^0$) was 0.78 Å for both sodium and chloride, while $K_{Na}$=0.105 and $K_{Cl}$=−0.009 kg²/mol². $I_s$ is the ionic strength in molality, and in the molal concentration. This equation is valid for a NaCl solution up to 1.2 molality.

The ion flux efficiency ($\eta_{flux}$) was suggested in this study to define the 129 fractional contribution of the ion flux to the generated current in the MRC as:

$$\eta_{flux} = \frac{N_{CP}i}{FQz(c_{in}^{fresh} - c_{eff}^{fresh})}$$

where $N_{CP}$ is the number of cell pairs, i the current, Q the flowrate, and c the molar concentration of NaCl.

Coulombic Efficiency, Energy Recovery, and Energy Efficiency.

The Coulombic efficiency (CE) was calculated from the change in COD as:

$$CE = \frac{8\int i dt}{FV_{An}\Delta COD}$$

where i is the current, and $V_{An}$ is the volume of the anolyte.

The energy recovery ($r_E$) is the produced power normalized by the total energy provided to the MRC as:

$$r_E = \frac{P}{\Delta H_c n_s^{in}/t_B + X^{in}}$$

where P is the power produced (W), $\Delta H_c$ the heat of combustion of the substrate (J/mol), $n_s^{in}$ the amount of supplied substrate (mol), and $t_B$ the time span for each batch cycle. $X^{in}$ is the theoretical energy (W) estimated by the change in the free energy involving complete mixing of seawater and river water as:

$$X^{in} = 2RTQ\left(c_{in}^{river}\ln\frac{a_{in}^{river}}{a^{mixed}} + c_{in}^{sea}\ln\frac{a_{in}^{sea}}{a^{mixed}}\right)$$

The energy recovery ($r_{E,S}$) based on only the substrate energy used in the system is $$r_{E,S} = \frac{P}{\Delta H_c n_s^{in}/t_B}$$

Energy efficiency ($\eta_E$) is also used to examine RED performance. The energy efficiency is written as the ratio of the produced power to the change in the amount of energy that could be theoretically extracted in the MRC:

$$\eta_E = \frac{P}{\Delta H_c(n_s^{in} - n_s^{out})/t_B + X^{in} - X^{out}}$$

where $n_s^{out}$ is the amount of residual substrate in the anode chamber at the end of a batch cycle, $X^{out}$ the salinity driven energy remaining in the seawater and river water effluents. If we only consider the substrate energy, then the energy efficiency is $$\eta_{E,S} = \frac{P}{\Delta H_c(n_s^{in} - n_s^{out})/t_B}$$

Operation of MRC.

Figure 8:
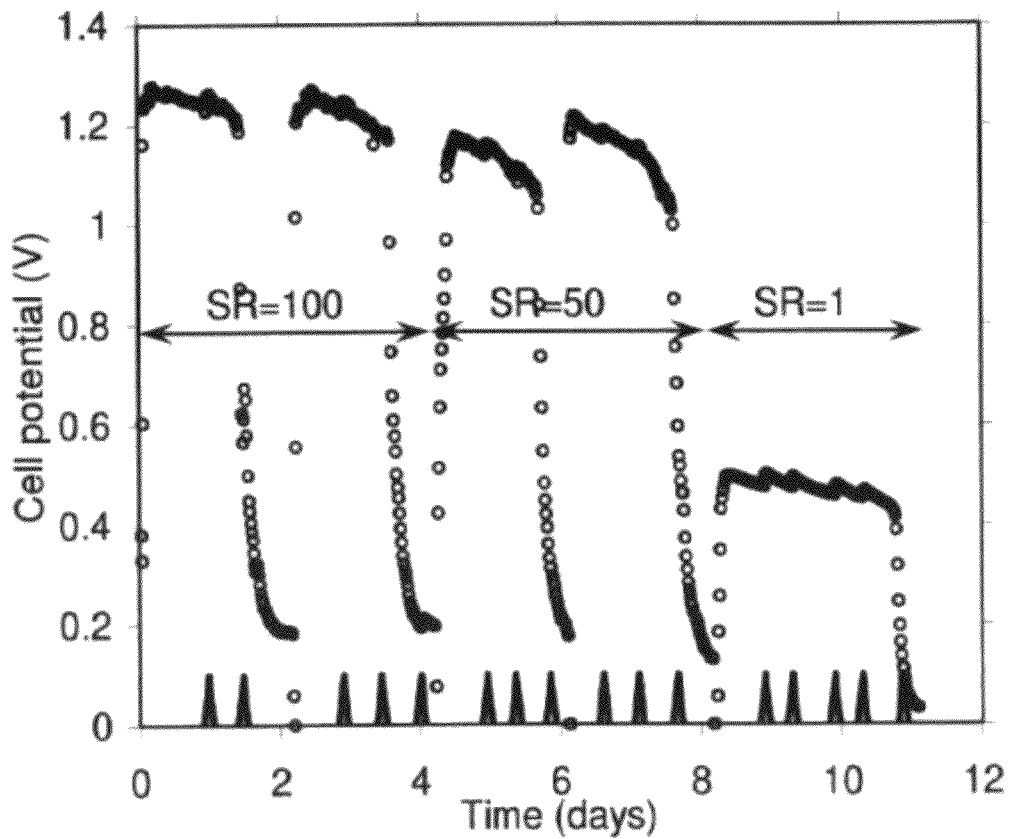
FIG. 8 is a graph showing voltage generation in an MRC over time at the indicated salinity ratios (SR)

The cell voltage from the MRC ranged from 1.2 V to 1.3 V for a salinity ratio (SR) of SR=100 (seawater=600 mM NaCl; river water=6 mM NaCl), with current densities of 1.2-1.3 mA (1000-Ω external resistance) (FIG. 8). When the SR was decreased to 50 by increasing the river water NaCl concentration to 12 mM, the cell voltage remained relatively unchanged (~1.1 to 1.2 V). A control experiment using an SR=1 produced <0.5 V, confirming that the high cell potential >1.1 V was due to the salinity driven energy from the RED stack (FIG. 8).

The seawater effluent from the MRC showed a ~1% reduction in salinity for SRs of 100 and 50.

The river water was concentrated through the RED stack from 6 to 11.5 mM for SR=100, and from 12 to 17.7 mM for SR=50. Based on the concentration change, the corresponding ionic flux efficiencies ($\eta_{flux}$) were 85% (SR=100) and 77% (SR=50). For these calculations, the current was averaged over an active voltage generation period (>1.1 V), with 1.24 mA (SR=100) or 1.16 mA (SR=50). The computed efficiency values correspond to the transport number for the counter ions of ~0.9, indicating no failures in the membrane integrity. The effluent pH from both the seawater and river water flows was near neutral (between 6 and 8), excluding possible contribution of $H^+$ or $OH^-$ to the electrical current.

The catholyte increased in pH to 11.8±0.5 for both SRs due to proton consumption from oxygen reduction at the air cathode. The cathode solution was replaced 2 to 4 times during a fed-batch cycle with synthetic seawater as it was thought that the catholyte pH might limit power production. However, each time the catholyte was replaced, there was little improvement in voltage (FIG. 8). In addition, the current generation was not limited by the catholyte pH when similar systems were operated without replacing the catholyte during a batch cycle (final pH ~12.5) indicating that MRC performance was not adversely affected by the high catholyte pH.

The anolyte pH decreased from 7 to 5.5±0.1 due to the proton production from substrate oxidation by the exoelectrogenic bacteria. While an acidic environment can inhibit microbial activity in MFCs, the COD removal during a fed-batch cycle was very high under these conditions, ranging from 96 to 99%. The total charge transfer during a fed-batch cycle was 160±8 Coulombs for an SR of 50 or 100. However, with an SR=1 (control), the total charge transfer decreased to 105 Coulombs. As a result, the Coulombic efficiency (CE) of ~64% was higher for SR=100 or 50 than the CE of ~45% for an SR=1. This higher Coulombic efficiency with SR=100 or 50 is considered to be a result of the shorter batch cycle of ~2 days, compared to ~3 days with SR=1 (FIG. 8). Since the MRC was started with a mixed culture inoculum, there were other non-exoelectrogenic microorganisms in the anode chamber. The substrate removal by these other microorganisms was likely less dependent of the SR and more dependent on the cycle time. This would result in less substrate lost to non-current generating processes with shorter batch cycles.

Salinity-Driven Energy vs. Resistance Losses.

The lower the salt concentration is in the river water, the greater salinity-driven potential the RED stack creates. The salinity-driven potential, created with the 5 pairs of the seawater and river water cells in the MRC, increased by 18% from 0.76 to 0.90 V with the increasing SR from 50 to 100 (calculated using equation above with $t_{counter}$=0.9). This increase in the salinity-driven potential with SR is consistent with the larger voltage produced during MRC operation at a fixed 1000-Ω external resistance (FIG. 8).

Figure 9A:
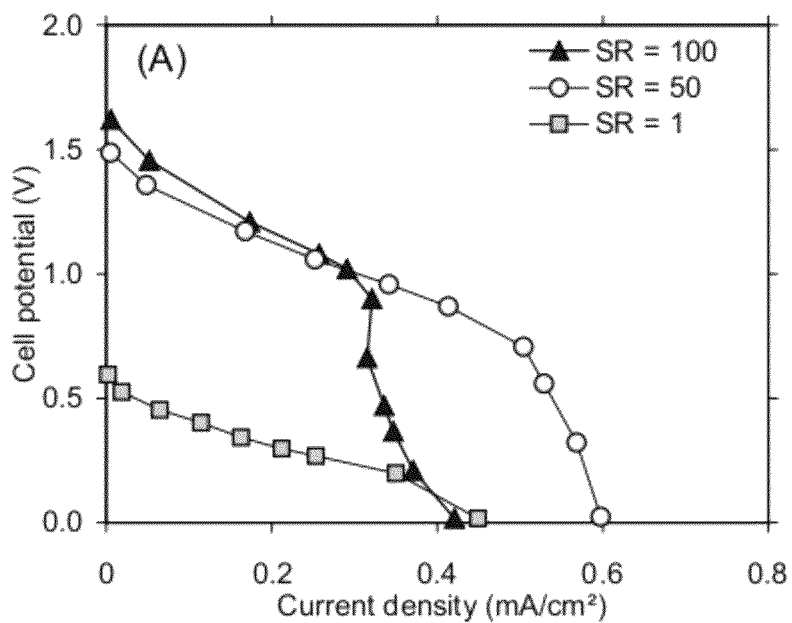
FIG. 9A is a graph showing polarziation at different salinity ratios in MRCs.
Figure 9B:
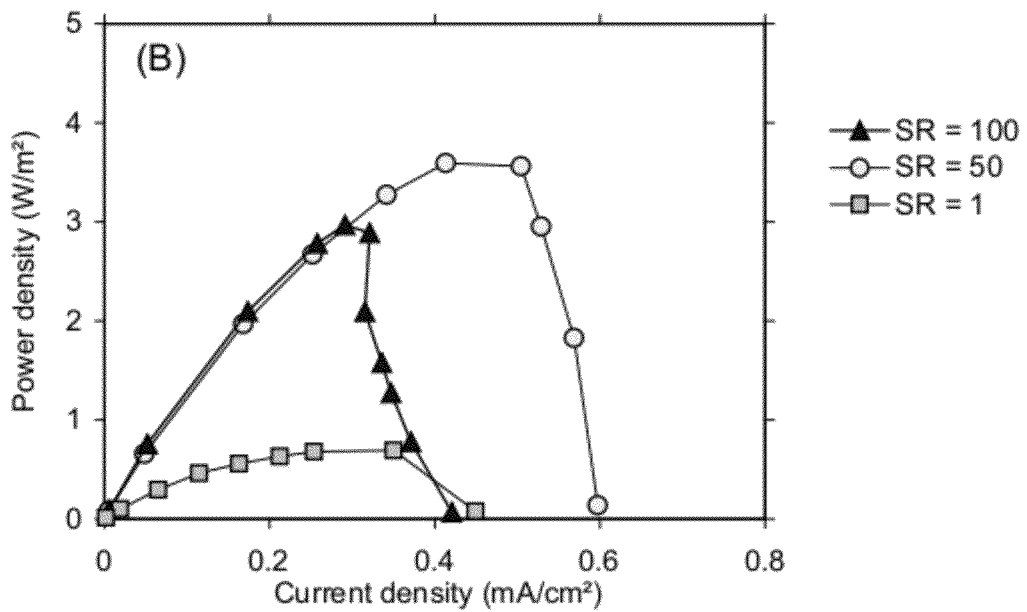
FIG. 9B is a graph showing power densities at different salinity ratios in MRCs.

The maximum cell potentials produced during polarization tests with an SR=100 were larger than those with an SR=50 at current densities below 0.3 mA/cm$^2$. However, this trend was reversed for current densities above 0.3 mA/cm$^2$ (FIG. 9A), resulting in much greater voltages with an SR=50. The rapid drop in the cell potential at 0.3 to 0.4 mA/cm$^2$ (SR=100) indicates that MRC performance was adversely affected by Ohmic resistances at the higher currents. The MRC with an SR=50 therefore achieved higher power densities, with a maximum power density of 3.6 W/m$^2$ as normalized by 7-cm$^2$ cathode area (84 W/m$^3$ as normalized by anolyte volume), compared to 3.0 W/m$^2$ for an SR=100 (FIG. 9B). Based on these polarization results, an SR=50 was the optimum here for operation, even though the observed cell potential was smaller at a high fixed external resistance of 1000Ω (FIG. 8).

Effects of Flowrate.

Figure 10A:
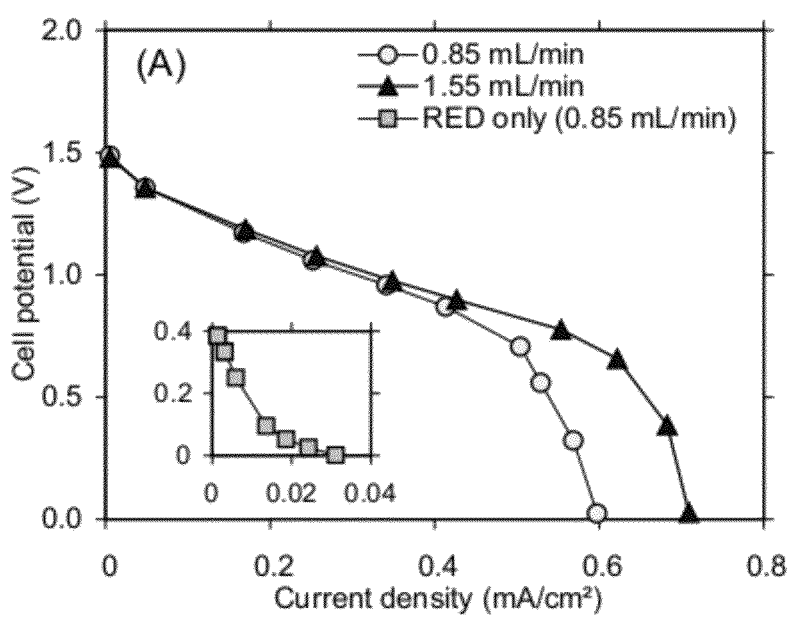
FIG. 10A is a graph showing polarization in MRCs at different flow rates where the SR=50.
Figure 10B:
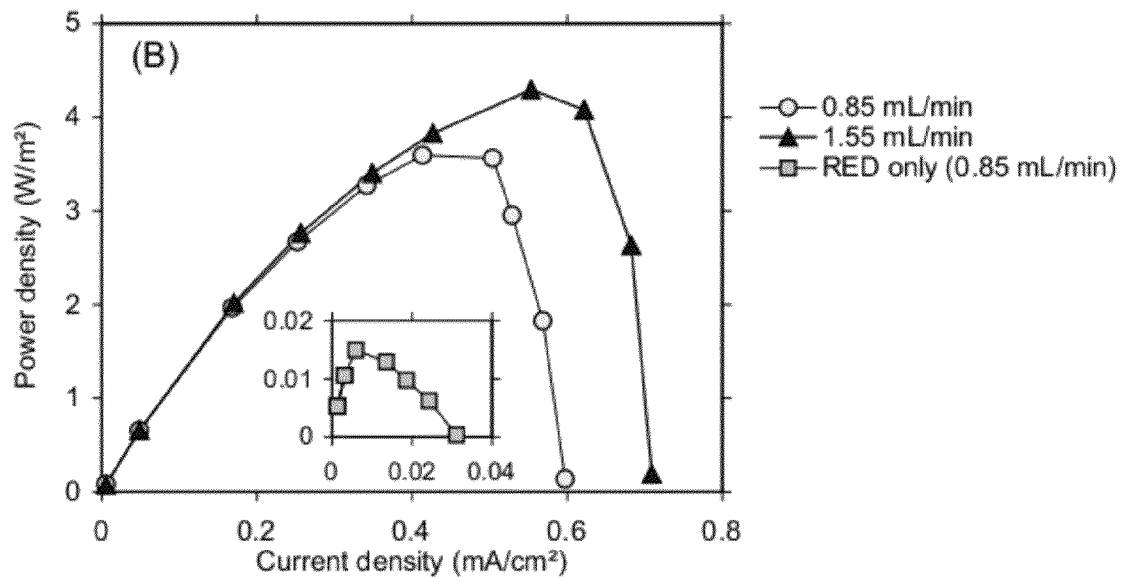
FIG. 10B is a graph showing power densities in MRCs at different flow rates where the SR=50.

An increase in the flowrate of the seawater and river water from 0.85 to 1.5 mL/min improved the cell potentials at current densities >0.4 mA/cm$^2$ (FIG. 10A). With the increased flowrate the maximum power density was 4.3 W/m$^2$ based on cathode area, or 100 W/m$^3$ based on anolyte volume (FIG. 10B). These larger voltages and power densities were obtained by maintaining the salinity gradient throughout the RED stack at the higher flowrate. At current densities lower than 0.4 mA/cm$^2$, however, both voltage and power were independent of the flowrate due to can relatively slow ionic transport (FIG. 10). These findings indicate that the pumping capacity might be controlled to meet targeted potentials and power densities in the MRC.

The head loss corresponding to 0.85 mL/min was ~15 cm, which is equivalent to $4 \times 10^{-5}$ W.

This loss is <2% of the maximum power (0.0025 W or 3.6 W/m$^2$). Thus, the energy loss for pumping was almost negligible for the MRC operation, compared to a loss of >25% of the generated power for a typical RED system.

Synergetic Performance of MRC.

The power densities produce by the integrated system of the MFC and RED stack were larger than the sum of the power densities by the individual systems. The maximum power density at an SR=50 of 3.6 W/m$^2$ was five times that of the control (0.7 W/m$^2$, SR=1) (FIG. 9B). This does not mean that the RED stack contributed 80% of the total power, because the maximum power was <0.015 W/m$^2$ (FIG. 10B) at the end of the fed-batch cycle when substrate was depleted. Therefore, the RED stack alone produced very little power. The separate contributions of the two processes (0.015 and 0.7 W/m$^2$) were substantially less than that of the combined MRC process (3.6 W/m$^2$), proving that the MRC is a new synergistic advancement in electrical power generation from two renewable resources of organic matter in wastewater and salinity difference between seawater and river water.

Energy Recovery and Efficiency.

The MRC had an energy recovery of $r_E$=9% with an SR=50 (3.6 W/m$^2$ or 0.0025 W). Based on the above equation, the salinity driven energy ($X^{in}$) of 0.024 W was much larger than that due to acetate loading ($\Delta H_c n_s^{in}/t_B$) of 0.0037 W ($\Delta H_c$=870 kJ/mol; $n_s^{in}$=3.66×10$^{-4}$ mol; $t_B$=1 days). If the energy recovery is based solely on the substrate energy, then the energy recovery is $r_{ES}$=68%. These calculations suggest that the majority of the recovered energy from the MRC was derived from the salinity difference (94%), which was enabled by the exoelectrogenic bacteria that reduced electrode overpotentials. Thus, the energy recovery of the MRC will be more comparable to that of RED systems than MFCs, as energy recoveries in MFCs are generally low <7.2%. An energy recovery of 9% was previously reported for a single stage RED of 50 cell pairs (SR=91), but this value was obtained by ignoring the energy loss for the electrode reactions. In a RED system with 25 cell pairs (SR=30), the sum of overpotentials was ~2 V, while the open-circuit potential was ~3 V. This substantial loss by overpotentials indicates that the true energy recovery for a single stage RED system will be much less than the reported 9%, unless the RED stack is built with hundreds of ion-exchange membranes, which involves an increase in pumping power. Thus, the achieved energy recovery in the MRC is an improvement compared to individual RED systems. The energy efficiency ($\eta_E$) was 42% during the MRC operation with a 1000-Ω external resistance. For the calculation with equation above, the operation power (2.0 W/m$^2$ or 0.0014 W) was used for a SR of 50 and flowrate of 0.85 mL/min, the residual substrate ($n_s^{out}$) was 2% of the supplied $n_s^{out}$ with the observed mean COD removal of 98%, the cycle span ($t_B$) was 2 days, and the estimated $X^{out}$ was 0.023 W based on the effluent concentration. With only the substrate energy, the energy efficiency ($\eta_{E,S}$) was 77%. Since seawater and river water are relatively unlimited energy sources, the energy efficiency is more meaningful than the energy recovery in comparing the MRC performance to RED systems. Reported energy efficiencies for RED systems range from 14 to 35% (5 or 25 cell pairs; SR=30; flowrate of 140 or 700 mL/min), but these values neglect losses due to electrode reactions (overpotentials) and pumping. Thus, the MRC process provides a substantial improvement for utilizing salinity driven energy.

Example 2

MREC Construction

A cubic Lexan block with a cylindrical chamber (~30 mL; 7 cm$^2$ in cross section) was used for an anode and cathode container, with a glass tube (20 mL) glued to the top of the cathode chamber to collect $H_2$. The stainless steel mesh (SS) cathode was prepared with platinum (0.6 mg/cm$^2$; BASF, Germany) as the catalyst (except as indicated) in a mixture of carbon black and Nafion on both sides of a 7-cm$^2$ stainless steel mesh (#50). In some tests the SS cathode was prepared with $MoS_2$ (6.3 mg/cm$^2$) as a replacement of the Pt catalyst. The carbon cloth (CC) cathode was made with a Pt catalyst (0.5 mg/cm$^2$) in the same manner using a 7-cm$^2$ piece of carbon cloth. The anode (a graphite fiber brush 2.7 cm in diameter and 2.3 cm in length; Mill-Rose Lab Inc., OH) was inoculated with the effluent from an existing MFC and initially enriched in a single chamber MFC. During this start-up stage, the anode microbes were acclimated to a gradually increase in NaCl concentration to avoid salt inhibition effects due to chloride ion transfer into the anode chamber.

A RED stack was sandwiched between the anode and cathode chambers. The RED stack had 5 pairs of seawater (saline material) and river water cells (lower saline material) made with 5 cation- and 6 anion-exchange membranes (Selemion CMV and AMV, AGC Engineering Co., Japan). Each cell had a dimension of 4 cm×2 cm×1.3 mm, and the corresponding empty bed volume of the stack was 10.4 mL. Seawater flowed serially through every saline material compartment (seawater cell), and river water flowed serially through every lower saline material compartment (river water cell) but in the opposite direction to seawater (e.g. FIG. 5A). Each solution was continuously pumped into the MREC at a specified rate from 0.1 to 0.8 mL/min. The power required for pumping at the highest water flowrate (0.8 mL/min) was approximated by measuring the head loss through the stack. All experiments were performed at 30° C. in a constant temperature room.

Solutions

Synthetic seawater was always a 35 g/L NaCl solution. The river water concentration was 0.7 g/L NaCl, creating a salinity ratio of 50, unless otherwise noted. The catholyte (40 mL) was synthetic seawater without any pH buffer, and it was initially purged with $N_2$. The anolyte (30 mL) was prepared with 1.0 g/L sodium acetate in a phosphate buffer (9.16 g/L $Na_2HPO_4$; 4.9 g/L $NaH_2PO_4$—$H_2O$; 0.62 g/L $NH_4Cl$; 0.26 g/L KCl) with minerals and vitamins (23). The corresponding solution volume of the MREC was 30+40+10.4=80.4 mL. The anolyte and catholyte were replaced every fed-batch cycle, while seawater and river water were continuously supplied.

Measurements

The produced gas volume from the cathode chamber was measured using a respirometer (AER-208, Challenge Environmental Systems, AR) prior to being collected in a gas bag (100 mL capacity; Cali-5-Bond, Calibrated Instruments Inc., NY). The gas in the bag and in the cathode headspace was analyzed for $H_2$, $O_2$, $N_2$, $CH_4$, and $CO_2$ by gas chromatography (SRI-310C, SRI Instruments, CA).

The anode and cathode were connected externally to a 1042 resistor to measure current based on the voltage drop using Ohm's law. The voltage drop across the resistor was recorded every 20 minutes using a multi-meter (Keithley Instruments, OH).

Effluent seawater, river water, anolyte, and catholyte solutions were analyzed with conductivity and pH probes (SevenMulti, Mettler-Toledo International Inc., OH). The anolyte COD was determined according to standard methods (Hach Co., CO) described in APHA ed. (1998) Standard Methods for the Examination of Water and Wastewater (American Public Health Association, American Water Works Association, Water Environment Federation, Washington D.C.).

Membrane Permselectivity

The ion flux efficiency ($\eta_{flux}$) is the fractional contribution of the ion transport to the current and thus it represents the permselectivity of the ion-exchange membranes as:

$$\eta_{flux} = \frac{N_{CP} i}{zFq(c_{river}^{eff} - c_{river}^{in})}$$

where $N_{CP}$ is the number of cell pairs, i the current, z the ionic charge, F the Faraday constant, q the solution flowrate, and $c_{river}$ the NaCl molarity in river water. The superscript eff denotes the effluent and in the influent to the MREC.

Calculations on RED

The voltage added by the RED stack equals the sum of the junction potentials created by the salinity difference minus the sum of Ohmic losses. The junction potential across an ion-exchange membrane ($\Delta\phi_{jct}$) quantifies the salinity driven energy between seawater and river water:

$$|\Delta\phi_{jct}| = \frac{RT}{zF}\left[t_{counter}\ln\left(\frac{a_{counter}^{sea}}{a_{counter}^{river}}\right) - t_{co}\ln\left(\frac{a_{co}^{sea}}{a_{co}^{river}}\right)\right]$$

where R is the gas constant and T the absolute temperature. For counter- and co-ions to the ion-exchange membrane, t is the transport number defined as the fractional contribution of the ionic flux to the current density in the membrane, and a is the chemical activity. The chemical activity was calculated by multiplying the molar concentration by the activity coefficient ($f_i$). The activity coefficient was calculated as:

$$\log f_i = -\frac{A|z_i|^2\sqrt{I_S}}{1 + Ba^0\sqrt{I_S}} - \log(1 + 0.018 m_i) + K_i I_S$$

The Debye-Hückel constants were A=0.5085 $kg^{1/2}/mol^{1/2}$ and B=0.3282 Å $kg^{1/2}/mol^{1/2}$. The ion size parameter ($a^0$) was 0.78 Å for both sodium and chloride, while $K_{Na}$=0.105 and $K_{Cl}$=−0.009 $kg^2/mol^2$. $I_S$ is the ionic strength in molality, and in the molal concentration. This equation is valid for a NaCl solution up to 1.2 molality.

The NaCl concentration was assumed to be homogeneous in each cell, while the concentration change between cells along the flow ($\Delta c_{cell}$) was determined by:

$$\Delta c_{cell} = \frac{i}{zqF\eta_{flux}}$$

Ohm's law was employed for the resistive loss in each of the solution and membrane phases. Effect of the boundary layer near the membrane surface was ignored due to relatively low current densities. The membrane resistivity was 3.0 (CMV) and 2.8 $\Omega cm^2$ (AMV).

$H_2$ Recovery

The Coulombic recovery ($r_{CE}$) is the fraction of the transferred electron to the anode among the total electron released by substrate oxidation, and is calculated as $$r_{CE} = \frac{8\int i dt}{FV_{An}\Delta COD}$$

where $V_{an}$ is the anolyte volume and $\Delta$COD is the removed COD as $O_2$.

The cathodic $H_2$ recovery ($r_{cat}$) represents the contribution of the mole-$H_2$ evolution ($n_{H2}$) to the total cathodic charge transfer:

$$r_{cat} = \frac{2n_{H2}F}{\int i dt}$$

The overall $H_2$ recovery ($r_{H2}$) is determined by $r_{H2}=r_{CE}r_{cat}$, meaning the ratio of the produced $H_2$ to the removed organic matter on the electron basis.

The $H_2$ Yield ($Y_{H2}$) is defined on the mole basis as:

$$Y_{H2} = \frac{32 n_{H2}}{V_{an}\Delta COD}$$

The maximum volumetric $H_2$ production rate at 1 atm ($Q_{H2}$, $m^3$-$H_2/m^3$-$V_{an}$/day) was calculated with averaged current ($i_{avg}$) over the first one hour of a fed-batch cycle:

$$Q_{H2} = \frac{i_{avg} r_{cat} RT}{2 V_{an} F}$$

Energy Recovery and Efficiency

The energy recovery ($r_E$) is the combustion energy of the produced $H_2$ normalized by the total energy provided to the MREC as:

$$r_E = \frac{\Delta H_{H_2} n_{H_2}/t_B}{\Delta H_s n_s^{in}/t_B + X^{in}}$$

where $\Delta H$ is the heat of combustion (J/mol), $t_B$ the time span for each batch cycle, and $X^{in}$ the theoretical energy (W) estimated by the change in the free energy involving complete mixing of seawater and river water:

$$X^{in} = 2qRT\left(c_{river}^{in} \ln\frac{a_{river}^{in}}{a_{mixed}} + c_{sea}^{in} \ln\frac{a_{sea}^{in}}{a_{mixed}}\right)$$

The energy recovery based on consideration of only the substrate energy ($r_{E,S}$) is:

$$r_{E,S} = \frac{\Delta H_{H_2} n_{H_2}}{\Delta H_s n_s^{in}}$$

The energy efficiency ($\eta_E$) is defined similarly but by subtracting the energy leaving the MREC (superscript out) from the provided energy as:

$$\eta_E = \frac{\Delta H_{H_2} n_{H_2}/t_B}{\Delta H_s(n_s^{in} - n_s^{out})/t_B + X^{in} - X^{out}}$$

The energy efficiency based only on the substrate ($\eta_{E,S}$) is $$\eta_{E,S} = \frac{\Delta H_{H_2} n_{H_2}}{\Delta H_s(n_s^{in} - n_s^{out})}$$

MREC Operation

Figure 11A:
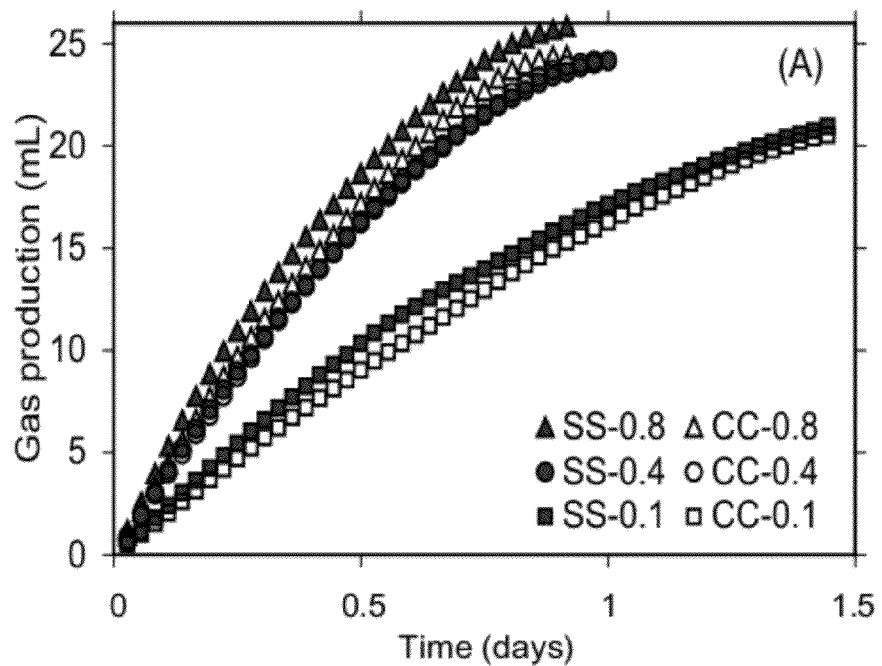
FIG. 11A is a graph showing effects of solution flow, 0.1, 0.4, and 0.8 mL/min, and current collector, SS: stainless steel, CC: carbon cloth, on hydrogen gas production.

The MREC described in this example, constructed with 5 pairs of seawater and river water cells, produced from 21 to 26 mL of gas over each fed-batch cycle (FIG. 11A). The produced gas was pure $H_2$, with no detectable $CH_4$ or $CO_2$ gases. Increasing the water flow accelerated $H_2$ production, since the salinity gradient was maintained between the seawater and river water cells throughout the RED stack. The increase in $H_2$ production from an increase in water flow from 0.4 to 0.8 mL/min was smaller than that obtained when increasing the flow from 0.1 to 0.4 mL/min, however, suggesting that further increases in the flow would not substantially increase $H_2$ production. There was a slightly larger rate of $H_2$ production using the cathode constructed around a stainless steel current collector (SS) than a more expensive carbon cloth (CC) cathode.

Figure 11B:
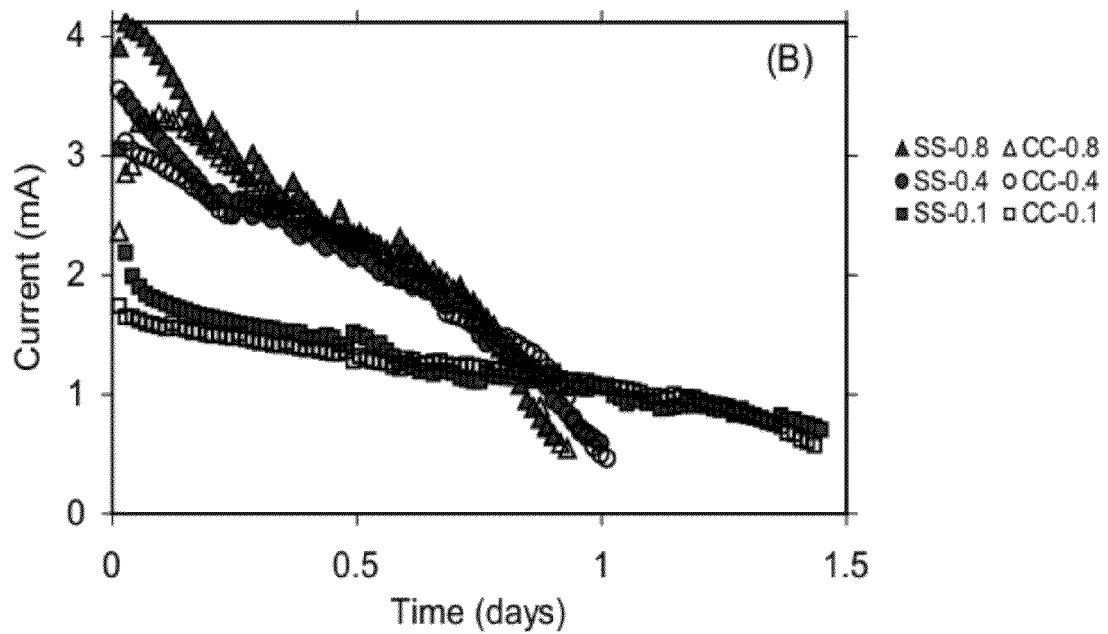
FIG. 11B is a graph showing effects of solution flow, 0.1, 0.4, and 0.8 mL/min, and current collector, SS: stainless steel, CC: carbon cloth, on current generation.

The maximum electrical current in the MREC was observed at the beginning of the fed batch cycle, and the current decreased over time as the substrate was depleted (FIG. 11B). Current densities were similar for water flowrates between 0.8 and 0.4 mL/min, but substantially smaller currents were obtained at 0.1 mL/min. As a result of slower oxidation of substrate, the fed-batch cycle increased from ~0.9 to ~4.4 days with the decreased water flowrate. The current was almost identical in the later part of the cycle (after 0.2 days) with the CC and SS cathodes, but the SS cathode produced slightly greater current in the earlier part of the cycle.

The substrate removal was 85±6% (n=6) on the basis of COD (chemical oxygen demand) removal over a fed-batch cycle. As the acetate was oxidized, protons were released in the anode chamber, resulting in a pH decrease from 7.0 to 5.2±0.1 even with the use of a pH buffer. This low pH was responsible for the incomplete removal of COD as it is known that exoelectrogenic activity is significantly inhibited at a pH of ~5 (12). There was a much larger catholyte pH increase over a cycle (from 6.1±0.2 to 12.3±0.1) due to the absence of a buffer. According to the Nernst equation, a unit increase in the catholyte pH increases the equilibrium potential for $H_2$ evolution by 0.06 V. This implies, for instance, that further increase in the catholyte pH up to 13 would result in little decrease in MREC performance. Thus, the low anolyte pH is considered to be the main reason for the termination of current production at the end of the fed-batch cycle.

Voltage Contribution by RED

Figure 12A:
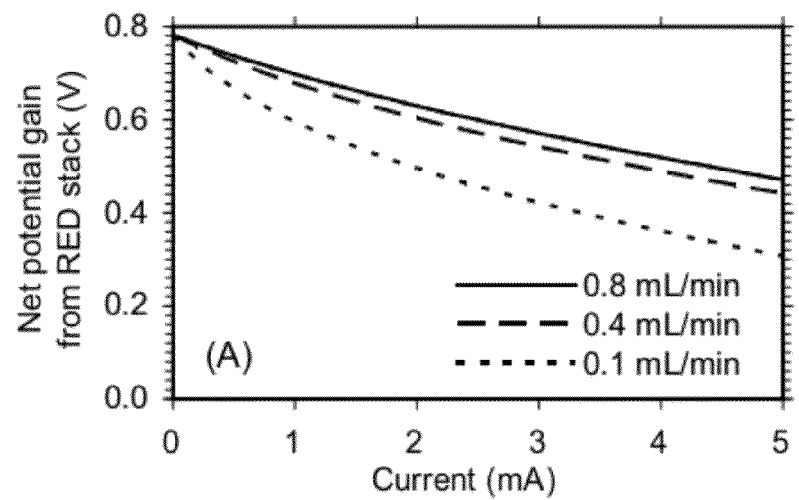
FIG. 12A is a graph showing the RED stack voltage and net potential from the stack; (B) Ohmic losses; and (C) voltage losses due to a reduction in the initial salinity gradient.

The 5-cell paired RED stack was estimated to contribute 0.5-0.6 V for $H_2$ production (FIG. 12A) and the observed current efficiency ($\eta_{flux}$=0.81±0.06, n=6). This corresponds to a transport number of the counter ion ($t_{counter}$) of ~0.91, indicating there was no failure in membrane integrity or permselectivity. During the experiments with water flowrates of 0.4 or 0.8 mL/min, ~80% of the $H_2$ was produced at a current between 2 and 4 mA (FIG. 11). Similarly, at a water flowrate of 0.1 mL/min, the majority of the $H_2$ production was achieved at a current of 1 to 2 mA. For these current ranges, the corresponding voltage contribution by the RED stack was 0.5-0.6 V for all three applied flows (FIG. 12A).

Figure 12B:
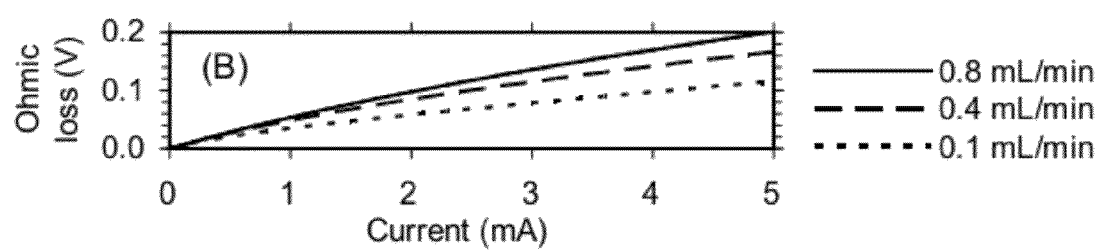
FIG. 12B is a graph showing the RED stack voltage and Ohmic losses.
Figure 12C:
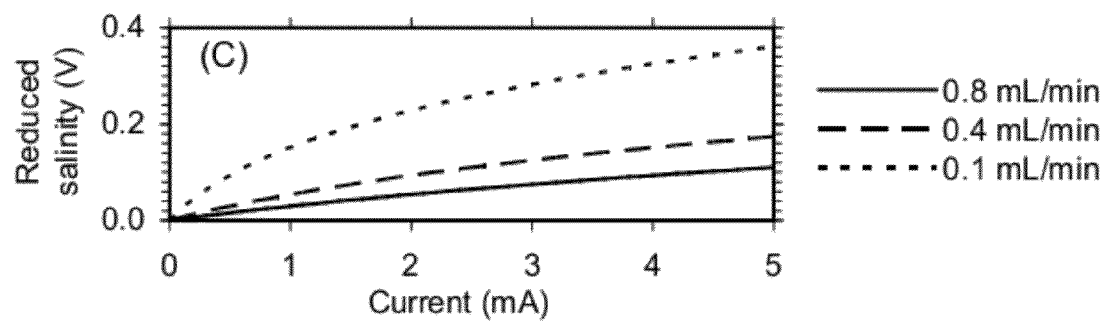
FIG. 12C is a graph showing the RED stack voltage voltage losses due to a reduction in the initial salinity gradient.

The decrease in the RED voltage with increasing current is due to two factors: a resistive Ohmic loss; and the reduction in the salinity gradient as the water flows through the membrane stack. Ohmic losses increased at higher flowrates due to the influent river water salinity being maintained throughout the RED stack (FIG. 12B). As a result, smaller changes in the salinity gradient during flow through the stack provide greater energy available for current generation (FIG. 12A). An increase in flowrate from 0.1 to 0.4 mL/min substantially reduced voltage losses due to less change in the initial salinity gradient as the water flowed through the stack (FIG. 12C), resulting in a significant improvement in the net RED voltage (FIG. 12A). However, with an increase in flowrate from 0.4 to 0.8 mL, the increase in the net RED voltage was relatively small since an improvement in maintaining the overall salinity gradient was offset by an increase in Ohmic losses.

$H_2$ Recovery, Yield, and Rate

Figure 13A:
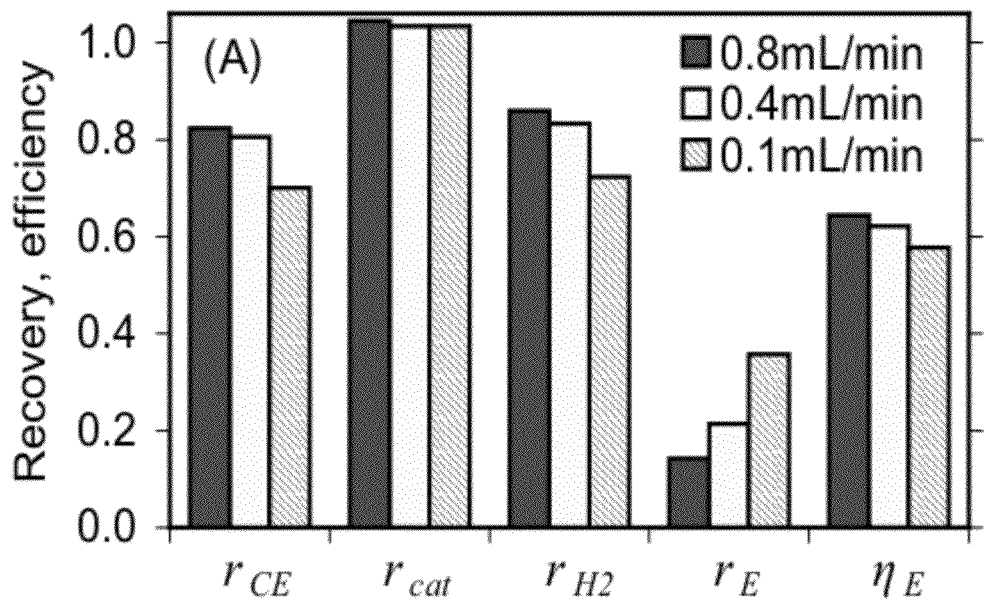
FIG. 13A is a graph showing MREC performance with Pt-SS cathode: recoveries and energy efficiencies.

The Coulombic recovery ranged from $r_{CE}$=70 to 85% during MREC operation with a SS cathode (FIG. 13A). The increase in $r_{CE}$ at the higher flowrates was due to a shorter fed-batch cycle (FIG. 11). Substrate oxidation in the anode chamber can occur due to the activity of non-exoelectrogenic microorganisms such as methanogens or aerobic microorganisms using oxygen that can leak into the reactor through gaskets and fittings. The relative proportion of substrate oxidation by these non-exoelectrogens will increase with increasing cycle time, resulting in reduced capture of substrate as current and therefore a lower $r_{CE}$.

The cathodic $H_2$ recovery ($r_{cat}$) was somewhat greater than unity (FIG. 13A), suggesting that $H_2$ production was slightly overestimated. This overestimation was likely due to osmotic water transport into the cathode chamber from the adjacent river water cell. This increase in water volume in the cathode chamber reduced the headspace volume, and released additional gas from the headspace through the respirometer. It is estimated that this gas volume was ~0.8 mL, which would have resulted in ~3-4% overestimation in $r_{cat}$. If this correction is included in the calculations, then values of $r_{cat}$ would be near unity. This conclusion that osmotic water transport was responsible for this elevated gas production is also consistent with the gas analysis finding that the only gas produced was $H_2$. Thus, the overall $H_2$ recovery ($r_{H2}$) is consistent with the calculated Coulombic recoveries (FIG. 13A).

Figure 13B:
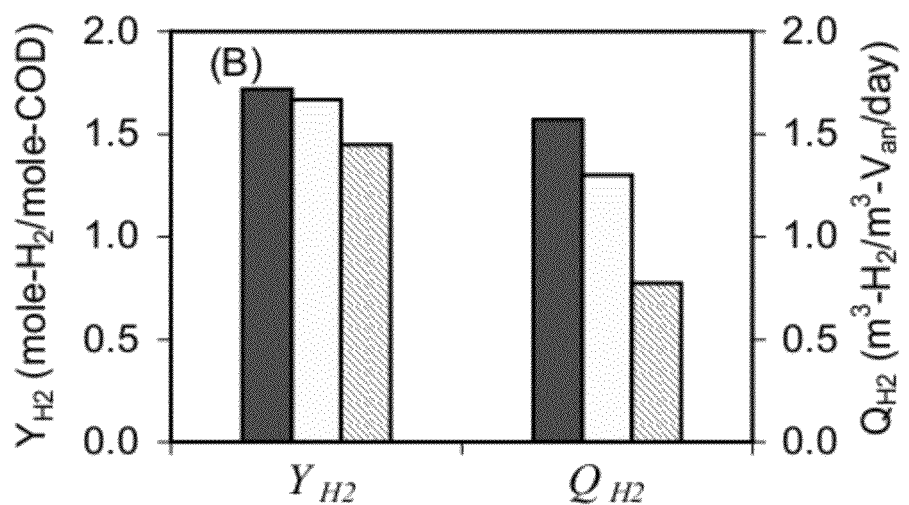
FIG. 13B is a graph showing MREC performance with Pt-SS cathode: $H_2$ production yields and rates.

The $H_2$ yield ($Y_{H2}$) increased from 1.4 to 1.7 mole-$H_2$/mole-COD with an increase in water flowrate (FIG. 13B). The maximum yield based on stoichiometry is $Y_{H2}$=2.0 mole-$H_2$/mole-COD. The maximum $H_2$ production rate varied with the water flowrate, increasing from $Q_{H2}$=0.8 to 1.6 $m^3$-$H_2$/$m^3$-$V_{an}$/day with flowrate (FIG. 13B). The $H_2$ production rate, expressed on the basis of the total empty bed volume ($V_{EB}$=80.4 mL), was 0.29 to 0.59 $m^3$-$H_2$/$m^3$-$V_{EB}$/day.

$H_2$ production achieved with the MREC is consistent with performance expected for an MEC with an externally applied voltage ($E_{ap}$). Based on MEC studies performed under similar conditions ($V_{an}$~30 mL; acetate as substrate; platinum catalyst; $E_{ap}$ 0.5-0.6 V), hydrogen recoveries were $r_{H2}$=0.04 to 0.9, and gas production rates were $Q_{H2}$=0.1 to 2.5 $m^3$-$H_2$/$m^3$-$V_{an}$/day (13-15). Based on values obtained here ($r_{H2}$=0.7-0.8, and $Q_{H2}$=0.8-1.6 $m^3$-$H_2$/$m^3$-$V_{an}$/day), we conclude that the RED stack voltage (0.5-0.6 V) was efficiently used for $H_2$ production in the MREC.

Energy Recovery and Efficiency

The energy recovery, or the energy captured based on the total energy input, was as high as $r_E$=36% at the lowest water flowrate of 0.1 mL/min (FIG. 13A). A slow water flowrate provides a longer residence time in the stack and thus achieves more complete utilization of the salinity driven energy between the seawater and river water. If only the substrate energy is considered, the energy recovery ($r_{E,S}$) ranges 75 to 95% increasing with increasing flowrate. Based on the total provided energy ($\Delta H_s n_s^{in}/t_B + X^{in}$), the fractional contribution of the salinity driven energy was 53% (47% contributed as substrate) at 0.1 mL/min, and it increased up to 85% (15% as substrate) at 0.8 mL/min.

The energy efficiency, or the energy captured based on the energy entering and leaving the MREC, was $\eta_E$=65% at 0.8 mL/min, and $\eta_E$=58% at 0.1 mL/min (FIG. 13A). With only the substrate energy, the energy efficiency ($\eta_{E,S}$) was 88 to 109%. Complete utilization of the salinity driven energy in an MREC, based on energy recovery ($r_E$), may be unnecessary because seawater and river water are relatively unlimited energy sources. This suggests that the process be run at higher flowrates to maximize the energy efficiency ($\eta_E$), not energy recovery ($r_E$). In addition, the use of higher flowrates (0.4 and 0.8 mL/min) improved the $H_2$ yield and production rate. The required energy for pumping seawater and river water through the stack was small (~4×10$^{-5}$ W), which is only about ~1% of the energy recovered as $H_2$ ($\Delta H_{H_2} n_{H_2}/t_B$=3.8×10$^{-3}$ W).

Molybdenum Cathode Catalyst

Figure 14:
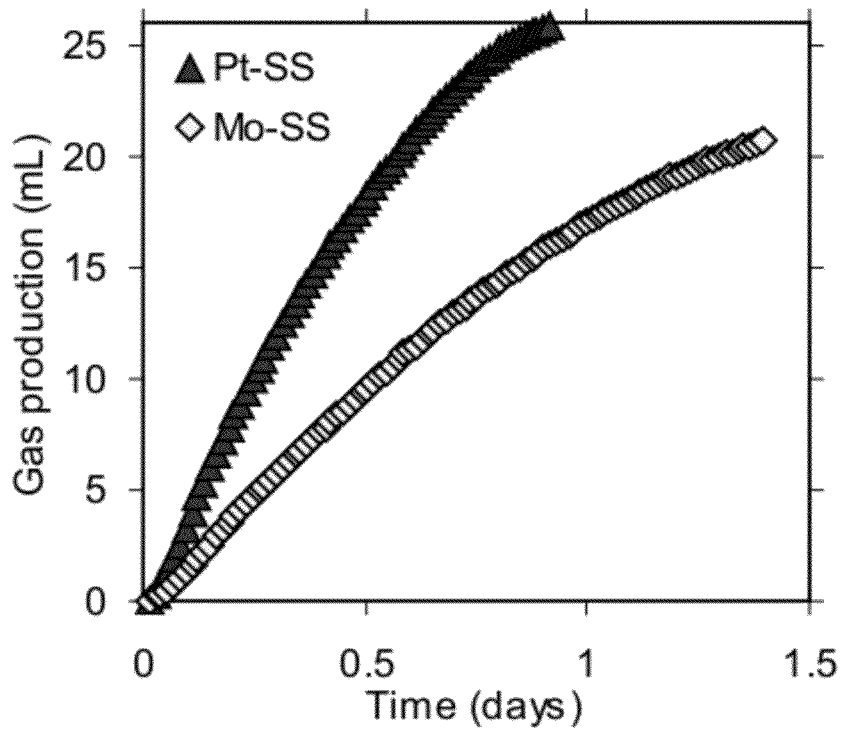
FIG. 14 is a graph showing comparison of platinum and molybdenum catalysts for $H_2$ production.

The above tests were conducted with a noble metal catalyst in order to evaluate the performance of the system under optimal conditions. However, sustainable $H_2$ production will require the use of non-precious cathode catalysts. MREC tests with a $MoS_2$ catalyst resulted in 20 mL of $H_2$ production (FIG. 14). The Mo-SS cathode required a longer fed-batch cycle ~1.4 days, compared to ~0.9 days with SS cathode containing Pt (Pt-SS), resulting in substrate losses to non-current generating processes. The corresponding process parameters using the $MoS_2$ catalyst were: hydrogen recovery, $r_{H2}$=0.72; hydrogen yield, $Y_{H2}$=1.4 mole-$H_2$/mole-COD; hydrogen production rate of $Q_{H2}$=0.8 $m^3$-$H_2$/$m^3$-$V_{an}$/day; and an energy efficiency of $\eta_E$=51%.

The MREC can be used not only as a method for $H_2$ production, but also as a method of wastewater treatment. Exoelectrogens can use various sources of organic matter, such as domestic and animal wastewaters to industrial wastewaters. The anode compartment was operated as a fed-batch reactor in this example, but wastewater or other oxidizable substrate can also be continuously supplied into the anode compartment. The continuous flow system for wastewater would not affect the $H_2$ production, since the anode and cathode chamber are completely separated with a stack of ion-exchange membranes. In addition, this separated cathode chamber from wastewater excludes possible losses of $H_2$ through methanogenesis, which is inevitable in single chamber MECs.

Example 3

FIG. 7 illustrates a process of the current invention where effluent circulated through the RED stack is regenerated in a distillation column into a saline material (regenerated concentrate solution) and a lower-saline material (regenerated dilute solution). Here the anode and cathode solutions are shown as once-through, but they can be recycled.

Figure 15:
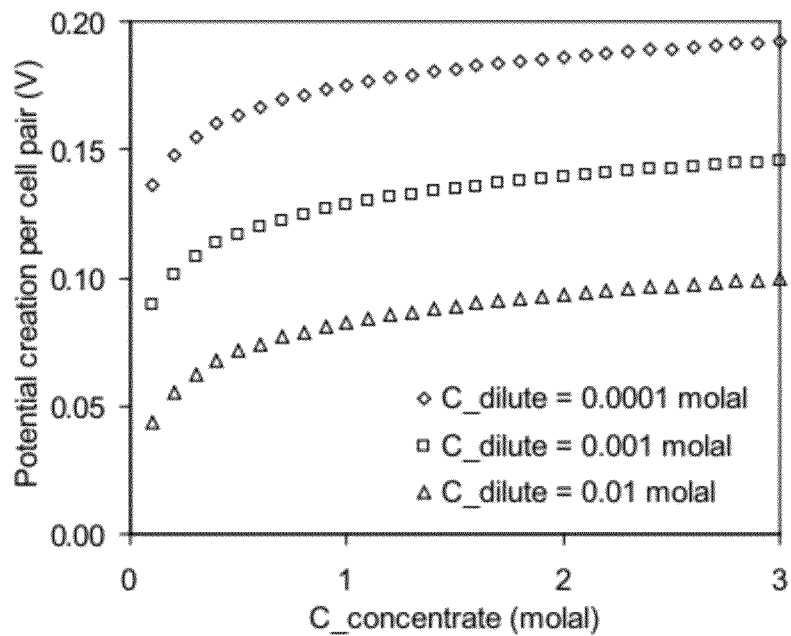
FIG. 15 is a graph showing modeled results of varying ammonium bicarbonate concentration in the saline material.

FIG. 15 illustrates model results by using Eq. (1). The model results obtained using Eq. 1, and shown in FIG. 15, indicate that the $NH_4HCO_3$ concentration in the concentrate solution (saline material) should be greater than ~0.5 molal, but a concentration greater than 1 molal does not significantly improve the cell potential. For the model simulation, the transport numbers were: $t_{counter}$=0.9 and $t_{co}$=0.1. The activity coefficients were determined by Pitzer equation with parameters of $KHCO_3$ by (Pitzer and Pelper, 1980).

Example 4

Reactor Construction

A lab scale MRC reactor was constructed including a 4-cm cubic anode chamber (Lexan, 30 mL empty bed volume) containing a graphite brush anode (D=2.7 cm, L=2.3 cm, 0.22 $cm^2$ projected area based on all fibers in the brush; Mill-Rose Labs Inc., OH). The brush anode was heat treated as described in Cheng, S. et al., Electrochem. Commun. 8:489, 2006 before it was inoculated with the effluent from an existing MFC and enriched in a conventional single chamber MFC prior to MRC operation. The cathode chamber (2-cm cubic chamber, 18 mL empty bed volume) contained a 7-$cm^2$ (projected surface area) air cathode with a Pt catalyst (0.5 mg Pt/$cm^2$) applied on a carbon cloth as described Zhang, F. et al., Electrochem. Commun. 11:2177, 2009, with a Nafion catalyst binder (water side) and four layers of polytetrafluoroethylene diffusion layers (air side). Although Pt was used as a catalyst here in order to benchmark performance against systems using NaCl solutions, nearly identical cathode performance has been obtained using activated carbon catalysts instead of Pt catalysts in microbial fuel cells. The cathode chamber also served as the first flow channel of the high concentrate salt stream to prevent the pH rise in the cathode chamber.

The RED stack, assembled between the anode and cathode chambers, has 6 anion- and 5 cation-exchange membranes (Selemion AMV and CMV, Asahi glass, Japan), creating 5 pairs of alternating saline material (also called high concentrate, HC) and lower saline material (also called low concentrate, LC) chambers. Inter-membrane chambers were sealed and separated by silicon gaskets, each with an 8-cm² (2×4 cm) rectangular cross section cut out. Inter-membrane chamber width (1.3 mm) was maintained with a 2 cm² (0.5×4 cm) strip of polyethylene mesh. The total ion exchange membrane area in the RED stack was 88 cm². The total MRC empty bed volume was 58.4 mL (RED stack+Cathode=28.4 mL; Anode=30 mL). The HC solution entered the cathode chamber and flowed serially through the 5 HC cells in the stack, exiting from the cell next to the anode chamber. The LC stream entered the RED stack near the anode and flowed serially through the 5 LC cells in the stack, exiting from the cell next to the cathode chamber. A peristaltic pump (Cole Parmer, IL) continuously fed the HC and LC solutions at a flow rate of 1.6 mL/min, unless specified otherwise.

After stable performance in the MRC, the working electrodes (anode and cathode) were transferred to a cubic 4-cm (30 mL empty bed volume) single chamber MFC reactors to establish a performance baseline.

Peak power, maximum energy recovery, and energy efficiency of the MRC and MFC were determined in separate experiments. During power density curve experiments fresh HC solution was pumped through the RED stack with the effluent collected in separate reservoirs. To maximize energy recovery and energy efficiency, 0.1-L HC and LC solutions were recycled in airtight flow paths for the duration of anode feeding cycles over a batch recycle experiment. Before each batch the stack and tubing were flushed with matching solutions.

Solutions.

Ammonium bicarbonate HC solutions were prepared by dissolving ammonium bicarbonate salt (Alfa Aesar, MA) into deionized water within an airtight vessel. The initial HC solutions tested were 1.8, 1.1, 0.95, 0.8, and 0.5 M. The LC solutions were prepared to produce salinity ratios of 50, 100, and 200 by diluting an aliquot of the HC solution. The anode solutions contained 1 g/L of sodium acetate (organic substrate for exoelectrogenic bacteria growing on anode), in 50 mM carbonate buffer (4.2 g/L $NaHCO_3^-$) containing 0.231 g/L $NH_4H_2PO_4$ and trace vitamins and minerals, detailed in H. Liu et al., Environ. Sci. Technol. 39, 5488 (2005). Domestic wastewater was collected from the primary clarifier of the Penn State University wastewater treatment plant. The cathode contained ammonium bicarbonate HC solution, therefore protons for oxygen reduction at the cathode were provided by ammonium and bicarbonate ions as well as water dissociation.

A second order relationship between ammonium bicarbonate solution concentration and solution conductivity (determined by conducting a stepwise dilution series) was used to estimate initial and final concentrations of HC and LC streams. Conductivity and pH of the HC and LC streams were measured (Mettler-Toledo, Ohio) before and after each batch recycle experiment.

Analysis.

Power production in batch recycle experiments was determined by measuring the potential drop across a fixed external resistance (300Ω) for both MRC and single chamber MFC operations. Voltage drop was recorded every 20 minutes by a digital multimeter (Keithley Instruments, OH). Electrical current (i) was determined by Ohm's law. Power was calculated by multiplying the electrical current and total cell voltage. Reported power densities were based on the cathode projected area (7 cm²). To determine the maximum MRC power ($P_{MRC}$) production at each condition the reactor was held at open circuit voltage for one hour and then the external resistance was decreased from 1,000 to 50Ω every 20 minutes with the voltage recorded at each resistance. Power contribution by the electrode reactions ($P_{MFC}$) was determined by measuring the anode potential ($E_{an}$) and cathode potential ($E_{cat}$) against Ag/AgCl reference electrodes (BASi, IN): $P_{MFC}=(E_{cat}-E_{an})\times i$. The RED stack power contribution was calculated by finding stack voltage ($V_{stk}$) with two reference electrodes located on both ends of the stack as: $P_{RED}=V_{stk}\times i$.

The MRC anode was transferred to a single chamber MFC to determine baseline power production in fed-batch experiments. In the single chamber MFC, same substrate solutions (sodium acetate in carbonate buffer solution and domestic wastewater) were provided to determine peak power production.

Coulombic efficiency was determined as described in Rozendal, R. A., et al., Trends Biotechnol., 26:450, 2008. Energy recovery ($r_E$) is defined by the ratio of energy produced by the MRC reactor and the energy input as substrate and salinity gradient:

$$r_E = \frac{E_{MRC}}{n_{s,0}\Delta G_s + \Delta G_{mix,0}} \cdot 100\%$$

Energy efficiency ($\eta_E$) was calculated as the ratio of energy produced to the energy consumed based on the substrate used and the salinity gradient, according to:

$$\eta_E = \frac{E_{MRC}}{(n_{s,0} - n_{s,f})\Delta G_s + (\Delta G_{mix,0} - \Delta G_{mix,f})} \cdot 100\%$$

where $E_{MRC}$ is the energy produced per batch (kJ), n, is the moles of substrate (acetate) initially fed to the anode (0) and at the end of the batch cycle (m, and $\Delta G_s$ is the Gibb's free energy of substrate [acetate=−846.6 kJ/mol, domestic wastewater=17.8 kJ/g−COD]. $\Delta G_{mix}$ is the free energy that can be created by mixing of HC and LC solutions until the two solutions reach equilibrium concentration, calculated as:

$$\Delta G_{mix} = RT\sum_i \left( V_{HC}c_{i,HC}\ln\frac{a_{i,mix}}{a_{i,HC}} + V_{LC}c_{i,LC}\ln\frac{a_{i,mix}}{a_{i,LC}} \right)$$

where R is the ideal gas constant (8.314 J/mol-K), T is solution temperature, V is the volume of solution, c is the molar concentration of ionic species i in the solution, and a is the activity of species i in the solution.

At a neutral pH, concentrated ammonium bicarbonate is dominated by ammonium ($NH_4^+$) and bicarbonate ($HCO_3^-$) ions, but significant amounts of carbamate ($NH_4CO_3^-$) and carbonate ($CO_3^{2-}$) also contribute to ionic strength. Species specific concentrations and activities were estimated with OLI Stream Analysis software (OLI Systems, Inc., Morris Plains, N.J.) at a pH of 7 and temperature of 25° C.

To determine ammonia transport into the anode, total ammonia nitrogen (TAN=$NH_3$+$NH_4^+$) concentration in the substrate was estimated before and after each fed-batch cycle (HACH, Loveland, Colo.). Based on observed pH, corresponding free ammonia concentration ($NH_3$) was calculated by:

$$[NH_3] = [TAN]\left(1 + \frac{10^{-pH}}{10^{-pKa}}\right)^{-1}$$

In this example four different salinity ratios (SRs) were used with a single HC ammonium bicarbonate solution (0.95 M, conductivity of 65.5 mS/cm) in MRCs (58.4 mL) containing five membrane pairs at a fixed solution flow rate (1.6 mL/min). The maximum power (normalized to projected cathode area of 7 cm$^2$) was 5.4 W/m$^2$ (SR=100) with 1 g/L of sodium acetate.

Figure 16A:
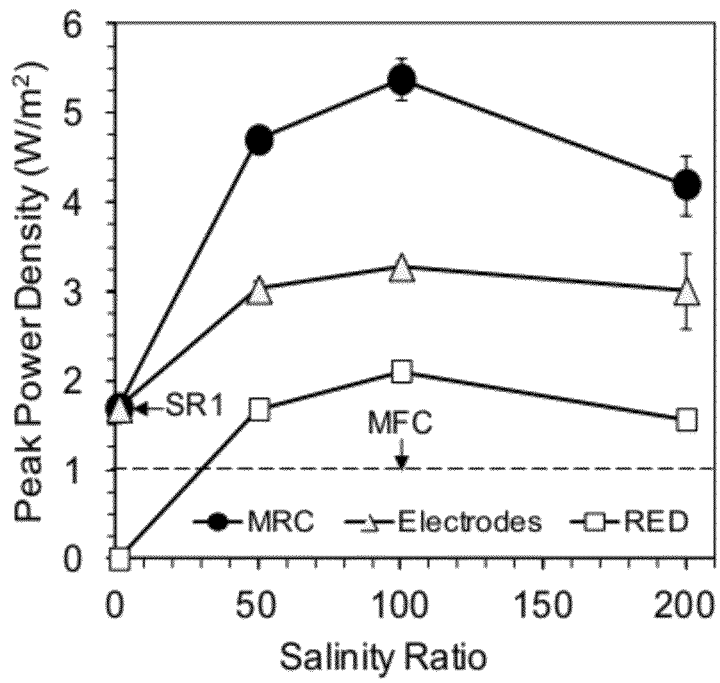
FIG. 16A is a graph showing peak power densities obtained from polarization curves, apportioned to power from the RED (salinity gradient power) compared to the electrodes (organic matter power) and the effect of salinity ratio (SR) on peak power density with a fixed high concentrate (HC) solution (0.95 M)
Figure 16B:
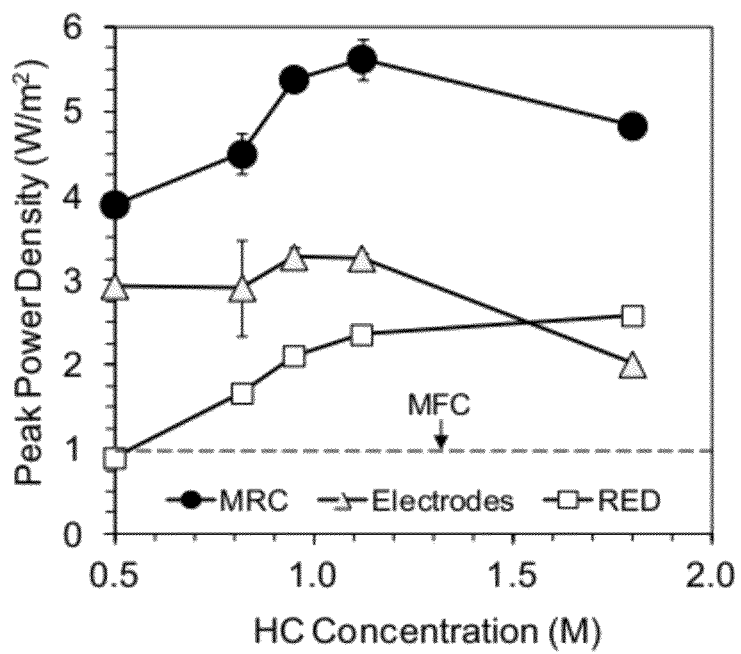
FIG. 16B is a graph showing peak power densities obtained from polarization curves, apportioned to power from the RED (salinity gradient power) compared to the electrodes (organic matter power) and the effect of HC (saline material) concentrations on power.

FIGS. 16A-B are graphs showing peak power densities obtained from polarization curves, apportioned to power from the RED (salinity gradient power) compared to the electrodes (organic matter power). FIG. 16A is a graph showing the effect of salinity ratio (SR) on peak power density with a fixed high concentrate (HC) solution (0.95 M). FIG. 16B is a graph showing the effects of HC concentrations on power. The dashed line represents peak power density of the same electrodes in a single chamber.

For these conditions, the RED stack contributed 2.1±0.01 W/m$^2$ (39%) of the produced power, compared to 3.3±0.04 W/m$^2$ (61%) from the oxidation of the substrate. The cell obtained peak power at a total cell voltage of 0.75 V and current density of 0.72 mA/cm$^2$.

Figure 17:
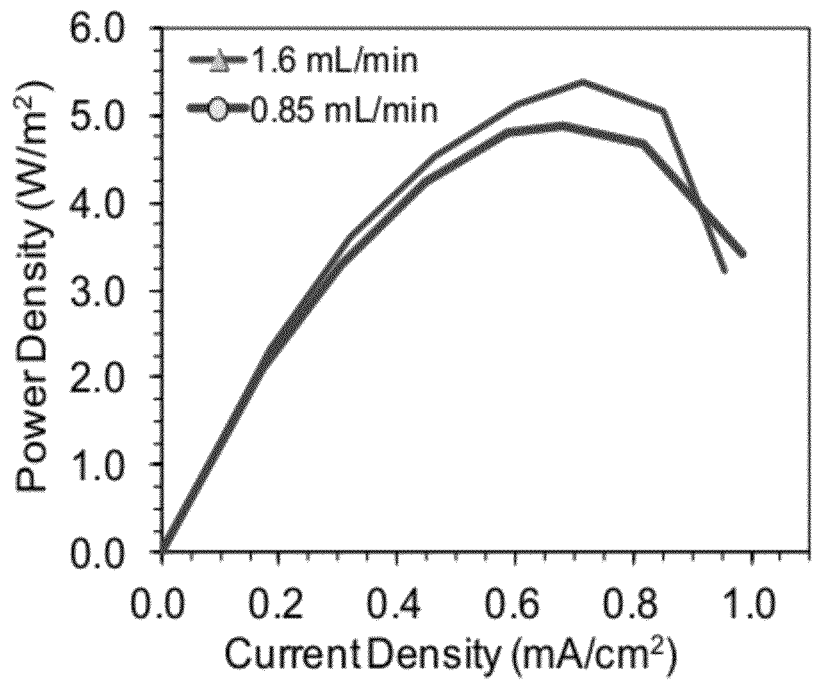
FIG. 17 is a graph showing power density curves of an MRC, where HC (saline material salt concentration)=0.95 M, and salinity ratio=100, at different saline material and lower-saline material flow rates.

FIG. 17 is a graph showing power density curves of the MRC(HC=0.95 M, SR=100) at different salt solution flow rates. Lowering the flow rate from 1.6 to 0.85 mL/min (4.9±0.1 W/m$^2$) reduced power by an amount equivalent to using an SR=50 (4.7±0.1 W/m$^2$). The use of the RED stack and a saline catholyte alone increased power, as shown by an MRC power density of 1.7±0.05 W/m$^2$ with membranes all containing the same saline solution (SR=1), relative to that of a single-chamber MFC (no membranes; 1.08±0.03 W/m$^2$). This improved performance of the MRC could be due to a number of factors, including improved charge transfer at the cathode (65.5 mS/cm), a salinity gradient between the stack and the anode, and the flow of bicarbonate ions through the anion exchange membrane which helps to maintain anode pH at 6.9±0.1, compared to a decrease in pH to 5.5 using NaCl salt solutions.

Power production using different concentrations of HC and LC solutions at a fixed salinity ratio (SR=100) was examined. MRC power density reached a maximum of 5.6±0.04 W/m$^2$ for the 1.1 M HC solution (FIG. 16B). This was 20% higher than that produced with an artificial seawater (NaCl) and freshwater.

The RED stack integrated into the MRC increased maximum power production using organic matter. Electrode reactions in the MRC produced up to 3.2±0.2 W/m$^2$, which is three times the power produced in the absence of the stack in a single-chamber MFC (1.08±0.03 W/m$^2$, FIGS. 16A-B). The contribution of the electrodes to total power generation did not appreciably vary for HCs between 0.5 M and 1.1 M (SR=100), although power was reduced at the highest HC (1.8 M, FIG. 16B).

Figure 18A:
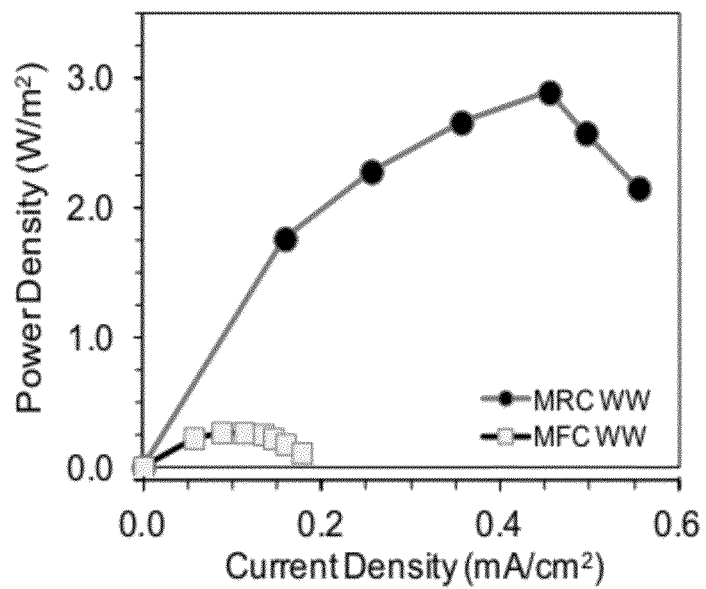
FIG. 18A is a graph showing peak power density of MRC and single chamber MFC fed domestic wastewater.
Figure 18B:
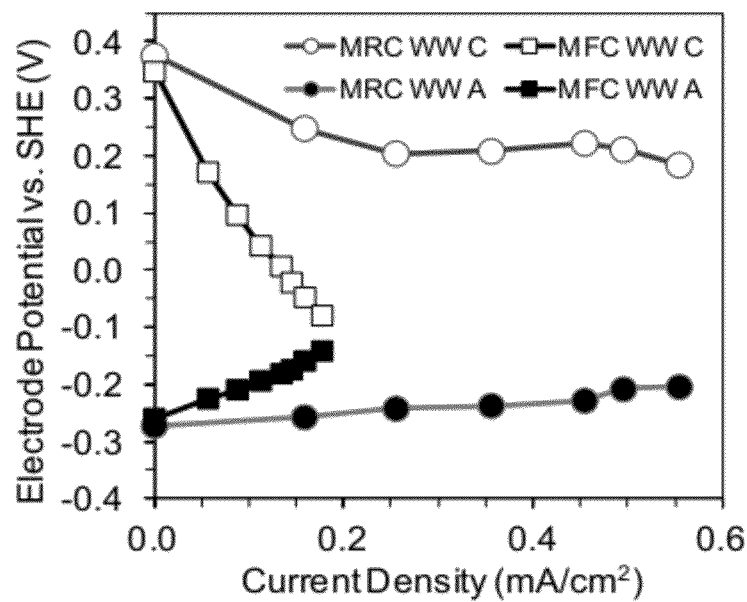
FIG. 18B is a graph showing anode (A) and cathode potentials (C) of MRC and single chamber microbial fuel cell (MFC) fed domestic wastewater.

FIGS. 18A-B are graphs showing 1) peak power density (FIG. 18A) and 2) anode (A) and cathode potentials (C) (FIG. 18B) of MRC and single chamber MFC fed domestic wastewater. Notice that the anode and cathode potentials remained relatively constant over the range of current densities. The relatively constant potential indicates that the power performance is stable, suggesting that the system could easily sustain higher power densities with higher organic matter concentrations in the wastewater. The utilization of a salinity-gradient power source in the MRC also resulted in very high power production from domestic wastewater, with up to 2.9±0.05 W/m$^2$ produced at a HC concentration of 0.95 M (SR=100, 1.6 mL/min flow rate). The power derived from the electrode reactions was 2.0±0.05 W/m$^2$, which is a 740% increase in power production compared to that achieved with wastewater in a single chamber MFC (0.27±0.05 W/m$^2$). This power production by the electrode reactions is 50% larger than that achieved with carbon nanotube coated electrodes in the absence of a RED stack, X. Xie et al., Energy Environ. Sci. 5, 5265 (2012).

Figure 19A:
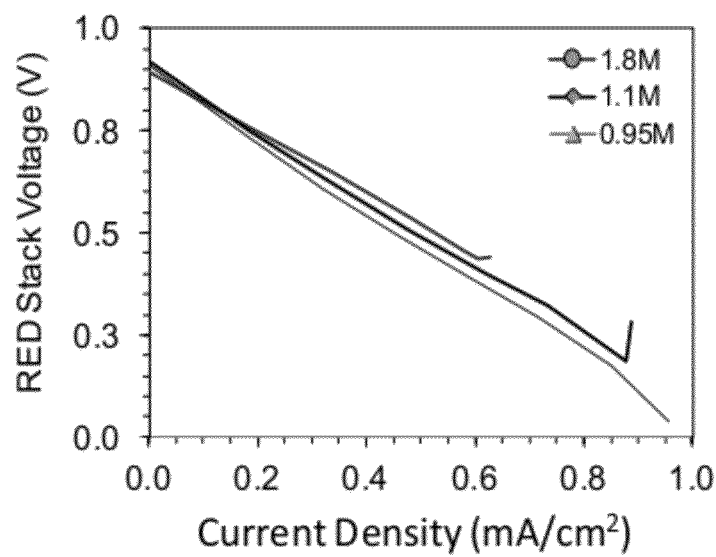
FIG. 19A is a graph showing reverse electrodialysis (RED) stack voltage vs. current density for an MRC using different concentrations of salts in the saline material, 0.95, 1.1, and 1.8 M.
Figure 19B:
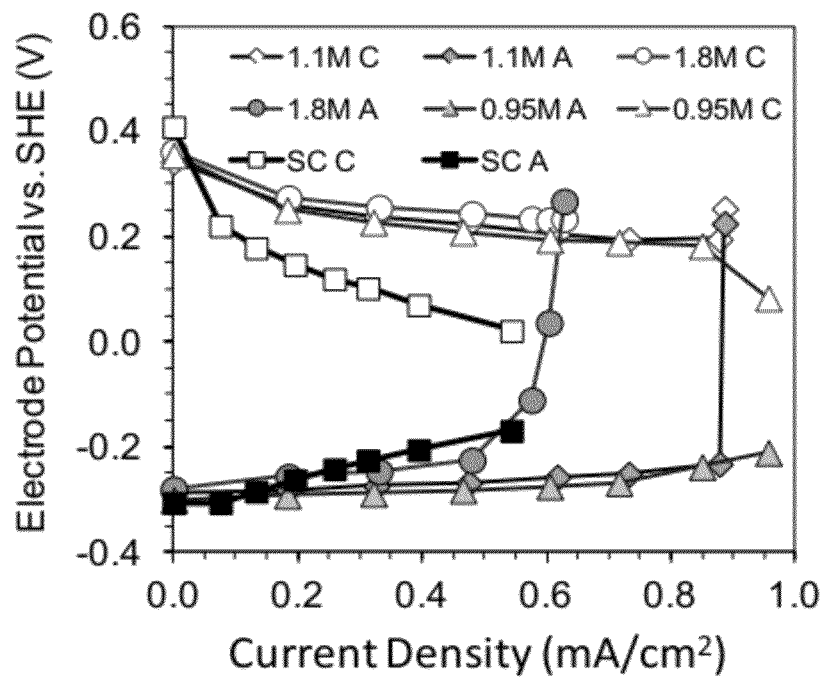
FIG. 19B is a graph showing anode (A) and cathode (C) potentials vs. current density for an MRC using different concentrations of salts in the saline material, 0.95, 1.1, and 1.8 M.

FIG. 19A is a graph showing reverse electrodialysis (RED) stack voltage for the MRC using different high concentrate (HC) solutions (0.95, 1.1, and 1.8 M). FIG. 19B is a graph showing anode (A) and cathode (C) potentials vs. current density for the MRC using different high concentrate (HC) solutions (0.95, 1.1, and 1.8 M). The stability of the anode potential at higher current densities was the primary reason for the increased power density.

The use of the RED stack produced a very stable cell voltage with increasing current, with electrode potentials maintained very close to their open circuit values as current density increased (FIGS. 19A-B). In contrast, MFC electrode potentials substantially changed with increasing current. High salt concentrations (1.1 and 1.8 M) adversely affected the anode biofilm at the highest current densities, as shown by a rapid increase in the electrode potential (FIGS. 19A-B). This rapid change in electrode potential resulted in substantially reduced power densities in subsequent cycles, indicating damage to the anode biofilm. Several additional cycles were needed at low current densities (high resistances) to restore performance.

Figure 20:
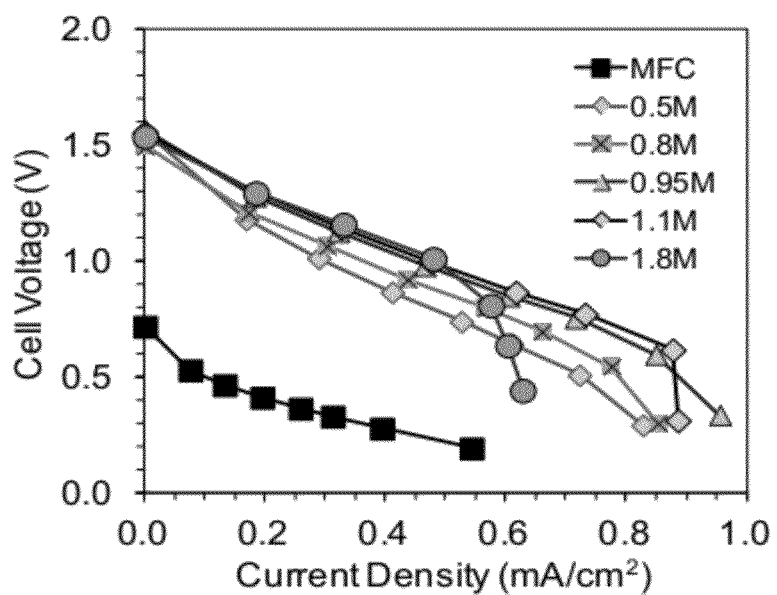
FIG. 20 is a graph showing polarization curves of an MRC using different concentrations of salts in the saline material, compared to an MFC.

FIG. 20 is a graph showing polarization curves of the MRC using different HC salt solutions, compared to that of an MFC. Internal resistances, obtained from the slope of the polarization curves shown in FIG. 20, ranged from 170Ω (HC=0.5 M) to 138Ω (1.8 M).

Figure 21:
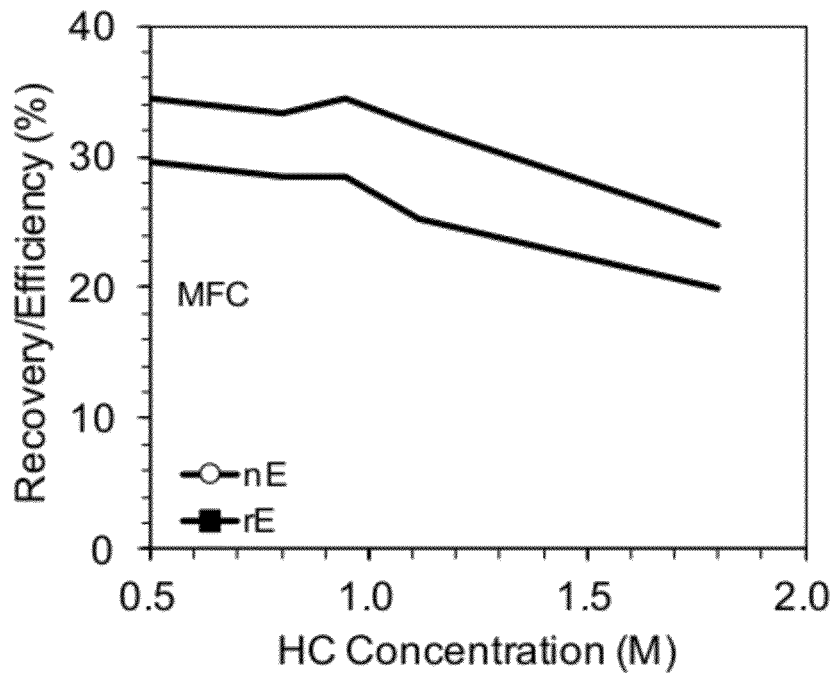
FIG. 21 is a graph showing energy recovery ($r_E$) and energy efficiency ($\eta_E$) for a microbial reverse electrodialysis cell (MRC) in batch recycle experiments, using different different concentrations of salts in the saline material (high concentrate, HC, solutions)

FIG. 21 is a graph showing energy recovery ($r_E$) and energy efficiency ($\eta_E$) for the microbial reverse electrodialysis cell (MRC) in batch recycle experiments, using different high concentrate (HC) solutions. Energy recovery is defined by the ratio of energy produced by the MRC reactor and the energy input as substrate and salinity gradient. Energy efficiency was calculated as the ratio of energy produced to the energy consumed based on the substrate used and the salinity gradient. The dashed line indicates energy recovery and efficiency using the same electrodes in a single chamber MFC reactor (no membranes).

Energy recoveries (based on total energy entering) and energy efficiencies (energy-in minus that going out) were higher for the MRC than a MFC. Energy recoveries for the MRC, at a fixed salinity ratio (SR=100), ranged from 30±0.5% (HC=0.5 M) to 20±0.0% (HC=1.8 M), with energy efficiencies of 34±0.5% (HC=0.5 M) to 25±0.0% (HC=1.8 M) (FIG. 21). Maximum energy recovery in the MFC was only 14±2%, with a slightly larger energy efficiency of 16±2%. Coulombic efficiencies, or the percentage recovery of electrons from the substrate, were higher in the MRC (66±4%) than the MFC (35±4%) due to the membrane stack reducing oxygen crossover from the cathode to the anode.

Figure 22:
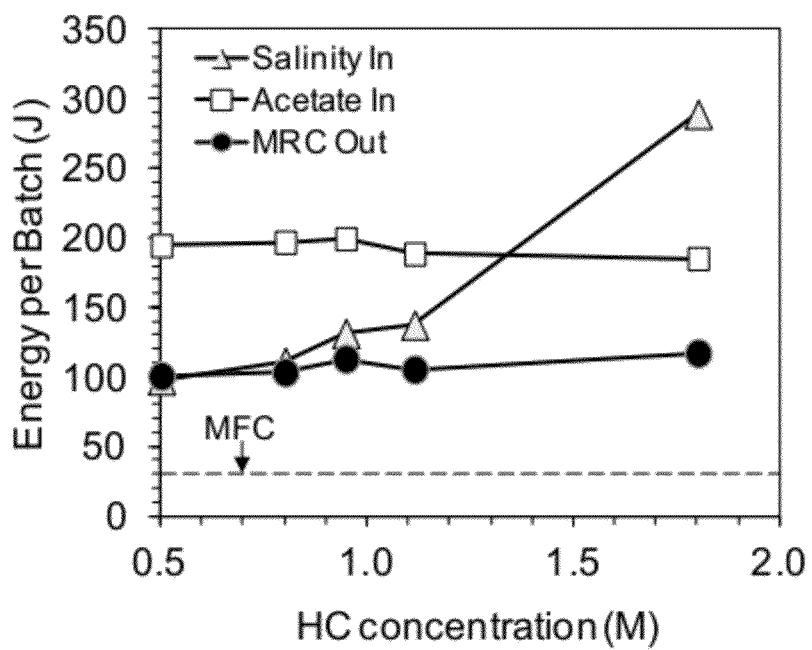
FIG. 22 is a graph showing MRC energy input (acetate and salinity energy) and output using different concentrations of salts in the saline material (high concentrate, HC, solutions)
Figure 23:
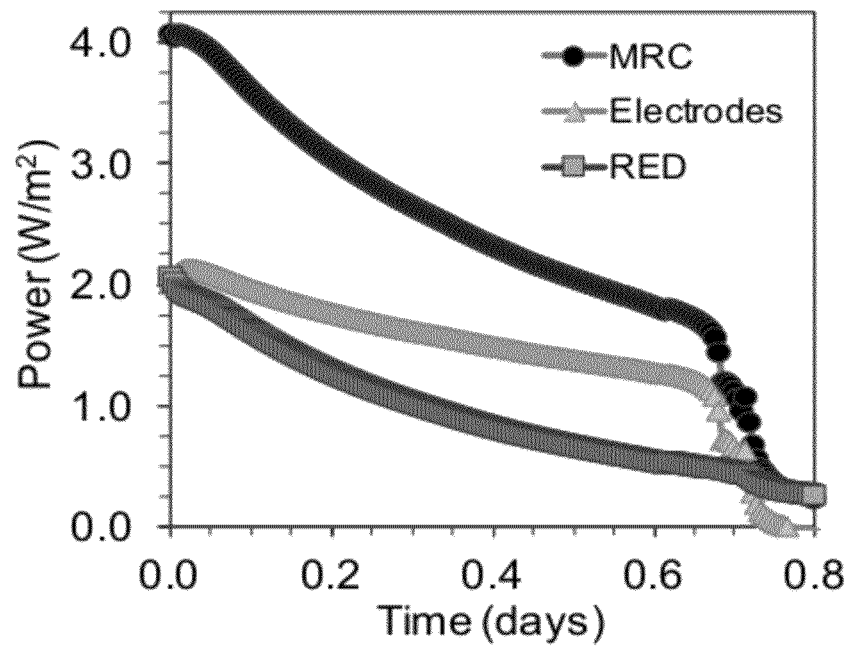
FIG. 23 is a graph showing batch recycle component (MFC electrodes, RED and total MRC) power profile of MRC fed acetate operating at an external resistance of 300Ω.

FIG. 22 is a graph showing MRC energy input (acetate and salinity energy) and output at different HC concentrations. FIG. 23 is a graph showing batch recycle component (MFC electrodes, RED and total MRC) power profile of MRC fed acetate operating at an external resistance of 300Ω.

Figure 24:
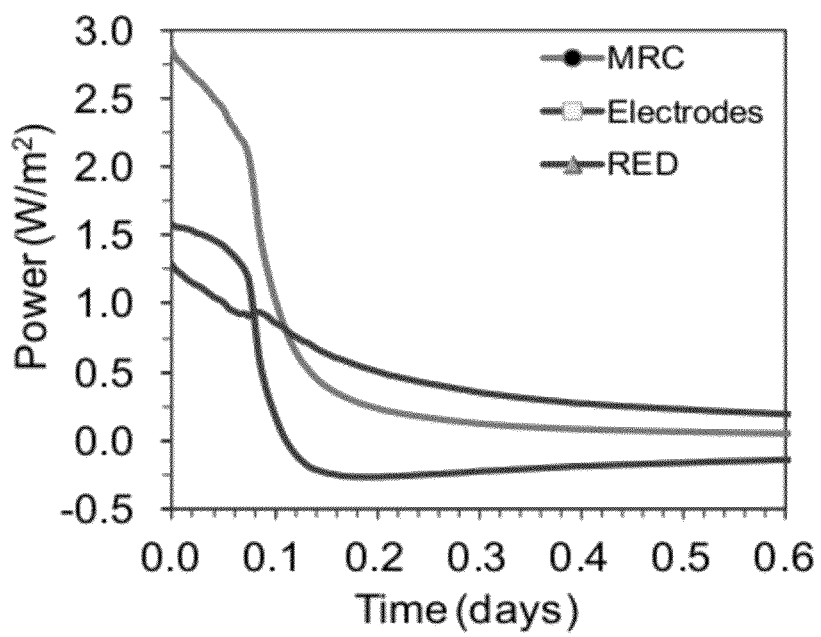
FIG. 24 is a graph showing batch recycle component (Electrodes, RED and total MRC) power profile of MRC fed domestic wastewater operating at an external resistance of 300Ω.

FIG. 24 is a graph showing batch recycle component (electrodes, RED and total MRC) power profile of MRC fed domestic wastewater operating at an external resistance of 300Ω. Power production from wastewater dropped off after only two hours, indicating rapid treatment of easily degraded organic matter (FIG. 24). The percent of organic matter removal based on chemical oxygen demand (COD) was 35±2%, with an energy production of 0.94 kWh/kg-COD. In contrast, conventional wastewater treatment using activated sludge processes can consume 1.2 kWh/kg-COD. McCarty, P. L. et al., Environ. Sci. Technol., 45:7100, 2011. The relatively low COD removal with wastewater, compared to essentially complete removal with acetic acid, is typical for biofilm processes used in wastewater treatment, Logan, B. E. et al., J. Water Pollution Cont. Fed. 59:1029, 1987. Soluble COD (that passing a 0.45 μm-pore-diameter filter) can easily be removed by the biofilm in a trickling filter, for example, with particulate COD removed in a secondary solids contact process that can be used to generate methane.

Figure 25:
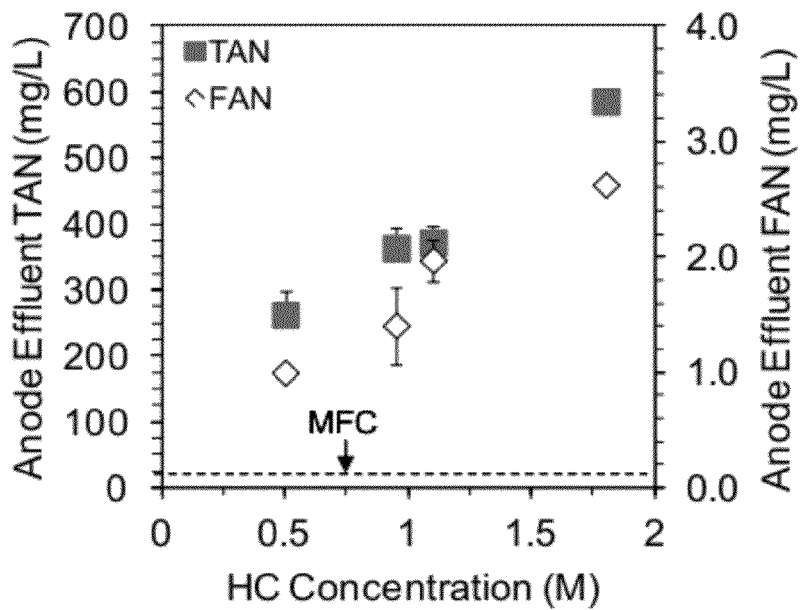
FIG. 25 is a graph showing ammonia transport into anode chamber using different concentrations of salts in the saline material (high concentrate, HC, solutions)

FIG. 25 is a graph showing ammonia transport into anode chamber at various HC concentrations. The MRC anode effluent concentrations of total ammonia-nitrogen (TAN, $NH_4^+ + NH_3$) and free ammonia-nitrogen (FAN, $NH_3$) were appreciably higher than the single chamber MFC (TAN=24±5 mg/L, FAN=0.16±0.02 mg/L). The predominant nitrogen forms in the ammonium carbonate solution are ammonium ($NH_4^+$), ammonia ($NH_3$), and carbamate ($NH_4CO_3^-$). Negatively charged carbamate ions crossed the anion exchange membrane and moved into the anode chamber to balance charge (protons released by the bioanode). Total ammonia nitrogen concentrations in the anode following a fed-batch cycle ranged from 263±32 mg/L (HC=0.5 M) to 590±36 mg/L (HC=1.8 M) (FIG. 25). For the observed values of effluent anode pH (6.8-7.1), free ammonia nitrogen concentrations in the anode chamber ranged from 1.0±0.2 mg/L to 2.6±0.03 mg/L.

Example 5

Hydrogen Generation in Microbial Reverse-Electrodialysis Electrolysis Cells (MERC) Using a Heat-Regenerated Salt Solution Reactor Set Up Two cubes of polycarbonate were drilled to produce cylindrical anode and cathode chambers 3 cm in diameter and 4 cm long (30 mL each). A cylindrical glass tube for gas collection was attached on the top of the cathode chamber and sealed with a butyl rubber stopper and an aluminum crimp cap. The RED stack, situated between the anode and cathode chambers, included 5 CEMs and 6 AEMs (Selemion CMV and AMV, Asahi glass, Japan) forming 5 saline material (high concentrate, HC) solution cells and 5 lower saline material (low concentrate, LC) solution cells. Silicon gaskets having rectangular open sections (4×2 cm$^2$) for flow were placed between adjacent membranes (empty bed volume of 1 mL) that contained a polyethylene mesh spacer to prevent membrane deformation (0.13 cm thick). The anodes were heat treated graphite fiber brushes (0.25 cm diameter×0.25 cm length; fiber type; PANEX 33 160 K, ZOLTEK). The cathodes were made from stainless steel mesh (Type 304, #60 mesh, wire diameter 0.019 cm, pore size 0.0023 cm; McMaster-Carr), a Pt catalyst (0.5 mg Pt/cm$^2$), and carbon particles and a binder (Vulcan XC-71, 33.3 mL/cm$^2$ of 5 wt % Nafion; projected cross sectional area of 7 cm$^2$). Each chamber was equipped with an Ag/AgCl reference electrode (RE-5B; BASi) to measure electrode potentials and stack voltage.

Experiments and Measurements

The anode solution contained 1.0 g/L $CH_3COONa$ and a buffered nutrient medium consisting of 8.4 g/L $NaHCO_3$, 0.31 g/L $NH_4Cl$, 0.13 g/L KCl, 0.05 g/L $Na_2HPO_4$, 0.03 g/L $NaH_2PO_4 \cdot H_2O$, trace vitamins and minerals. The cathode chamber was filled with 1 M $NaHCO_3$ solution (~55 mS/cm) unless otherwise noted. The HC solution was 1.4 M $NH_4HCO_3$ solution, with the concentration of $NH_4HCO_3$ in the LC solution adjusted to produce salinity ratios (SRs) of 100, 200, 400, and 800. In some tests, low conductivity deionized (DI) water was used as the LC solution, resulting in an SR defined as "Infinite", as the conductivity of the DI water was <0.0004 mS/cm. Each solution was supplied into the stack at a fixed flow rate of 0.8 mL/min. The HC solution was pumped into the HC cell from the cathode chamber and flowed serially through 5 HC cells in the RED stack. Similarly, the LC solution flowed through all the 5 LC cells, but in the opposite direction from the anode to cathode side, unless otherwise noted. All experiments were performed at room temperature.

Gas was collected for analysis in gas bags (0.1 L capacity; Cali-5-Bond, Calibrated Instruments Inc.) with gas volume measured using a respirometer (AER-200; Challenge Environmental). Gas chromatographs (GCs; SRI Instruments) were used to analyze the gas composition in the reactor headspace as well as in the gas bags for $H_2$, $N_2$, $CO_2$ and $CH_4$. Total chemical oxygen demand (COD) was measured at the beginning and end of each batch (COD Reagent; HACH Co.). Total ammonia concentration (nitrogen-ammonia reagent (salicylate), HACH Co.) was determined with a UV spectrophotometer (DR2010, HACH Co.). The pH and conductivity of samples were monitored with conductivity and pH meters (SevenMulti, Mettler-Toledo International Inc.). A 10Ω resistor was connected between the anode and cathode to measure current using a multimeter (Model 2700, Keitheley Instrument).

Calculations

The performance of the MREC was evaluated as previously described in terms of: coulombic efficiency ($\eta_{CE}$, %) based on total coulombs recovered compared to the mass of substrate consumed; cathodic hydrogen recovery ($r_{cat}$, %); volumetric hydrogen production rate (Q, m$^3$H$_2$/m$^3$/d) normalized to the anolyte volume; and hydrogen yield (Y, mole H$_2$/mole acetate) based on the hydrogen produced and acetate consumed. The volumetric current density ($I_{vol}$, A/m$^3$) was an average of the maximum current production over a 1 h period divided by the anolyte volume. Cathode overpotential was calculated by subtracting the theoretical cathode potential calculated by the Nernst equation from the measured cathode potential.

Energy recovery ($r_E$) was calculated relative to the total energy provided to the MREC as the ratio of energy content of hydrogen produced:

$$r_E = \frac{\Delta H_{H_2} n_{H_2} / t_B}{\Delta H_S n_S^{in} / t_B + X_{in}} \times 100$$

where $\Delta H$ is the heat of combustion (J/mol), $t_B$ the time span for each batch cycle, the superscripts in and s denote the influent and the substrate, respectively, and $X_{in}$ is the theoretical energy (W) estimated by the change in the free energy involving complete mixing of HC and LC solutions as:

$$X_{in} = RT\left(V_{LC} c_{LC}^{in} \ln\frac{a_{LC}^{in}}{a_M} + V_{HC} c_{HC}^{in} \ln\frac{a_{HC}^{in}}{a_M}\right)$$

where R the gas constant, T the absolute temperature, V the volume of solution, c the molar concentration, and a the activity. The subscripts HC, LC, and M denote high concentration, low concentration, and mixed solutions, respectively. The energy leaving the reactor is similar, but based on the conditions for the water leaving the reactor (superscript out). The percent change in energy of the HC and LC solutions is therefore $X_{util} = (-X_{in} - X_{out})/X_{in}$.

In order to calculate energy recovery ($\eta_E$), energy leaving the MREC was subtracted from the added energy as:

$$\eta_E = \frac{\Delta H_{H_2} n_{H_2}/t_B}{\Delta H_S(n_S^{in} - n_S^{out})/t_B + X_{in} - X_{out}} \times 100$$

The concentration of free ammonia ($NH_3$) was calculated from $$\frac{[NH_3]}{[TAN]} = \left(1 + \frac{10^{-pH}}{10^{-(0.09018 + (\frac{2729.92}{T}))}}\right)^{-1}$$

where [$NH_3$] is the $NH_3$ concentration (mg N/L), and [TAN] is the total ammonia nitrogen concentration (mg N/L).

Performance with a Fixed HC, Variable LC

Figure 26A:
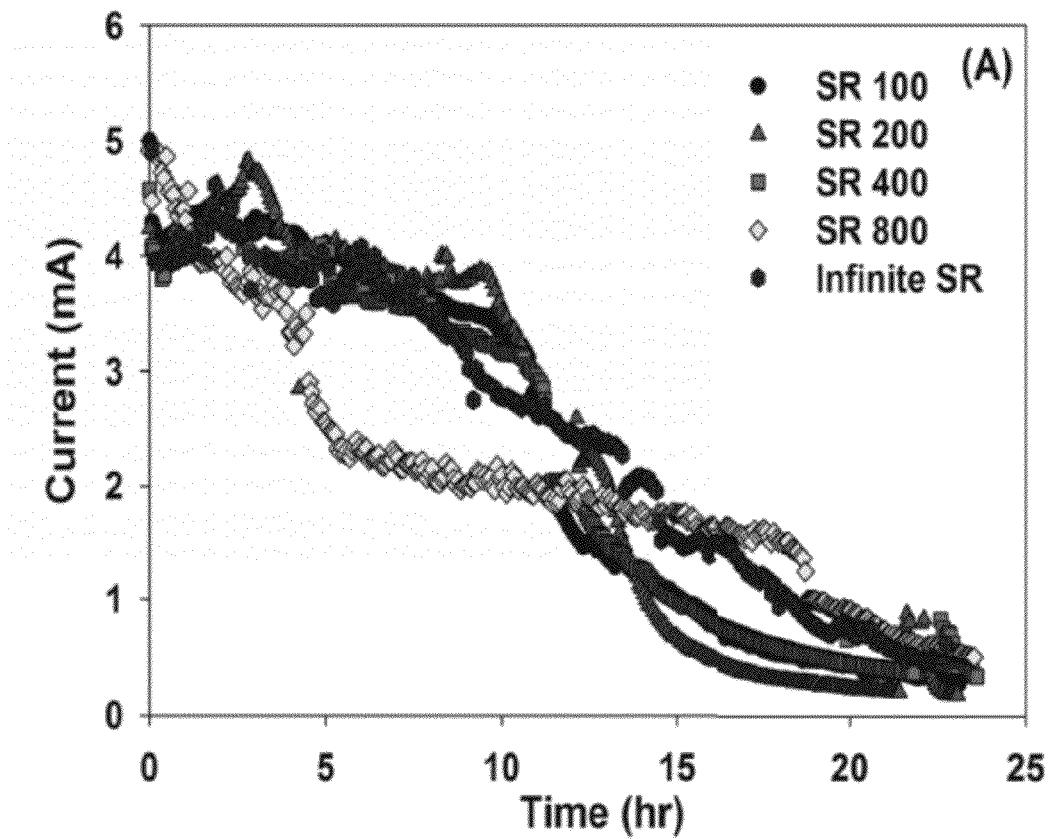
FIG. 26A is a graph showing MREC current generation with different salinity ratios.
Figure 26B:
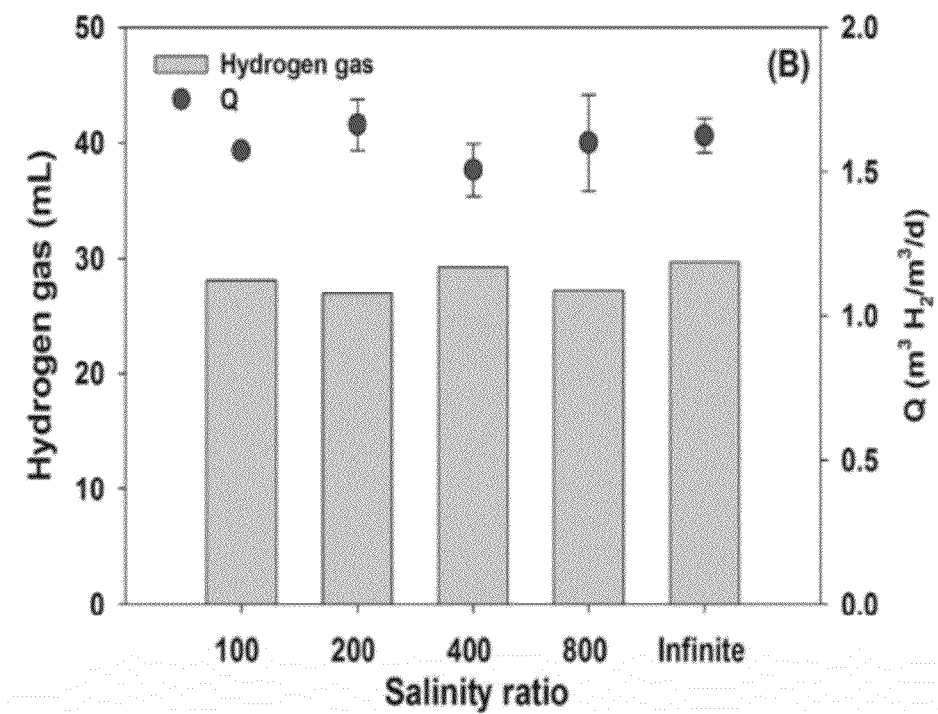
FIG. 26B is a graph showing MREC hydrogen gas production with different salinity ratios.
Figure 26C:
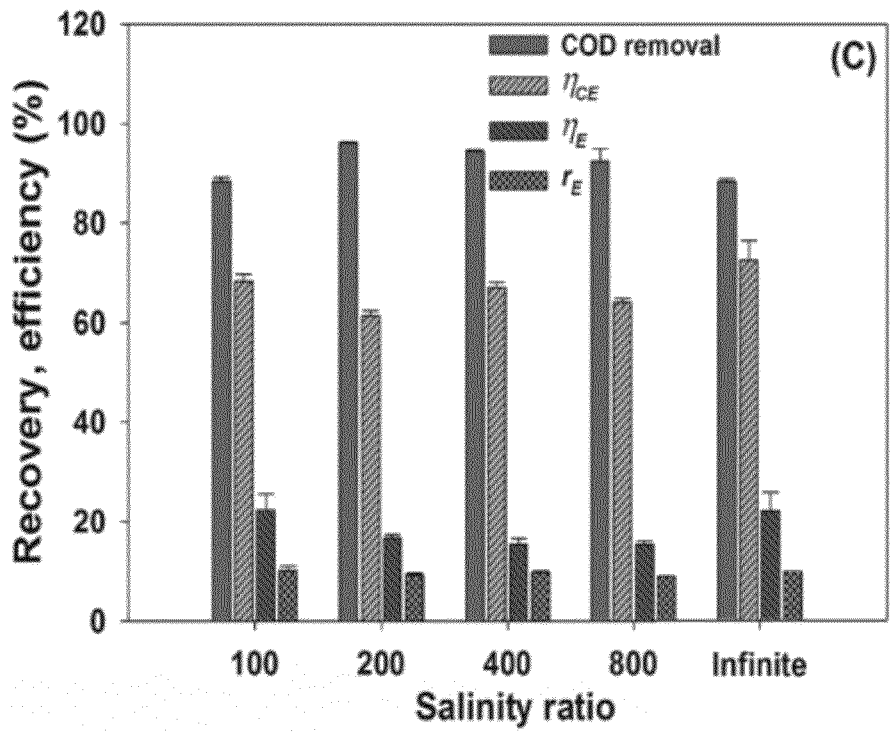
FIG. 26C is a graph showing MREC COD removal efficiency, coulombic efficiency, energy recovery and efficiency with different salinity ratios.

Current and hydrogen gas were successfully generated in the MREC using only the ammonium bicarbonate solution and no external power supply. FIGS. 26A, 26B and 26C show graphs indicating MREC performance with different salinity ratios (SR) (FIG. 26A) current generation (FIG. 26B) gas production (FIG. 26C) COD removal efficiency, coulombic efficiency, energy recovery and efficiency at different Salinity Ratios (SR).

Table 1 shows electrode potential (vs. Ag/AgCl), stack voltage, volumetric current density at different salinity ratios and $NH_4HCO_3$ concentration of the HC solution.

TABLE 1

| SR | HC (M) | Anode potential (mV) | Cathode potential (mV) | Stack voltage (mV) | $I_{vol}$ (A/m$^3$) |
|---|---|---|---|---|---|
| 100 | 1.4 | −427 ± 8 | −734 ± 14 | 348 ± 15 | 143 ± 0 |
| 200 | 1.4 | −460 ± 6 | −736 ± 10 | 315 ± 3 | 152 ± 8 |
| 400 | 1.4 | −468 ± 12 | −740 ± 13 | 305 ± 10 | 137 ± 8 |
| 800 | 1.4 | −474 ± 6 | −738 ± 9 | 321 ± 21 | 146 ± 15 |
| Infinite | 1.4 | −466 ± 5 | −740 ± 14 | 307 ± 3 | 148 ± 5 |
| Infinite | 0.9 | −487 ± 6 | −753 ± 2 | 282 ± 6 | 119 ± 5 |
| Infinite | 0.6 | −491 ± 12 | −751 ± 1 | 269 ± 20 | 95 ± 3 |
| Infinite | 0.4 | −494 ± 13 | −748 ± 1 | 259 ± 17 | 83 ± 7 |
| Infinite | 0.1 | −528 ± 6 | −752 ± 1 | 210 ± 5 | 43 ± 2 |

The peak volumetric current densities ranged over a small range of 137±8 A/m$^3$ to 152±8 A/m$^3$ (Table 1) for the different SRs, with single fed-batch cycle times of 23±1 hr at all SRs (FIG. 26A). While the current density was relatively insensitive to the SRs examined here, eliminating the salinity gradient in the stack (SR=1, 1.4 M $NH_4HCO_3$) resulting in a loss of current, confirming that salinity gradient energy from the RED stack was essential for hydrogen production. This result on the effect of the SR is different from studies using NaCl solutions for power production in a microbial reverse-electrodialysis fuel cell (MRC) where varying the SR affected performance.

The produced gas was consistently 92-94% $H_2$ and 6-8% $CO_2$ at the different SRs. The use of a RED stack prevented the consumption of hydrogen generated at the cathode by hydrogenotrophic methanogens, resulting in a methane-free, high hydrogen purity gas. Total hydrogen generation ranged from 27 mL-$H_2$ (Y=2.8 mole $H_2$/mole acetate, SR=200) to 30 mL-$H_2$ (Y=3.4 mole $H_2$/mole acetate, SR Infinite) over each fed-batch cycle (FIG. 26B), which is similar to the value with NaCl salts in MRECs. There was no significant linear relationship between gas volume and salinity difference between the HC and LC streams ($R^2$=0.18, p=0.57). The coulombic efficiencies ranged from 61 to 72% at different SRs (FIG. 26C), with complete recovery of current as hydrogen gas ($r_{cat}$=100%).

The final anolyte pH was 7.2±0.1 (initial pH=8.2) due to the high buffering capacity of the bicarbonate buffer (100 mM) used for the anolyte, and the transport of carbonate species ($CO_3^{2-}$ and $HCO_3^-$) from the RED stack through the adjacent AEM. This result is different than that obtained using NaCl solution where the anolyte became more acidic (final pH of ~5.5), inhibiting exoelectrogenic activity due to the low pH. The lack of a pH change enabled nearly complete substrate removal based on COD (88% to 96%) (FIG. 26C). The final catholyte pH increased (8.9±0.1, initial pH=7.9) due to the proton consumption at the cathode. This pH change is also smaller than that previously observed with NaCl solutions (pH up to 12) due to the high $NaHCO_3$ concentration (1 M) in the cathode chamber.

The anolyte conductivity increased from 10 mS/cm to 13-14 mS/cm due to anion transfer from the RED stack. Because the anode chamber was separated from the HC stream in the RED stack by an AEM, it was expected that carbonate species would be transferred into the anode chamber. However, ammonia was also detected in the anolyte, with a total ammonia ($NH_4^+$ and $NH_3$) concentration ranging from 547±41 mg-N/L to 685±64 mg-N/L. While little transport of the ammonium cation is expected through an AEM, negatively charged carbamate ($NH_4CO_3^-$) is able to pass through this membrane. While high free ammonia concentrations can inhibit exoelectrogenic activity, calculated free ammonia concentrations here (5-6 mg N/L at all SRs) were below those needed to produce inhibition, Nam, J.-Y. et al., J. Power Sources 2010, 195 (19), 6428-6433. Further evidence for a lack of adverse effects of ammonia on the exoelectrogenic activity of the anode biofilm was demonstrated by stable anode potentials over the fed batch cycle (−427 to −474 mV vs. Ag/AgCl) (Table 1). The loss of ammonia in the anode solutions will need to be minimized or eliminated, perhaps through the use of a LC stream next to the anode, or a high concentration sodium bicarbonate stream.

The highest energy efficiency of $\eta_E$=22% was obtained at an SR=100 and for the case of SR Infinite. The energy recovery remained low ($r_E$=9-10%) in all tests, due to the relatively large amount of salinity driven energy that was added to the stack (2860 J-3250 J). The salinity driven energy accounted for 90% of the total energy provided, with the balance substrate energy (10%). The energy recovery could be enhanced by using a lower flow rate and by recycling the saline solution with reduced liquid volume as the concentration of the recycled HC concentration was still high (>90 mS/cm).

Performance with a Fixed LC, and Variable HC

Figure 27A:
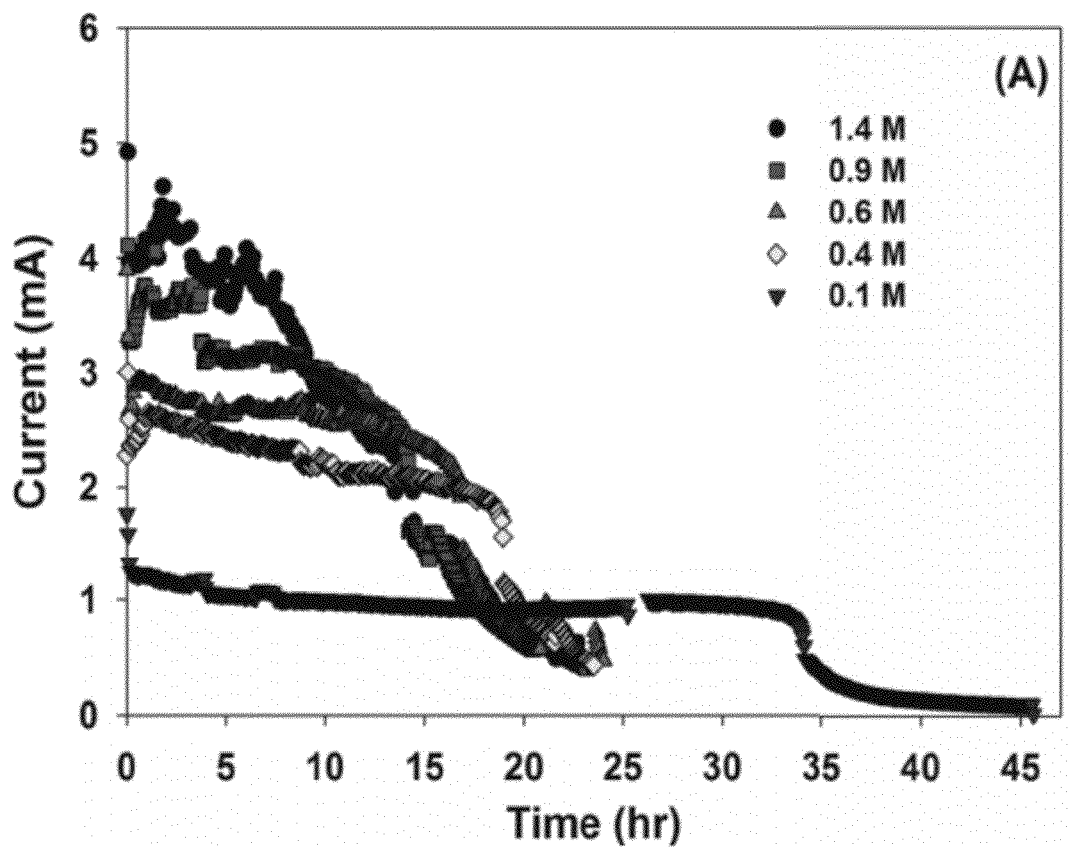
FIG. 27A is a graph showing MREC current generation with different concentrations of salts in the saline material.
Figure 27B:
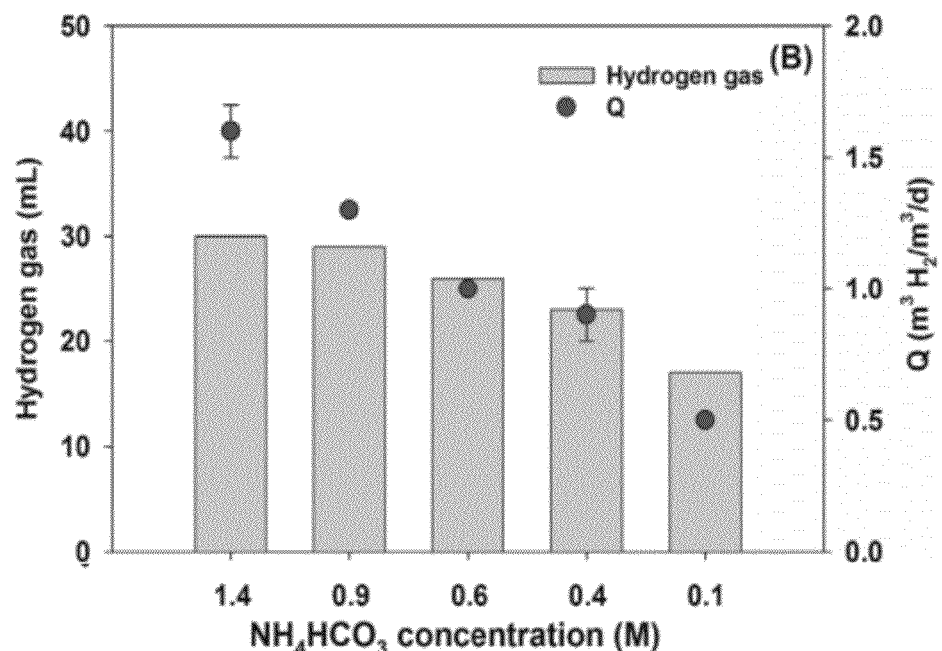
FIG. 27B is a graph showing MREC hydrogen gas production with different concentrations of salts in the saline material.
Figure 27C:
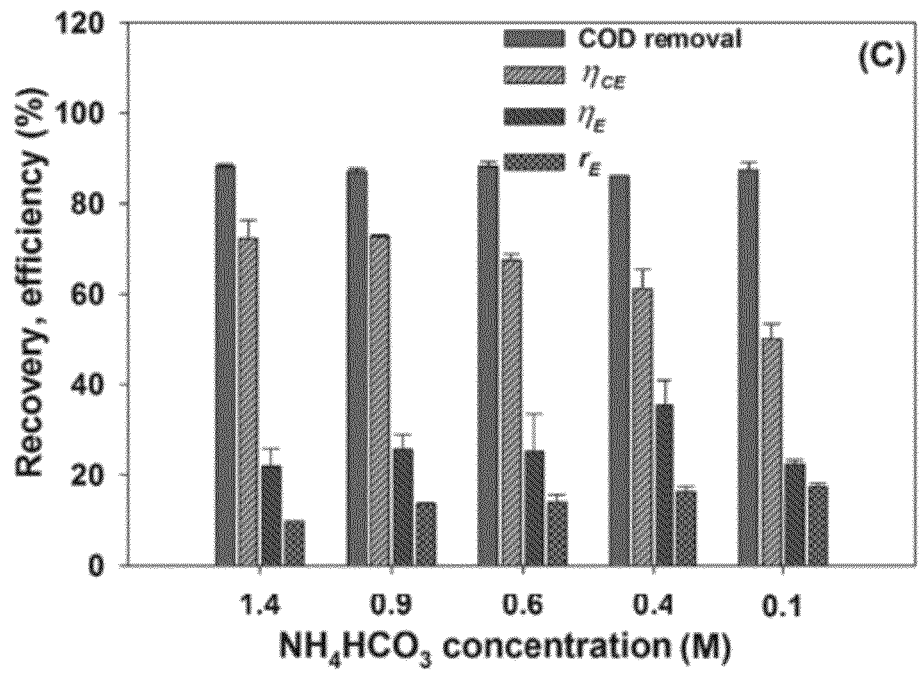
FIG. 27C is a graph showing MREC COD removal efficiency, coulombic efficiency, energy recovery, and efficiency with different concentrations of salts in the saline material.

FIGS. 27A, 27B and 27C are graphs showing MREC performance with different HC concentration (FIG. 27A) current generation (FIG. 27B) gas production (FIG. 27C) COD removal efficiency, coulombic efficiency, energy recovery, and efficiency.

A reduction in the HC concentration (1.4 M to 0.1 M) with a fixed LC solution (SR Infinite) reduced the range of working solution conductivities for the HC stream from 103 to 10 mS/cm, decreased current (Table 1), and increased the time needed to complete a fed-batch cycle (FIG. 27A). The reduction in current decreased the recovery of hydrogen gas from 30 mL-$H_2$ to 17 mL-$H_2$ (93-94% $H_2$, 6-7% $CO_2$), and decreased the gas production rate from 1.6 $m^3$ $H_2/m^3 \cdot d$ to 0.5 $m^3$ $H_2/m^3 \cdot d$ (FIG. 27B). The lower performance with the lower HC concentration was due to decrease in the salinity driven energy ($X_{in}$) and the stack voltage during fed-batch operation decreased from 307±3 mV at 1.4 M HC to 210±5 mV at 0.1 M HC (Table 1). The $X_{in}$ was reduced from 3090 J (1.4 M HC) to 790 J (0.1 M HC).

Figure 28:
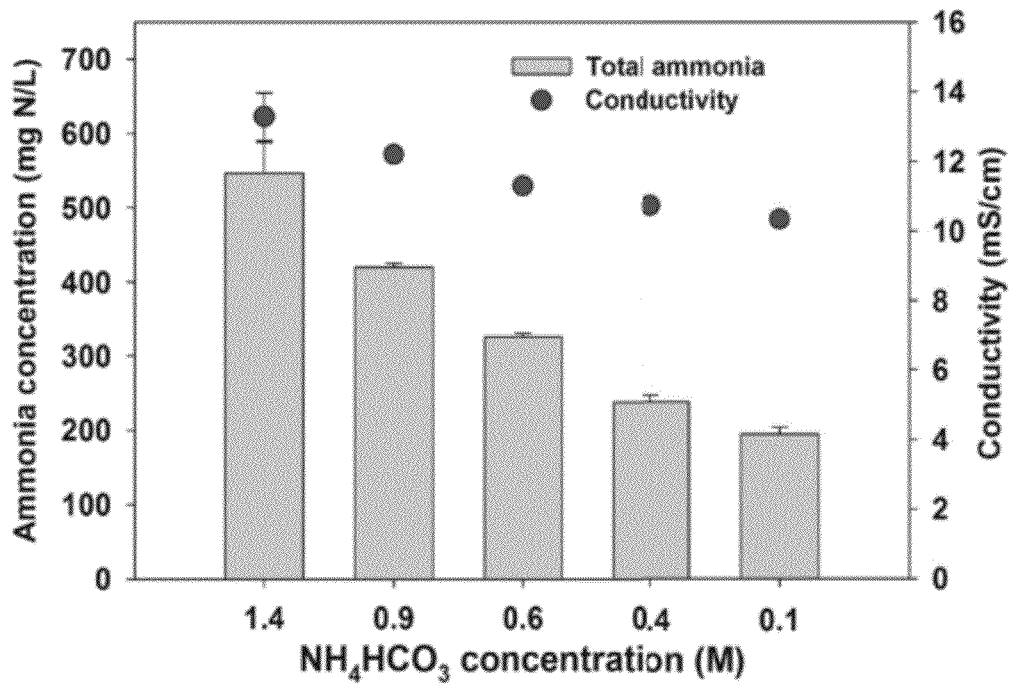
FIG. 28 is a graph showing total ammonia concentration and final anolyte conductivity with different concentrations of salts in the saline material.

COD removal efficiency (86-88%) was not affected by the HC concentration. However, the columbic efficiency substantially decreased with HC concentration from $\eta_{CE}$=72% to 50% using the 0.1 M HC (FIG. 27C). There was little change in the cathode potential (−740 mV to −752 mV), likely as a result of the high conductivity of the catholyte (~55 mS/cm) that produced a low ohmic resistance. Reducing the HC concentration decreased the voltage produced by the stack, resulting in lower anode potentials (Table 1). This reduction in anode potential is consistent with tests using MECs where anode potential is also reduced with lowering applied voltage. The final anolyte conductivity decreased from 13 mS/cm to 10 mS/cm with HC concentration due to the reduction in the concentration gradient between the anode chamber and the first HC compartment in the RED stack. This also reduced ammonia transfer into the anode chamber through the AEM (FIG. 28), from 547±41 mg N/L (1.4 M HC) to 195±9 mg N/L (0.1 M HC). FIG. 28 is a graph showing total ammonia concentration and final anolyte conductivity at different HC concentration.

The energy recovery increased inversely with the HC concentration due to the reduction in energy applied to the system (FIG. 27C). The reduced energy input resulted in an increase in the utilization of the applied salinity driven energy of up to $X_{util}$=75% (0.1 M HC). The highest energy efficiency ($\eta_E$=35%) was achieved using an HC=0.4 M. Thus, the decrease in performance in terms of current densities and hydrogen production rates was balanced by an overall increase in energy recovery and efficiency.

Effect of Catholyte Concentration on Performance

Figure 29:
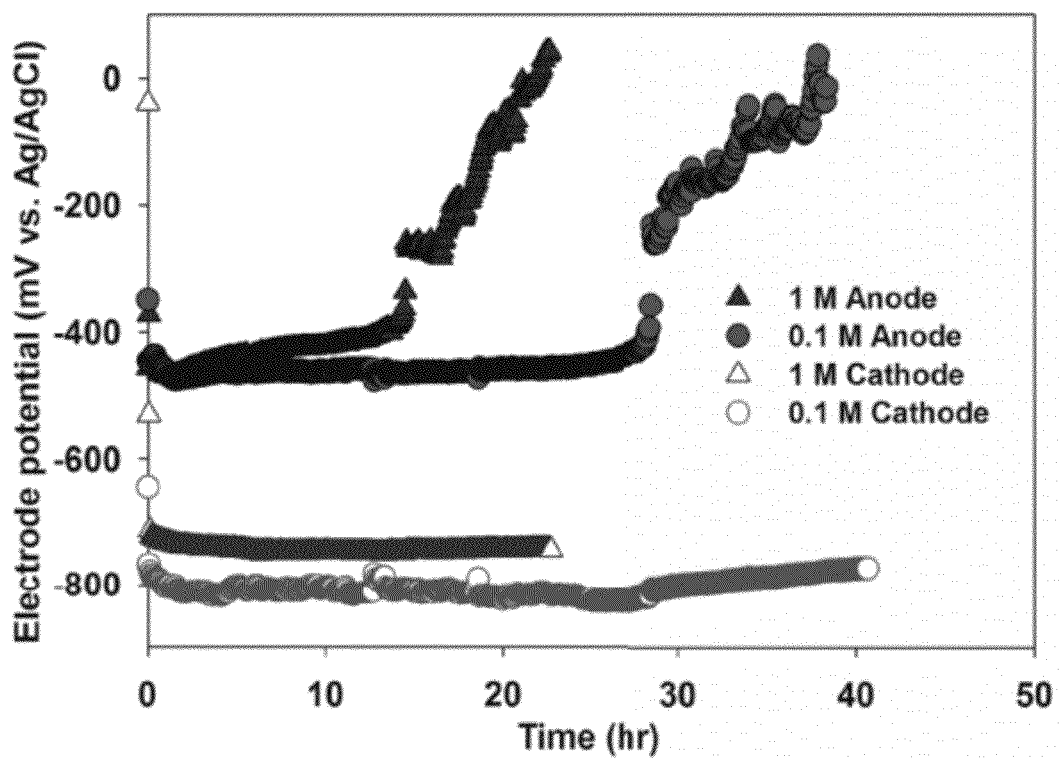
FIG. 29 is a graph showing variation of electrode potentials with different $NaHCO_3$ concentration in the cathode chamber.

FIG. 29 is a graph showing variation of electrode potentials with different $NaHCO_3$ concentration in the cathode chamber. A decrease in the $NaHCO_3$ concentration used in the cathode chamber from 1 to 0.1 M decreased the solution conductivity from 55 to 8 mS/cm (FIG. 29) and did not affect anode potentials (Table 1). The cathode overpotential with the 0.1 M solution (−540 mV at pH=8) was much higher (77 mV) than with the 1 M solution (−463 mV), resulting in a longer time for a fed-batch cycle (~41 hr). This reduction in the catholyte concentration to 0.1 M decreased the volumetric current density by ~50% ($I_{vol}$=76±6 A/$m^3$), gas production rate (Q=0.9 $m^3$ $H_2/m^3 \cdot d$), and volume of hydrogen gas produced (22 mL-$H_2$), but COD removal (88%) and CE (69%) remained high. The longer time needed for a fed-batch cycle using the 0.1 M $NaHCO_3$ solution resulted in more salinity driven energy added to the system (5510 J, versus 3090 J for the 1 M $NaHCO_3$ at the same SR), and as a result a lower energy recovery ($r_E$=5%) and efficiency ($\eta_E$=7%).

Counter-Current Versus Co-Current Operation

Figure 30A:
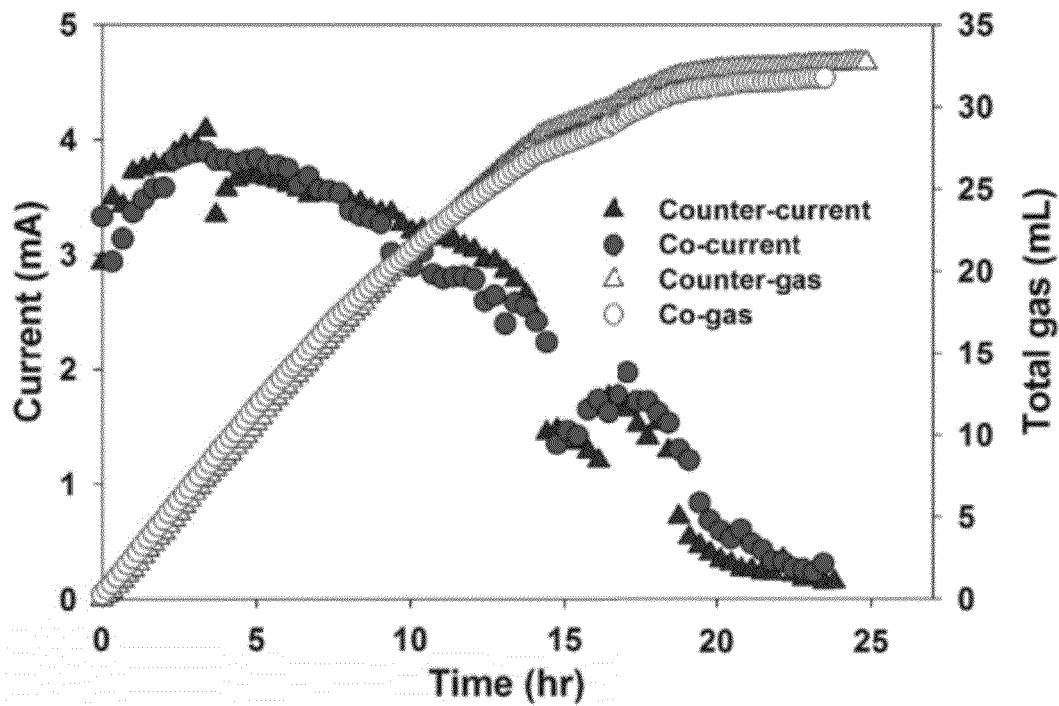
FIG. 30A is a graph showing effects of co-current and counter-current operation of an MREC at infinite SR with 1.4 M HC solution on current and gas generation ($H_2$ 92% and $CO_2$ 8%)
Figure 30B:
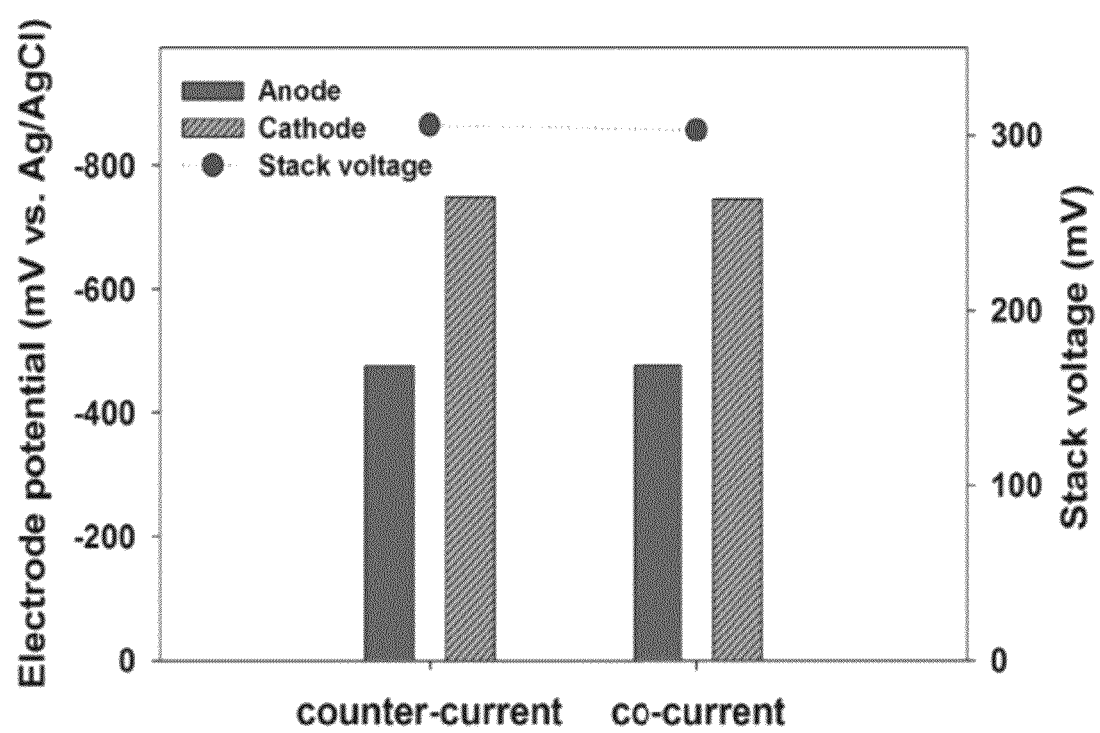
FIG. 30B is a graph showing effects of co-current and counter-current operation of an MREC at infinite SR with 1.4 M HC solution on electrode potential and stack voltage at stable current generation.

In order to see if system performance could be improved by the RED stack, the solutions were switched from counter-current to co-current flow (entering on the cathode side). FIGS. 30A and 30B are graphs showing co- and counter current operation of the MREC at infinite SR with 1.4 M HC solution (FIG. 30A) current and gas generation ($H_2$ 92% and $CO_2$ 8%) (FIG. 30B) electrode potential and stack voltage at stable current generation.

There was no appreciable change in current ($I_{vol}$=129 A/$m^3$ counter-current, $I_{vol}$=127 A/$m^3$ co-current) or gas generation (30 mL-$H_2$ counter-current and 29 mL-$H_2$ co-current) (FIG. 30A).

There were some small changes in COD removal efficiency (92% counter-current, 87% co-current) and CE (73% counter-current, 78% co-current) but there are insufficient data to know if these differences were significant. The total coulombs were essentially the same (204 mC counter-current, 206 mC co-current) and there were no appreciable changes in electrode potentials or stack voltages (FIG. 30B). The relatively constant performance independent of the flow direction could be due to low local pressure differences between the cells due to the membrane stack having a small effective cross sectional area (8 $cm^2$) and the use of low flow rates (0.8 mL/min).

These results show that the MREC is effective in organic matter removal, which can lead to effective wastewater treatment. Hydrogen gas is produced, which could be used or sold as an energy carrier or for use in industrial processes. No electrical grid energy is needed, and therefore both hydrogen production and wastewater treatment would be carbon neutral as the organic matter is fixed, and not derived from fossilized carbon. The ammonium bicarbonate solution chemistry can be carefully maintained, avoiding biofouling using natural waters and the potential for changes in water quality.

The energy produced based only on the COD removals measured for acetate (30 mL-$H_2$, ΔCOD=0.75 g/L, and 286 kJ/mol-$H_2$) achieved an overall energy recovery of 15 kJ/g-COD (4.2 kWh/kg-COD). This is slightly better than that possible with anaerobic digestion for the same conditions (dry gas basis, STP), which theoretically could produce 14 kJ/g-COD (assumes a methane conversion efficiency of 100% or 0.35 L-$CH_4$/g-COD and 889 kJ/mol-$CH_4$). The gas produced in the MREC is >90% $H_2$, which is a higher percentage than that produce from either dark fermentation of glucose to hydrogen production, or the relative percentage of methane in digester gas as both contain much higher concentrations of $CO_2$.

Any patents or publications mentioned in this specification are incorporated herein by reference to the same extent as if each individual publication is specifically and individually indicated to be incorporated by reference.

The systems and processes described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A microbial process for generating a product, comprising:

providing a system comprising:
  a reaction chamber having a wall defining an interior of the reaction chamber and an exterior of the reaction chamber;
  an anode at least partially contained within an anode compartment of the reaction chamber;
  a plurality of exoelectrogenic microorganisms disposed in the anode compartment;
  a cathode at least partially contained within a cathode compartment of the reaction chamber; a conductive conduit for electrons in electrical communication with the anode and the cathode;

a plurality of alternating anion-selective barriers and cation-selective barriers disposed between the anode and the cathode and defining alternating saline material compartments and lower-saline material compartments;

a first flow path for a saline material through the saline material compartments and a second flow path for a lower-saline material through the lower-saline material compartments, wherein the saline material and the lower-saline material compartments are adjacent and separated by the anion selective barriers and the cation selective barriers;

introducing a material oxidizable by an oxidizing activity of the exoelectrogenic microorganisms into the anode chamber;

introducing the material oxidizable by the exoelectrogenic microorganisms under oxidizing reaction conditions such that electrons are produced and transferred to the anode, generating a potential between the anode and cathode;

introducing a first saline material having a concentration of dissolved ammonium bicarbonate into the saline material compartments; and introducing a lower-saline material having a concentration of dissolved ammonium bicarbonate which is lower than that of the first saline material into the lower-saline material compartments, wherein a difference in the concentration of dissolved ammonium bicarbonate in the first saline material compared to the lower-saline material drives ions across the plurality of alternating anion-selective barriers and cation-selective barriers disposed between the anode and the cathode, thereby increasing the potential between the anode and cathode, decreasing the concentration of dissolved ammonium bicarbonate in the saline material to generate a saline material effluent, and increasing the concentration of dissolved ammonium bicarbonate in the lower-saline material to generate a lower-saline material effluent.

2. The process of claim 1, wherein a salinity ratio between the first saline material and the lower-saline material introduced into the saline material compartment and lower-saline material compartment is greater than 1:1.

3. The process of claim 1, wherein oxygen is excluded from the cathode compartment and the product is hydrogen or methane or wherein oxygen is not excluded from the cathode compartment and the product is electrical current.

4. The process of claim 1, further comprising heating the lower-saline material effluent to volatilize and remove the ammonium bicarbonate, thereby producing a regenerated lower-saline material; and introducing the regenerated lower-saline material into the lower-saline material compartment.

5. The process of claim 1, wherein the lower-saline material effluent and saline material effluent are combined to generate a second saline material and the second saline material is introduced into the saline material compartment.

6. The process of claim 1, wherein the first saline material comprises one or more dissolved non-thermolytic salts, wherein the total concentration of dissolved ammonium bicarbonate is greater than the total concentration of the one or more dissolved non-thermolytic salts.

7. The process of claim 4, wherein the heating comprises heating with waste heat from a second process, heat generated by a solar heater or solar collector or a combination of waste heat from a second process and heat generated by a solar heater or solar collector.

8. The process of claim 1, wherein, each lower-saline material compartment is in fluid communication with each other lower-saline material compartment, wherein each saline material compartment is in fluid communication with each other saline material compartment.

9. The process of claim 8, wherein the first saline material flows sequentially through each saline material compartment, wherein the lower-saline material flows sequentially through each lower-saline material compartment, and wherein the first saline material and lower-saline material flow in a counter-current direction or co-current direction with respect to each other.

10. The process of claim 1, wherein the first saline material is a brine solution from a reverse osmosis plant and the lower-saline material is a saline seawater stream.

11. The process of claim 1, further comprising introducing microbes in the cathode compartment, wherein a product produced by the microbes in the cathode compartment is collected.

* * * * *